United States Patent [19]
Kojima et al.

[11] Patent Number: 5,398,313
[45] Date of Patent: Mar. 14, 1995

[54] METHOD FOR VISUAL PROGRAMMING WITH AID OF ANIMATION

[75] Inventors: Keiji Kojima, Pittsburgh, Pa.; Yoshiki Matsuda, Kokubunji, Japan

[73] Assignee: Hitachi, Ltd., Tokyo, Japan

[21] Appl. No.: 680,409

[22] Filed: Apr. 4, 1991

Related U.S. Application Data

[63] Continuation-in-part of Ser. No. 589,405, Sep. 28, 1990, and a continuation-in-part of Ser. No. 461,083, Jan. 4, 1990, abandoned, which is a continuation-in-part of Ser. No. 266,079, Nov. 2, 1988, abandoned, which is a continuation of Ser. No. 595,747, Oct. 9, 1990, Pat. No. 5,287,449.

[30] Foreign Application Priority Data

Jan. 9, 1989 [JP] Japan .................................. 1-001312
Sep. 29, 1989 [JP] Japan .................................. 1-251890

[51] Int. Cl.⁶ .......................... G06F 3/14; G06F 15/18
[52] U.S. Cl. .................................... 395/159; 395/161; 395/700
[58] Field of Search ................. 364/521, 280.7, 286.1, 364/286.3, 927.63, 147, 148; 395/159, 155, 161, 152, 700

[56] References Cited

U.S. PATENT DOCUMENTS

| | | | |
|---|---|---|---|
| 4,455,619 | 6/1984 | Masui et al. | 364/900 |
| 4,692,858 | 9/1987 | Redford et al. | 364/200 |
| 4,730,315 | 3/1988 | Saito et al. | 364/200 X |
| 4,791,561 | 12/1988 | Huber | 364/200 X |
| 4,813,013 | 3/1989 | Dunn | 364/900 |

OTHER PUBLICATIONS

"C"—Prolog User's Manual, SRI International (1988), pp. 11-14.
Chang, "Visual Languages: A Tutorial and Survey", IEEE Software vol. 4, No. 1, pp. 29-39 (Jan. 1987).
Finzer et al., "Programming by Rehearsal," BYTE Jun. 1984, pp. 187-210.
Yoshimoto et al., "Interactive Iconic Programming Facility in HI-VISUAL", IEEE Workshop on Visual Languages (1986), pp. 34-41.
Myers, "The State of the Art in Visual Programming and Program Visualization", Carnegie Mellon University Computer Science Department, Feb. 1988.

Primary Examiner—Raymond J. Bayerl
Attorney, Agent, or Firm—Fay, Sharpe, Beall, Fagan, Minnich & McKee

[57] ABSTRACT

A program is written using actual data as arguments of commands that are executed with the data when the commands are entered in the program to produce results that are compared with the desired results of the program. When the results are successful, they constitute a first sequence of the program. When execution of the first sequence of the program is unsuccessful with respect to other specific data, automatic prompting results in entry of new commands that are automatically executed with respect to the new data, without reentry of the new data and without reexecution of the first sequence to provide a second sequence with successful execution. Therefore, the program will be constituted by two or more sequences with conditional branching between the sequences as to the success of each sequence in producing the desired results with the data then being operated upon. The program preferably includes an application program that controls a computer system for the writing and branching.

103 Claims, 30 Drawing Sheets

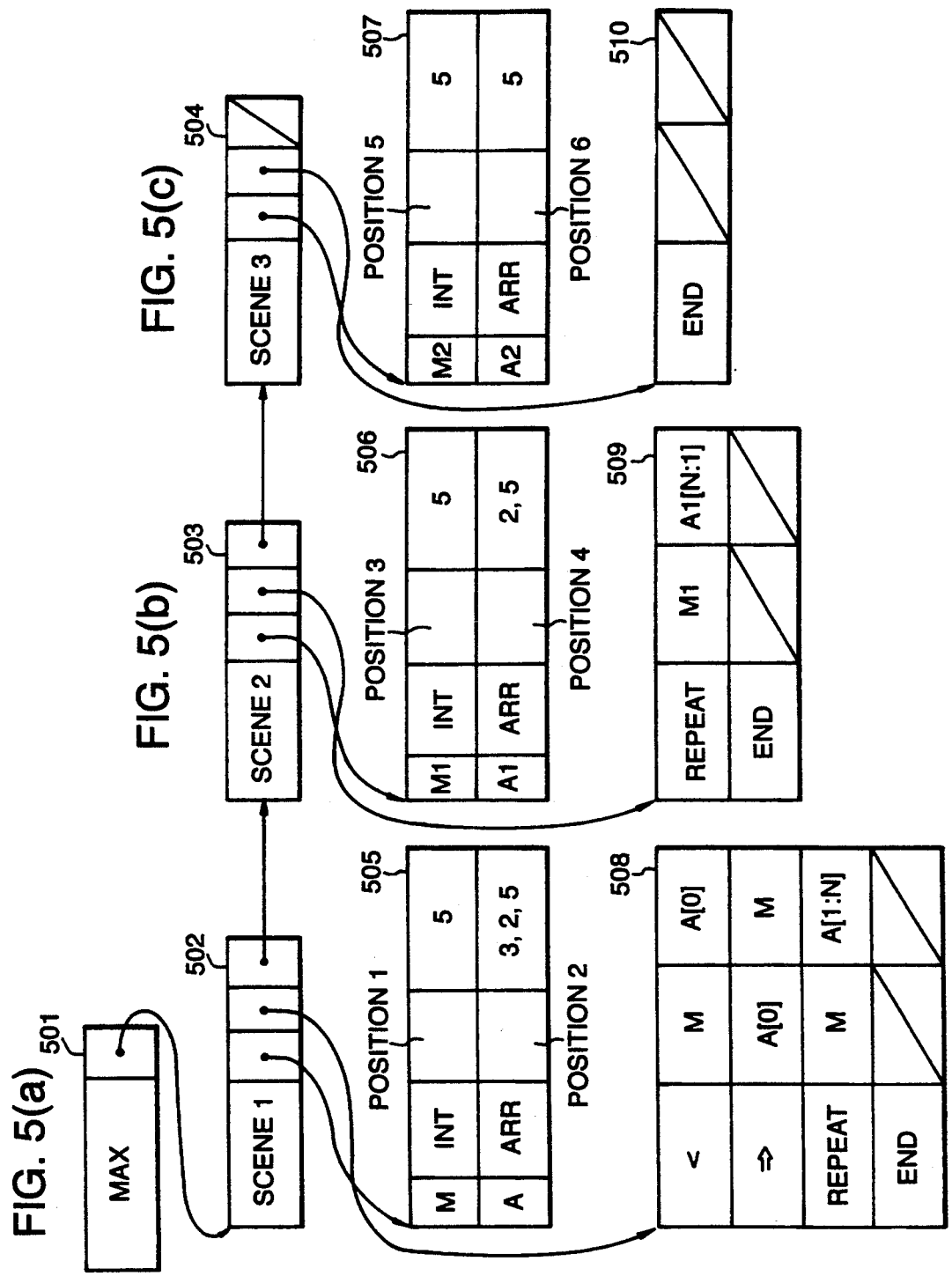

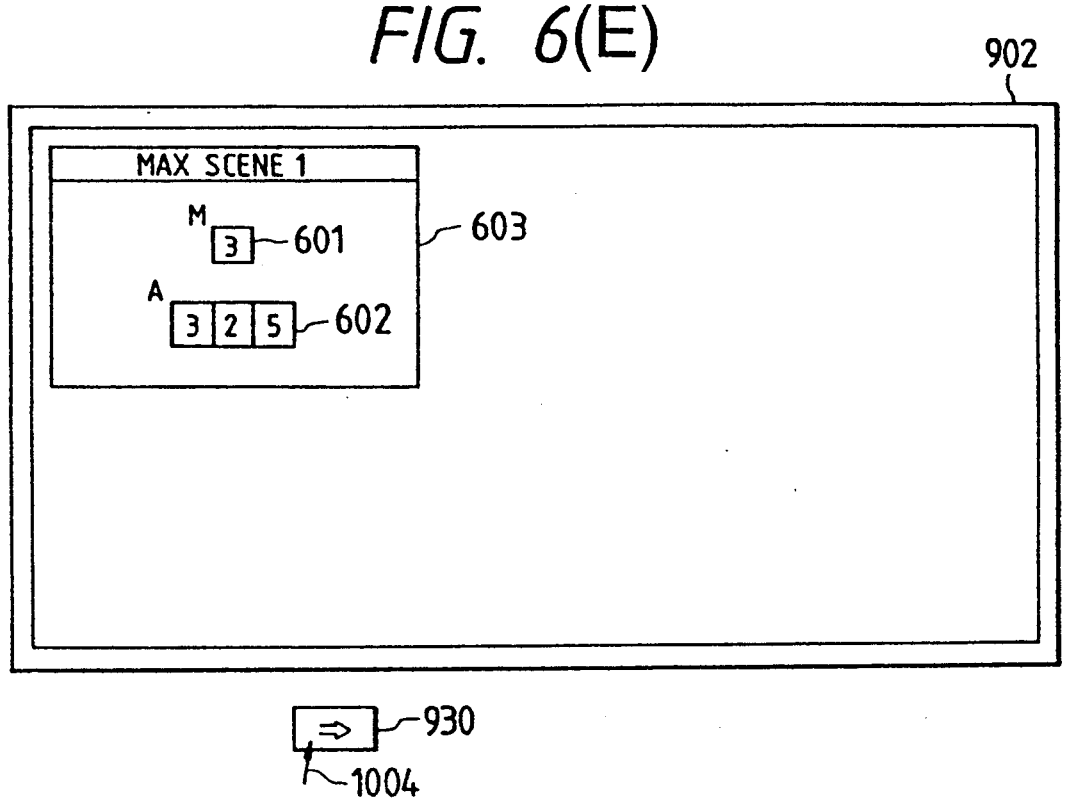
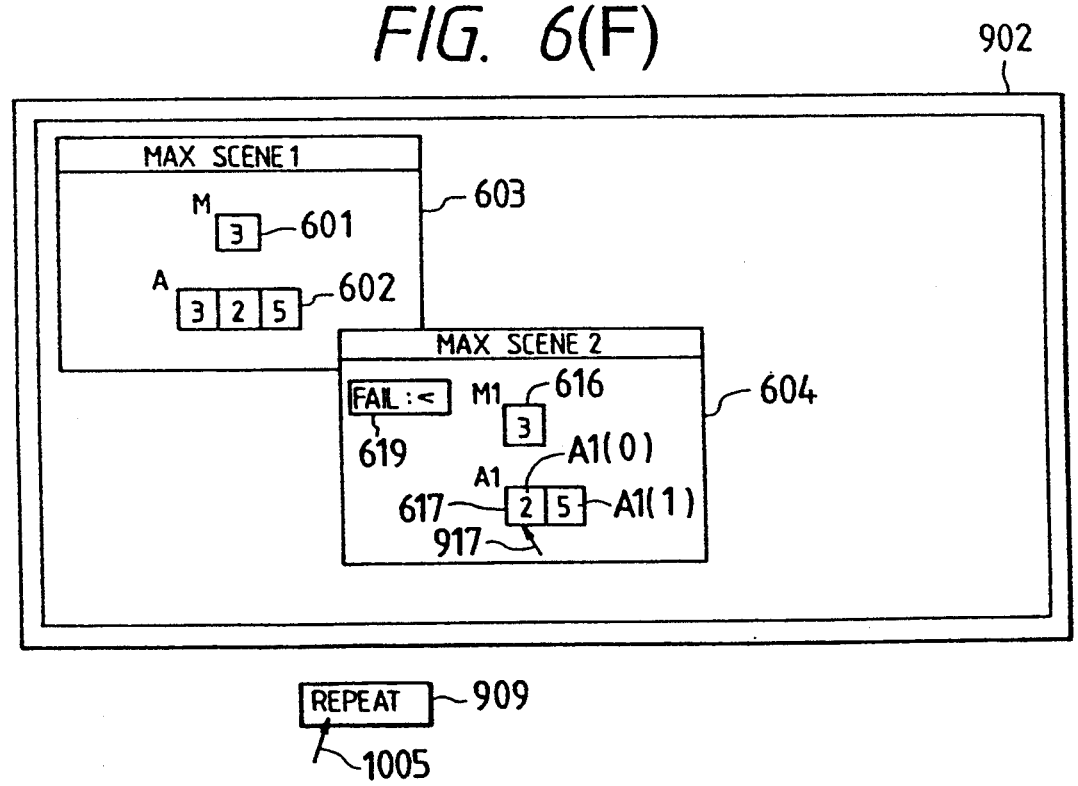

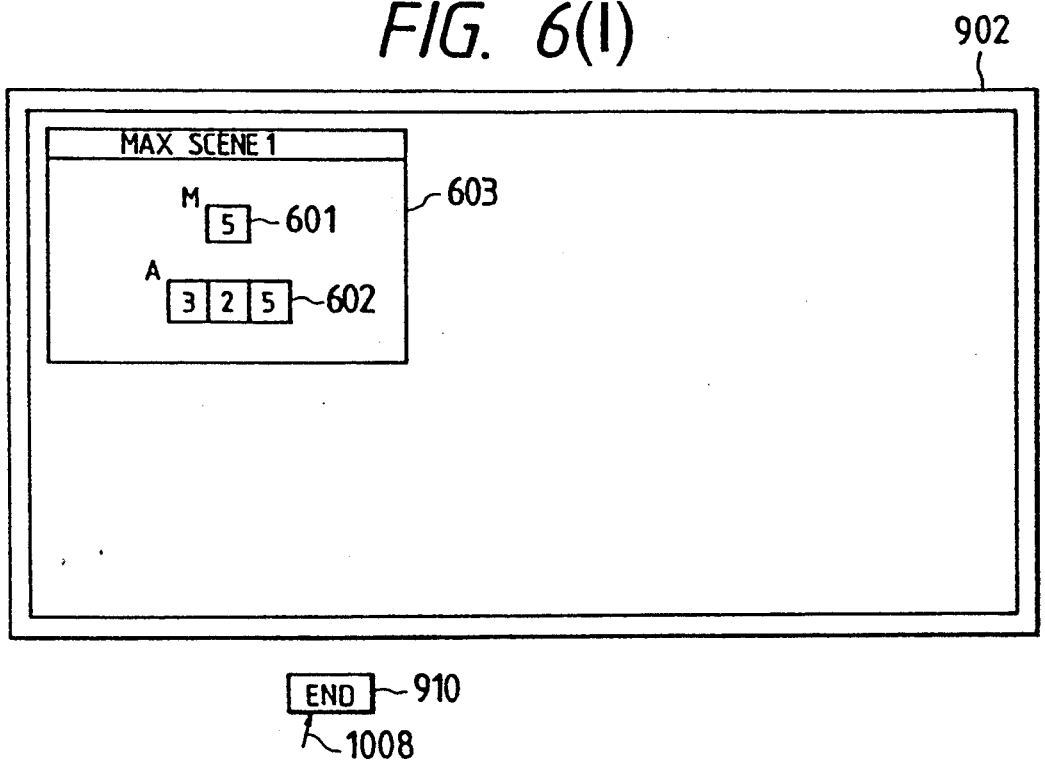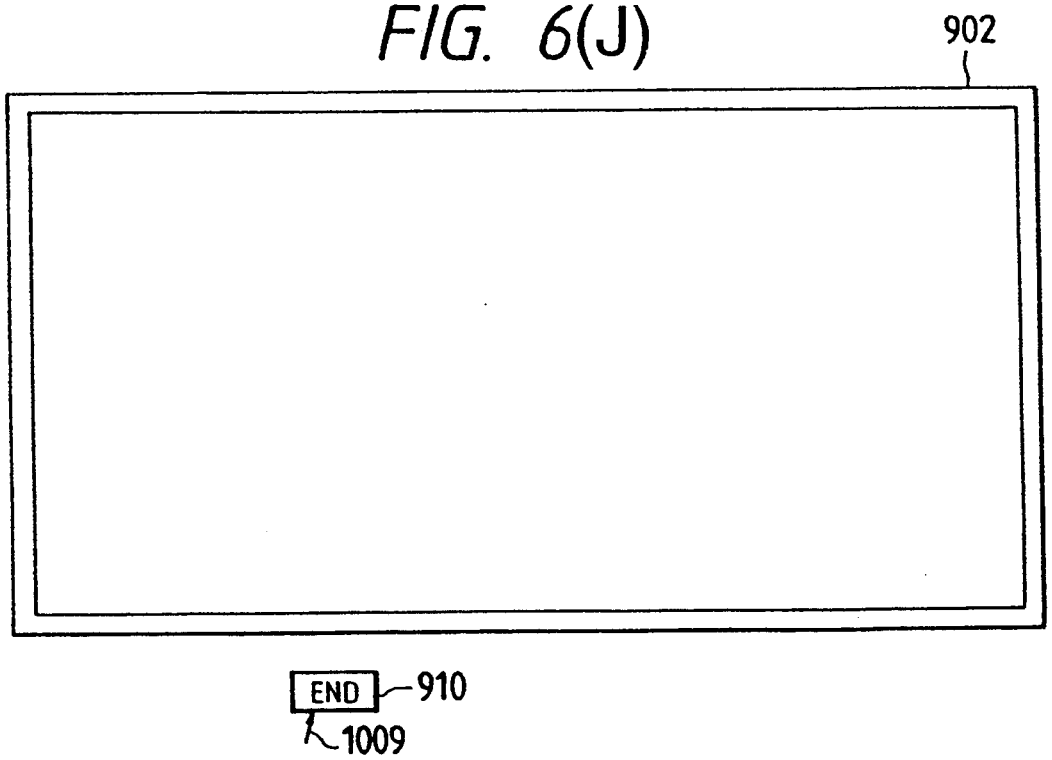

FIG. 8

PROCEDURE MAX_SCENE 1 (M:INTEGER, A[0..N1]: ARRAY OF INTEGER); —801

BEGIN —802

IF NOT (M<A[0]) THEN CALL MAX_SCENE 2 (M, A[0..N1]); —803

M := A[0]; —804

IF NOT (0<N1) THEN CALL MAX_SCENE 2 (M, A[0..N1]); —805

CALL MAX_SCENE 1 (M, A[1..N1]); —806

END; —807

PROCEDURE MAX_SCENE 2 (M1: INTEGER; A1[0..N2]: ARRAY OF INTEGER); —808

BEGIN —809

IF NOT (0<N2) THEN CALL MAX_SCENE 3 (M, A[0..N2]); —810

CALL MAX_SCENE 1 (M, A[1..N2]); —811

END; —812

PROCEDURE MAX_SCENE 3 (M2: INTEGER, A2[0..N3]); —813

BEGIN —814

END; —815

FIG. 11
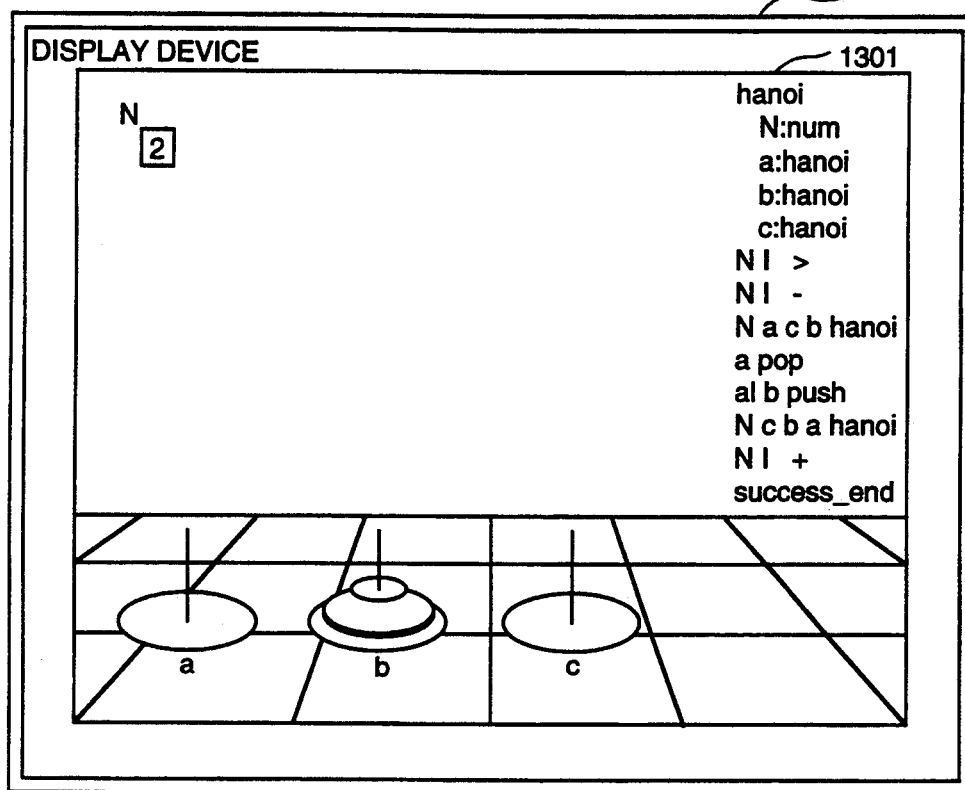
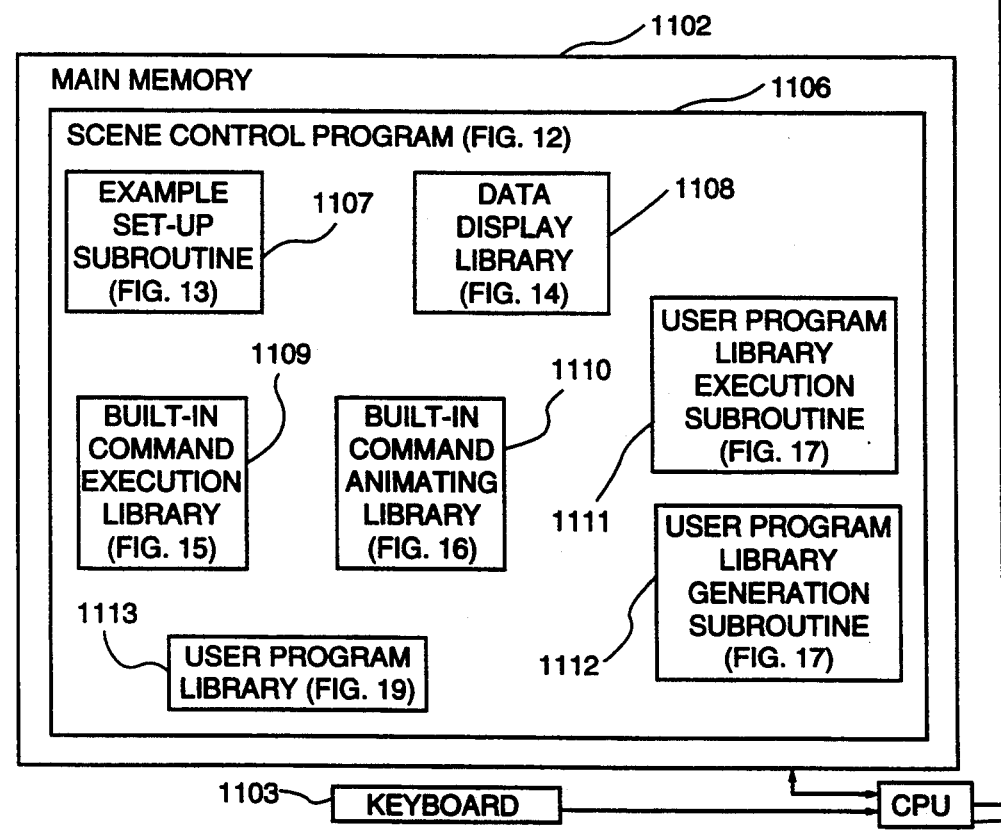

F I G. 20
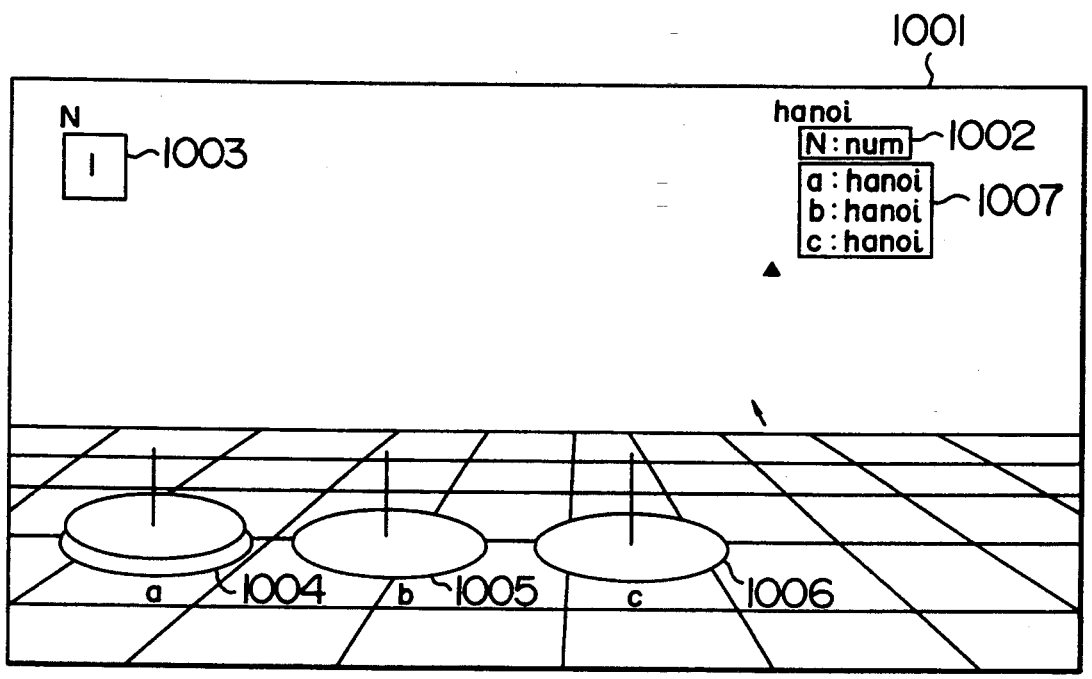
F I G. 21
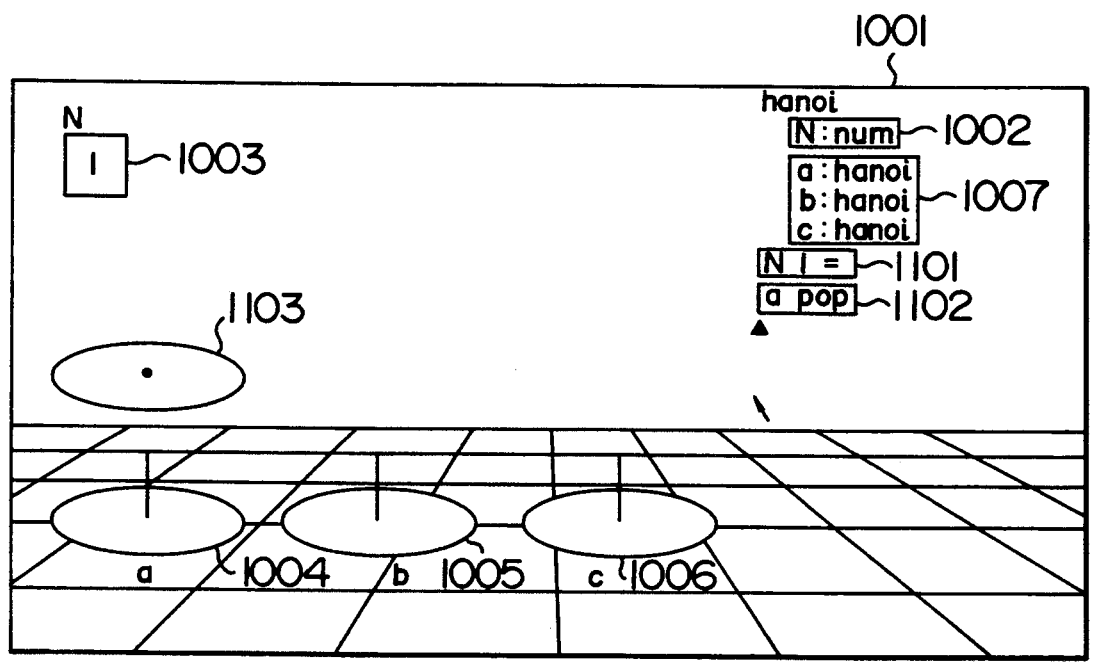

```
(DEFUN HANOI (H1 H2 H3 I J K)
   (COND ((NULL H1 'END)
         (T (HANOI (CDR H1) H3 H2 I K J)
            (PRIN2 I)
            (PRIN2 "to")
            (PRINT J)
            (HANOI H3 (CONS (CAR H1) H2) H1 KJ I)
```

```
(HANOI (2 1) ( ) ( ) 1 2 3)
   1 to 3
   1 to 2
   3 to 1
END
```

METHOD FOR VISUAL PROGRAMMING WITH AID OF ANIMATION

This application is a continuation-in-part application of two U.S. patent applications, one of which is Ser. No. 07/589,405, filed Sep. 28, 1990, and the other of which is Ser. No. 07/461,083, filed Jan. 4, 1990, now abandoned, which is in turn a continuation-in-part application of U.S. Ser. No. 07/266,079, filed on Nov. 2, 1988, now abandoned, which continued as U.S. Ser. No. 07/595,747, filed on Oct. 9, 1990, now U.S. Pat. No. 5,287,449.

BACKGROUND OF THE INVENTION

Conventionally, there have been methods to raise the efficiency of making a program by visualization using diagrams such as a flow chart, PAD (Program Analysis Diagram), and the like. The flow chart, PAD and the like facilitates the comprehension of a program by illustrating two dimensionally the controlling flow of a conditional branch or iteration loop in the program. However, any data that the program manipulates cannot be visualized.

Real data has been manipulated in spreadsheets, e.g., as commands and formulas are entered in displayed boxes.

On the other hand, a method using icons whereby the icons symbolizing abstract data that a program manipulates or uses in procedures can be displayed visually in order to facilitate the making of the program is described in IEEE software, Vol. 4, No. 1, pp. 29-39 (1987).

SUMMARY

With the above-mentioned conventional technique, the structure of the data that a program processes is visualized two-dimensionally in order to facilitate comprehension. However, the icons which represent the data are abstract, and do not represent any value specifically. If, for example, an array data is processed in a program, such an array data is shown as a rectangular icon, but the number and values of elements of the array and so forth are not displayed.

Generally, it is easier for persons, particularly those who are not in the art of programming to think out required processing procedures based on a specific example than to think them out abstractly. In the case of making a program visually, therefore, it is also more effective when a program can be made in accordance with specific examples.

Nevertheless, if a program is made in accordance with given specific examples, it is readily apparent that the program is only executable on the examples but not on any other examples. In other words, there arises a problem in that no versatile program can be produced. Now, for example, assume that a program is being made in accordance with an example whereby a number of smaller value of two given numbers is subtracted from a number of larger value (i.e. to obtain the absolute value of the difference). When the numbers are 5 and 3, as an example, they are 5>3, and the second number can be subtracted from the first number. However, when the numbers are 2 and 6, the program cannot be correctly executed by subtracting the second number from the first number.

The object of the present invention is to provide a method of making a versatile program based on an example displayed visually.

To achieve the above-mentioned object, a program comprises a plurality of subprograms, and there are provided an example setting command by which input data having a specific example value is produced and displayed as an icon, and a data manipulating command by which a manipulation including comparison and calculation of the input data is executed and when the manipulation is successfully executed or the result of the manipulation results in failure, a jump to another subroutine takes place.

In accordance with an example of a program mentioned above which calculates the absolute value of a difference between two numbers, the function of the above-mentioned solution will be described. First, the above-mentioned program is prepared to comprise two subprograms each to carry out calculation respectively where the first number is greater and where the second one is greater.

The first subprogram sets up, for instance, numbers 5 and 3 by the command to set up an example and displays the example as an icon in a scene window corresponding to the first subprogram. Next, with the comparison command, one of the data manipulation commands, 5>3 is confirmed. Then, with the subtraction command which is also one of the data manipulation commands, 3 is subtracted from 5 and a resulting rectangular icon having therein the numeral 2 is obtained.

The second subprogram set up, for instance, numbers 2 and 6 with the command to set up an example and displays the example as an icon in the scene window corresponding to the second subprogram. Then after 2<6 is confirmed by the comparison command, a resulting icon "4" is obtained by the subtraction command.

Now, when 1 and 4 are given to the above-mentioned program as input data, the first subprogram will try to see if the data satisfies 1>4. However, this operation of comparison fails, and therefore, the execution, by a conditional branch, goes to the second subprogram which confirms now the data is 1<4. Then, the comparison is carried out successfully with the result that an icon "3" is obtained by the subsequent subtraction.

Thus, by the above-mentioned solution, it becomes possible to make a versatile program in accordance with the setting of an example.

BRIEF DESCRIPTION OF THE DRAWINGS

Further objects, features and advantages of the present invention will become more clear from the following detailed description of a preferred embodiment, shown in the drawing; wherein:

FIGS. 5(a)–(c) illustrate the structure of the example of storage of data;

FIGS. 6(A)–(J) show the process of making MAX program;

FIG. 8 is a view showing an example of program codes;

FIG. 11 is a block diagram of a system for reading a program making method according to another embodiment of the present invention;

FIG. 15 shows a built-in command execution library as a group of flow charts showing the operations of a group of subroutines in;

FIGS. 20 to 22 are views showing different display screens in a process of the making of a program for solving the problem of Hanoi tower when the number of saucers to be moved is 1;

DETAILED DESCRIPTION OF PREFERRED EMBODIMENT

Figure 9:
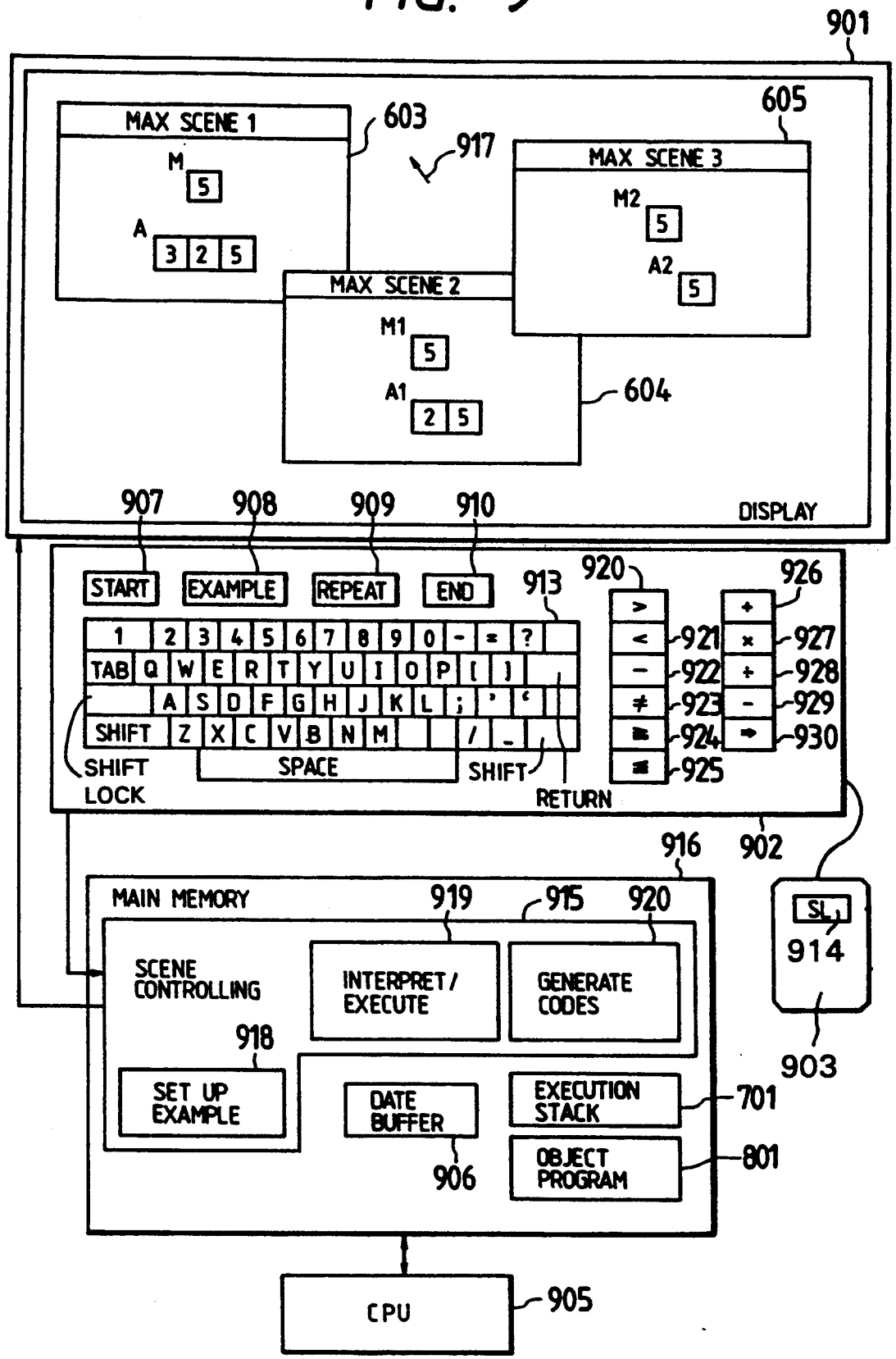
FIG. 9 is a view illustrating the structure of the system of the present invention.

As shown in FIG. 9, the system comprises a keyboard 902 and a mouse 903 with a button 914 for inputting commands, a display 901 to show the state of data two-dimensionally, scene controlling program 915, data buffer 906, execution stack 701, main memory 916 for storing, object program 801, and a CPU 905.

On the keyboard 902, a group of special keys 907–910 and 920–930, each corresponding to a respective command, and a group of usual alphanumeric keys 913 for inputting data are installed.

Figure 1:
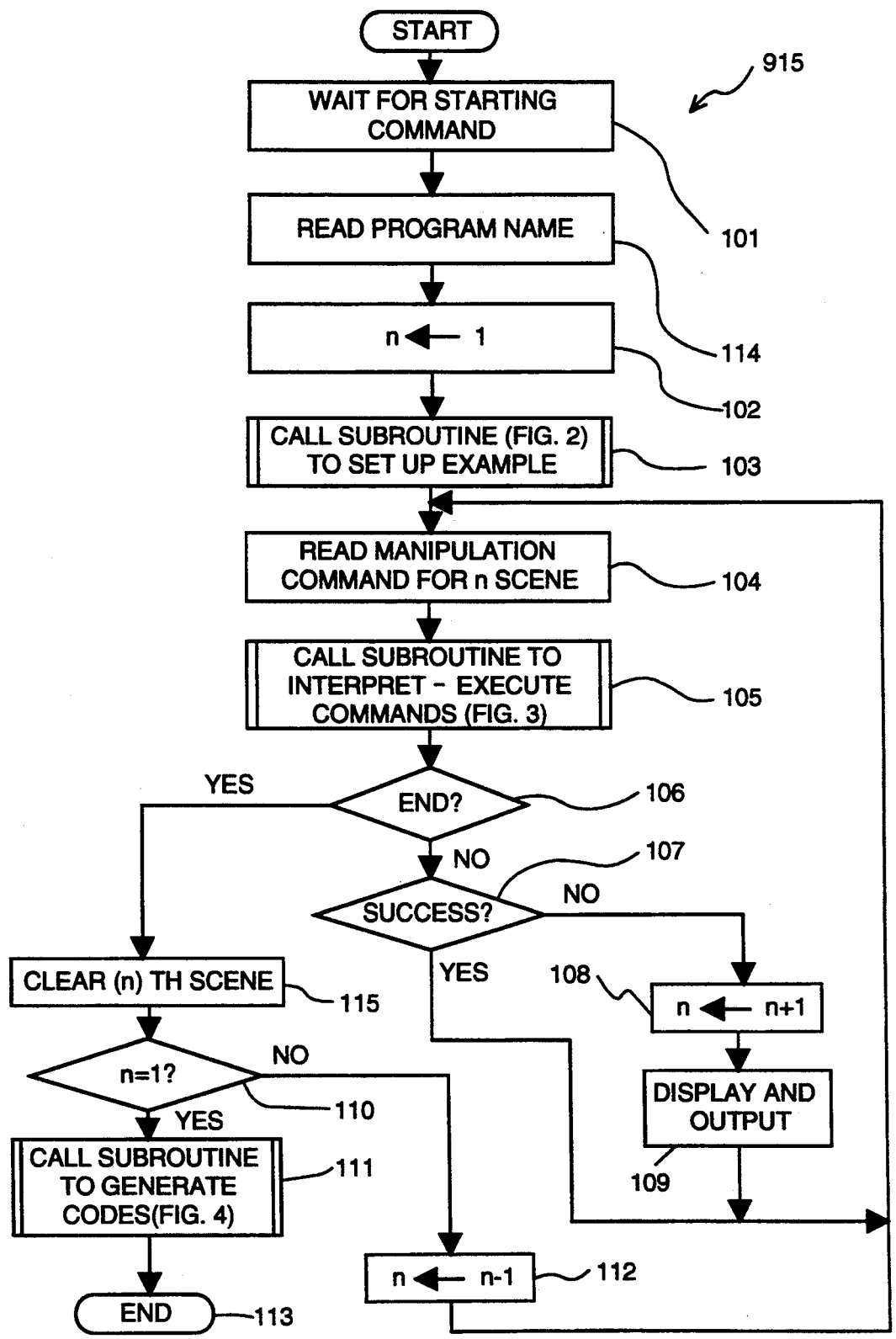
FIG. 1 is a flow chart showing an embodiment of the present invention.
Figure 2:
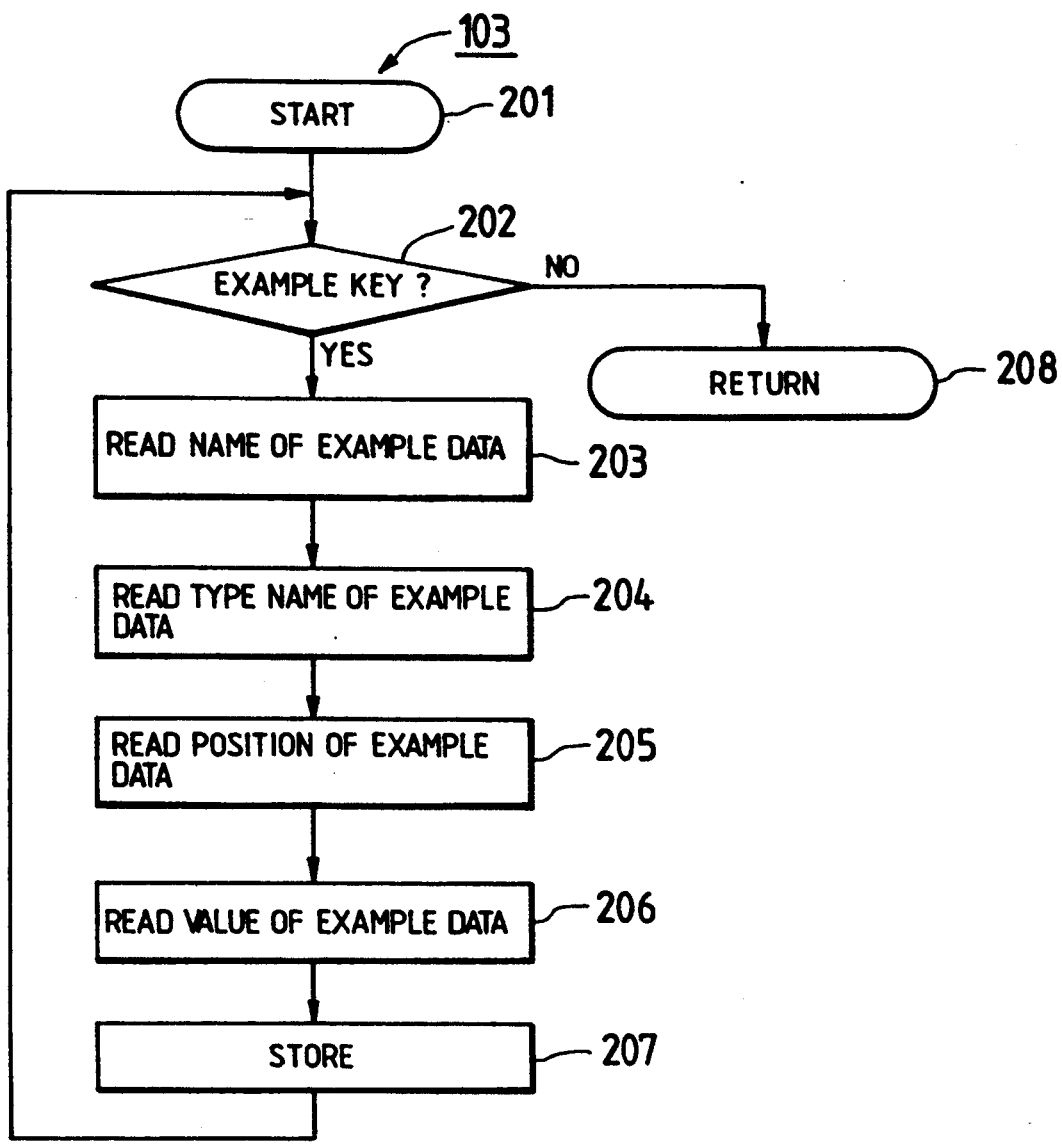
FIG. 2 is a flow chart showing a subroutine to set up the example shown in FIG. 1.

The scene controlling program 915 (FIG. 1) comprises a subroutine to interpret and execute commands (FIG. 3), a subroutine to generate codes (FIG. 4), and subroutine to set up examples FIG. 2).

With reference to FIGS. 6(A)–(J) an example of programming by the method for making a program of the present invention will be describe.

FIGS. 6(A)–(J) illustrate a process of making a program called MAX, by the present invention, which is a program obtaining the maximum value of an array A (602) at integer M (601). Scene windows 603, 604, 605 are shown on the CRT display 901.

In the initializing state, nothing is shown on the display 901. Now, the programmer can provide an instruction to start making a program (FIG. 6(B)) by entering a program name "MAX" from the keyboard 902 after depressing the start command key 907 (input operation 1001).

Figure 6A:
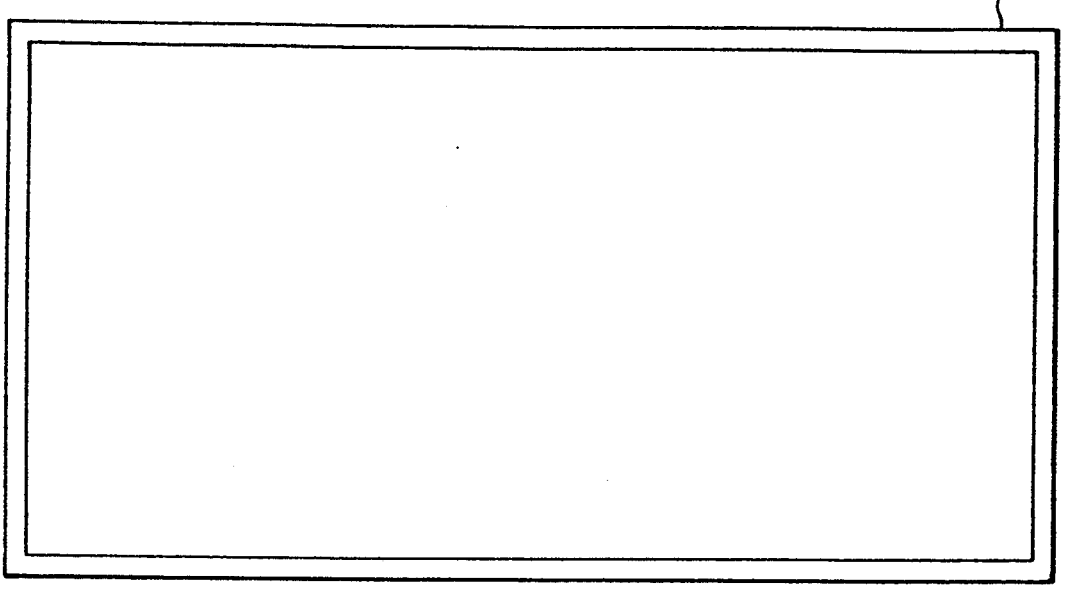
Figure 6B:
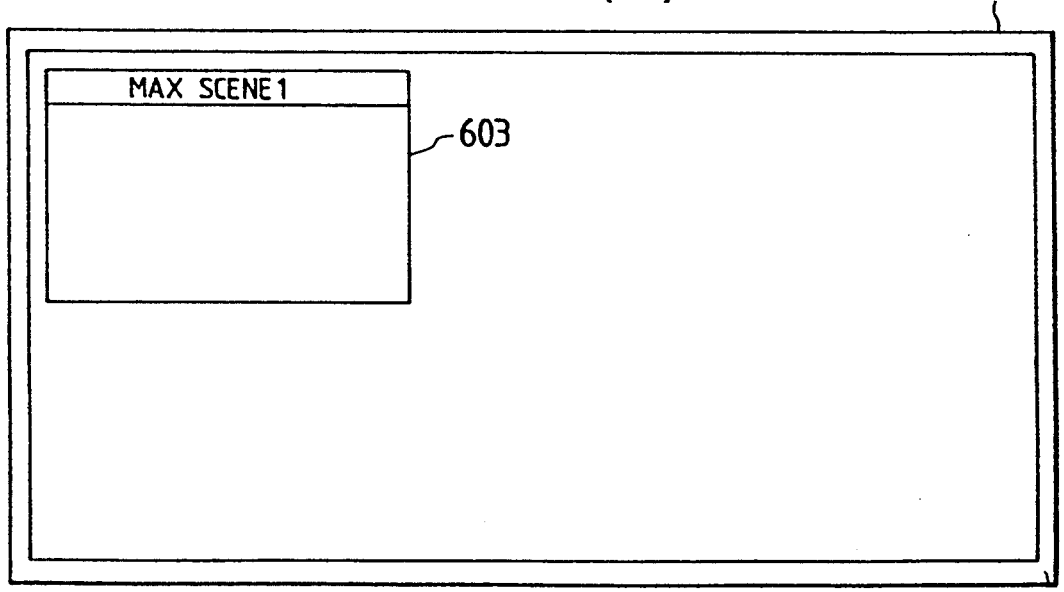
Figure 6C:
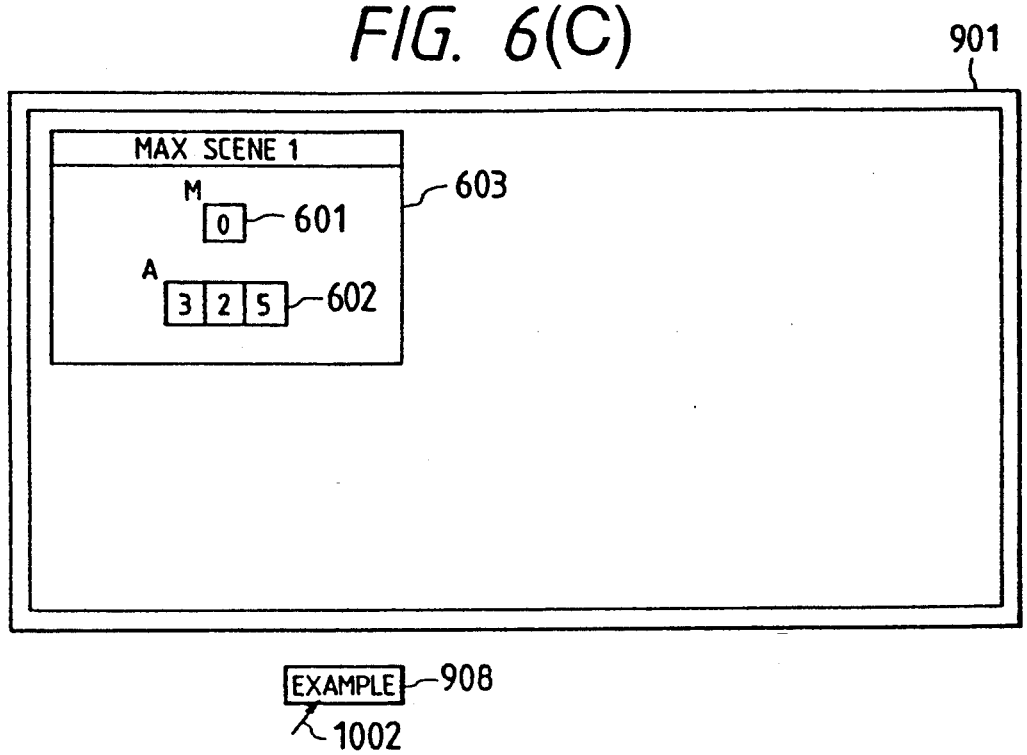

Next, the operation proceeds to set up an example by depressing the example command key 908 (input operation 1002). Specially, as shown in FIG. 6(C), icons 601 and 602 representing respectively object data, e.g., the integer data M and subject data, e.g., the array data A which are required to make MAX program are first placed in the scene 603 automatically in response to depression of command key 908. Next, the programmer specifies the integer M and the first element of the array A[0] (hereinafter described as A[i] to specify an A's ith element) by the mouse 903 in that order. To specify the data, the cursor 917 is moved into an icon representing that data on the display 901 by handling the mouse 903 and then the button 914 is depressed and released immediately (this operation is generally called a click). As the example values for M and A, 0 is set for M and 3, 2, and 5 are set for A (0), A(1) and A(2) by entry from the keyboard 913. Also, through the key group 913 in response to a screen prompt (not shown), the kind of data for M and A are entered. In this case, the word "INTEGER" is entered as the kind for M and the word "ARRAY" for that of A. The positions of icons 601 and 602 to be displayed are entered by the mouse 903. The example values are also entered by the programmer through the key group 913. The example of a data value is thus set up prior to a coding subroutine of a program and automatically in response to judging results. This is one of the characteristics of the present invention. According to some of the conventional methods for making a program, such data as M or A has necessarily been manipulated abstractly with its value remaining unknown.

A command "<" to compare the two numbers, to determine which is large and small is entered through the keyboard by depressing command key 921 (operation 1003). This command entered by key 921 compares to see if input M is smaller than A[0]. When the system receives this command of key 921, it examines the large-small relation in accordance with the example values which are currently 0 for M and 3 for A[0]. The relation, therefore is M<A[0], meaning a success in the comparison, which permits an icon having an arrow shape 607 to appear in FIG. 6(D) to indicate that A[0] has satisfied a required condition.

Thus, according to the method for making a program of the present invention, an interpretation and execution can immediately be carried out on the data manipulation command issued by the programmer, which uses the example value of the data available at the time of execution, and the result thereof is shown to the programmer. Therefore, the programer can proceed to the next step while constantly examining whether or not the operation has brought about a result as anticipated. This enables the programmer to conduct the programming efficiently.

Now, because of the successful comparison, the programmer depresses the calculation command key 930 (input operation 1004). The command→produced by key 930 is meant to assign the value of A[0] to M, and the system will in turn assign the example value 3 of A[0] to M. As a result, the example value of the integer M changes to be 3 as shown in FIG. 6(E).

Then, the programmer specifies the remaining data in the array A to be processed namely A[1] and A[2] by moving the cursor 917 into A[1] by handling the mouse 903 and then the button 914 is depressed. Then, while the button is being pressed, the cursor 917 moved into A[2], and the button 914 is released (this operation is generally called a drag). The repeat command is entered by depressing command key 909 which is meant to iterate the data manipulation defined up to now, i.e. FIGS. 6(D)~(F), for M and A(1), A(2) (the local array comprising A's 1st and 2nd elements). When the system received the repeat command 909, it automatically iterates for the previously entered data A(1:2) and M1 the interpretation and execution by issuing automatically the commands 921, 930, and 909 in that order (operation 1005). In this respect, it must be noted that the manipulation of the data specified by the commands may fail while the interpretation and execution is being carried out. In the MAX program, the compare command 921 is first applied to M and A[1] during iteration required by the repeat command 909. Since the example values for M and A[1] are 3 and 2 respectively, the expression 3<2 does not justify itself, resulting in a failure of the command comparison 921 in its operation to confirm the large-small relation.

In such a case, the system knows the presence of a data array which the commands inputted so far of the program cannot manipulate, and automatically makes and displays a new scene 604 as shown in FIG. 6(F). In the scene 604, the integer M1 (616) and the array A1 (0:1) (617), which are the data at the time of the failure of the comparison command 921, are shown. M1 and A1 (0:1) are the respective copies of M and A(1), A(2), the object data of the repeat command 909 in the 1st scene 603. The message 619 informs of the failure of the large-small comparison command <.

The programmer can proceed with making the program with the data A1 and M1 in the displayed second scene 604 as the example of entered data. The second scene 604 represents the case where M1 is the larger of M1 and A1[0]. Since A1[0] cannot be the maximum value in the array, it can be ignored. Then, by the mouse 903 the programmer specifies M1 and A1[1] as the remaining data of the array after M1 A1(0:1) other than the ignored top element A1(0) of A1(0:1), and continues processing by issuing the repeat command 909 again (input operation 1006).

In repeating the commands described so far, in response to the new input operation 1006, the comparison command "<" 921 issued in the scene 603 is first executed, and since M1 is 3 and A1[1] is 5, the expression M1<A1[1] is justified, resulting in a success of this command. Therefore, after the value of A1[1]=5 has been assigned to M1 by the assignment command 930, the repeat command 909 is again executed (operation 1006).

However, this repeat command 909 will fail because, although the repeat command is being issued for the integer and the local array, the remaining local array cannot be selected any longer once the array length becomes 1. Consequently, the scene 605 showing a new status is automatically generated and displayed as shown in FIG. 6(G). The message 624 informs of the failure. In this case, since the element of A2 (623) is only one, the maximum value of A2 is already given to M2 (622). In other words, this scene has the maximum value correctly, i.e. the object has been attained, and the programmer can now terminate the coding of the scene 605 by depressing the end command key 910 (input operation 1007) of FIG. 6(H).

Figure 6D:
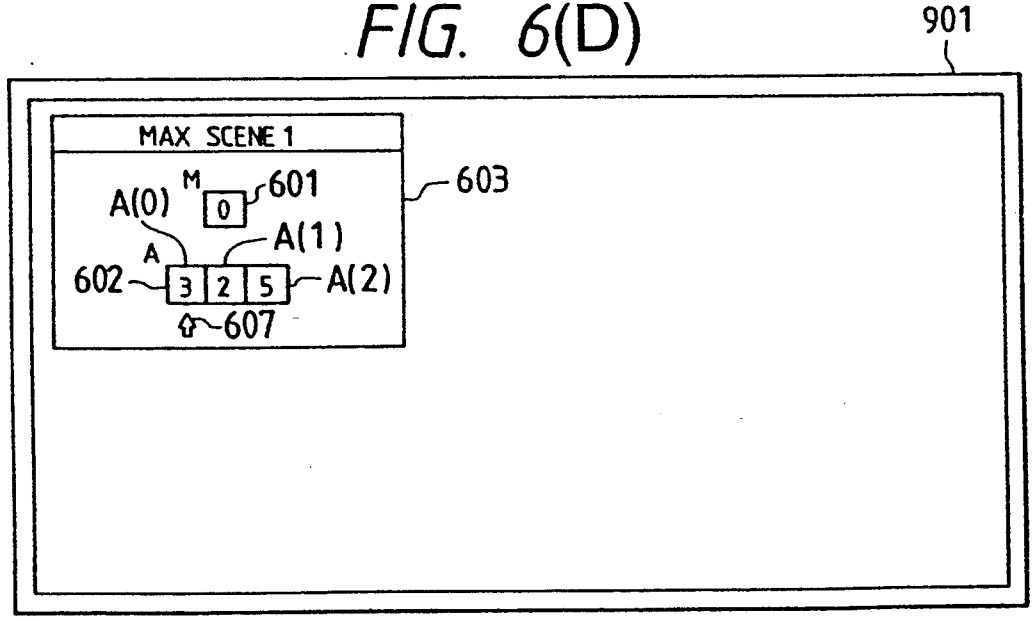
Figure 6G:
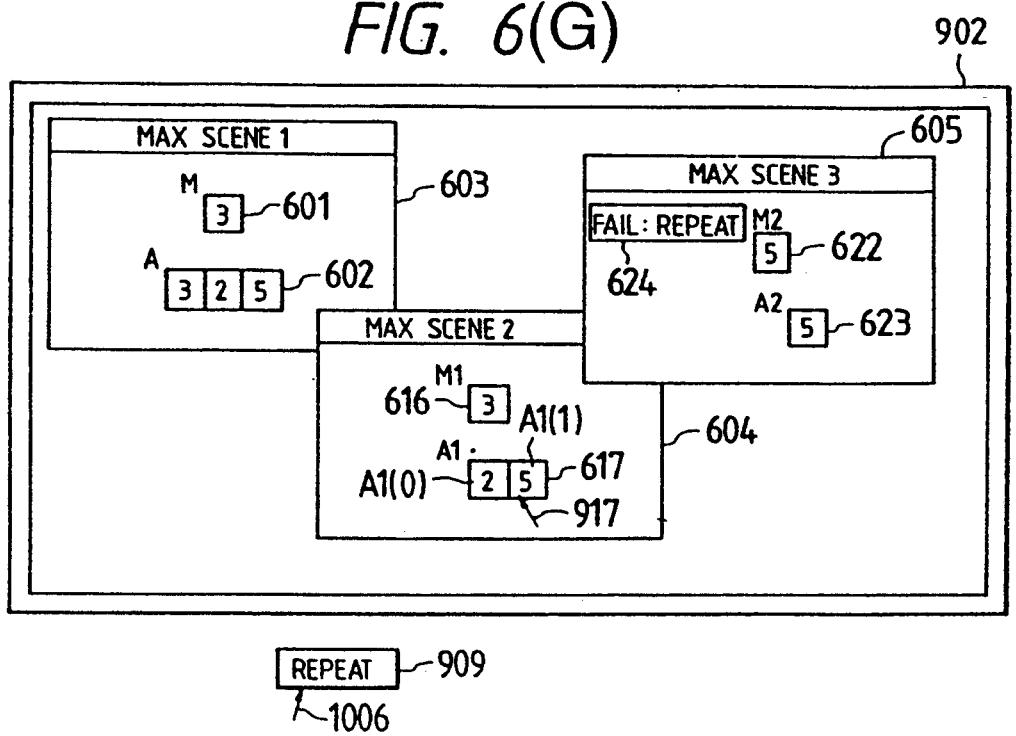
Figure 6H:
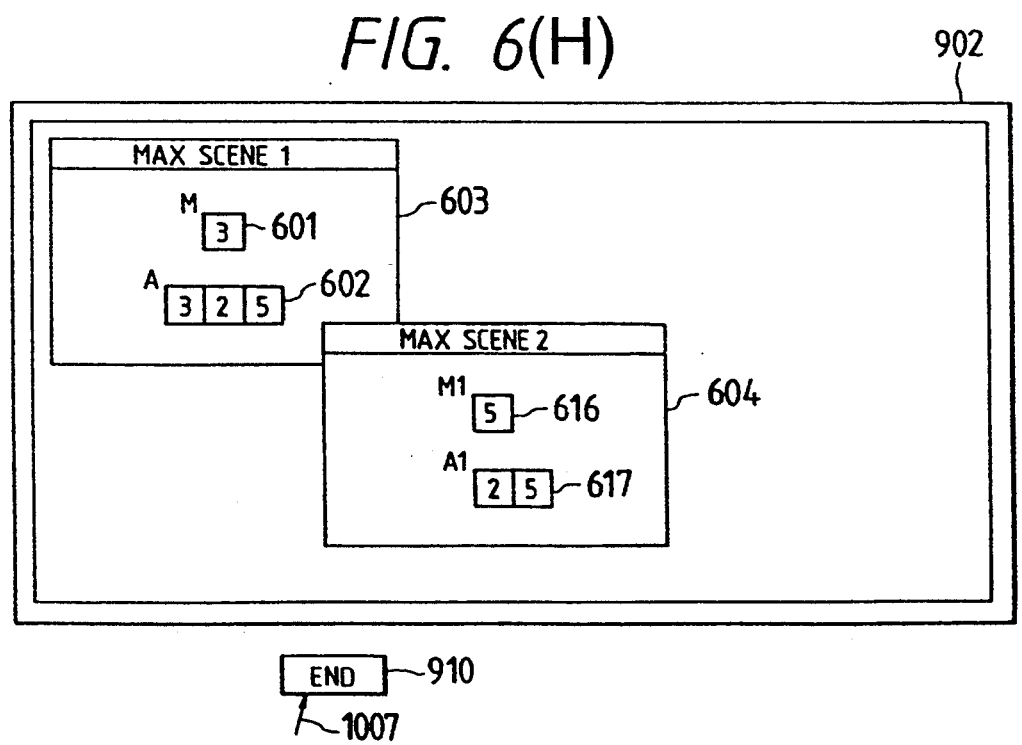

FIG. 6(H) shows the status at end of the operation 1006. In this scene 604, the maximum value M1 of the array A1 has seen obtained. Therefore, the coding of the scene 604 is also terminated by issuing the end command 910 (input operation 1008). M1 is transferred to M. Then, the first scene 603 is only displayed because the repeat command 909 issued in the operation 1005 by which the second scene was generated has come to an end by this end command 910 as shown in FIG. 6(I). Likewise, since the scene 603 has obtained the maximum value 5 of the array A at the integer M, the command input or coding of the scene 603 is also terminated by the end command 910 issued for the scene 603 (input operation 1009). As a result, the codings or command input of the entire scenes are now completed so that the computer system can generate an object program as shown in FIG. 8 in accordance with the history of the process, i.e., input operations through which a MAX program such as shown in FIG. 5 has been produced. Thus, the making of a MAX program has been completed (FIG. 6(J)). Although the MAX program has been produced on a specific example, the object program thus obtained is able to function correctly in accordance with any arbitrary M and A.

As set forth above, according to the present invention, the process of making a program is characterized in that a specific example value is given as data and data manipulation is carried out based on the example value thus provided with automatic prompting for branching as needed.

Now, the details of the method for making a program of the present invention will be described in accordance with the MAX program shown in FIGS. 6(A)–(J) as an example with reference to flow charts shown in FIGS. 1~4, diagrams of FIGS. 5 and 7 representing the structures and changes of the data within the system, and the codes of an object program shown in FIG. 8.

FIG. 1 is a flow chart representing the entire procedures of the method for making a program of the present invention.

When the making of a program is started, pressing start button 907 moves the program from step 101 to step 114. Entry of the program name from the keyboard in response to a screen prompt moves to step 102, where the value 1 is initially set at a variable n (step 102). Then, an example data for the 1st scene is set up in accordance with an input by the programmer, which can be carried out by calling the subroutine of FIG. 2 for setting up an example, step 103 of FIG. 1.

FIG. 2 shows the flow of the subroutine for setting up an example according to subroutine 918 of FIG. 9. As shown in FIG. 2, when the getting up of an example data is started (step 201), the system determines if the programmer depressed the example command key 908 or not (step 202). If the example command key 908 is not depressed, the setting up is terminated (step 208). If the key 908 is depressed, a name of example data (M, A, or the like), a type (integer, array or the like), the position of an icon representing the data, and an example value are read from the keyboard 902 (step 203–206), and each information thus read in is stored in an inner table called the example data table step 201); see step 505 of FIG. 5. Then, the above-mentioned steps are iterated as far as any example data exists, and finally, the setting up of an example data will be completed.

An example of the example data table is shown as 505, 506, and 507 in FIG. 5. Each entry of the example data table represents one example data respectively as shown in FIG. 5. For example, the top entry of the example data table 505 is named M, showing that the data is such that its type is INT (integer), the position of the icon is the position 1 on the display 901, and the example value is 5. Also, the next entry is named A showing that the type is ARR (array), the position of the icon is the position 2, and the example value has 3 elements having the value 3, 2, and 5 respectively.

When the setting up of the example data is over, a data manipulation command from the programmer for the example data in the 1st scene, such as the comparison command 921 or the assignment command 930 shown in FIG. 6(D) and (E) is read in as step 104 in FIG. 1. Then, in step 105 of FIG. 1 the subroutine of FIG. 3 to interpret and execute commands 919 is called to interpret and execute the command thus read in and to carry out its interpretation.

Figure 3:
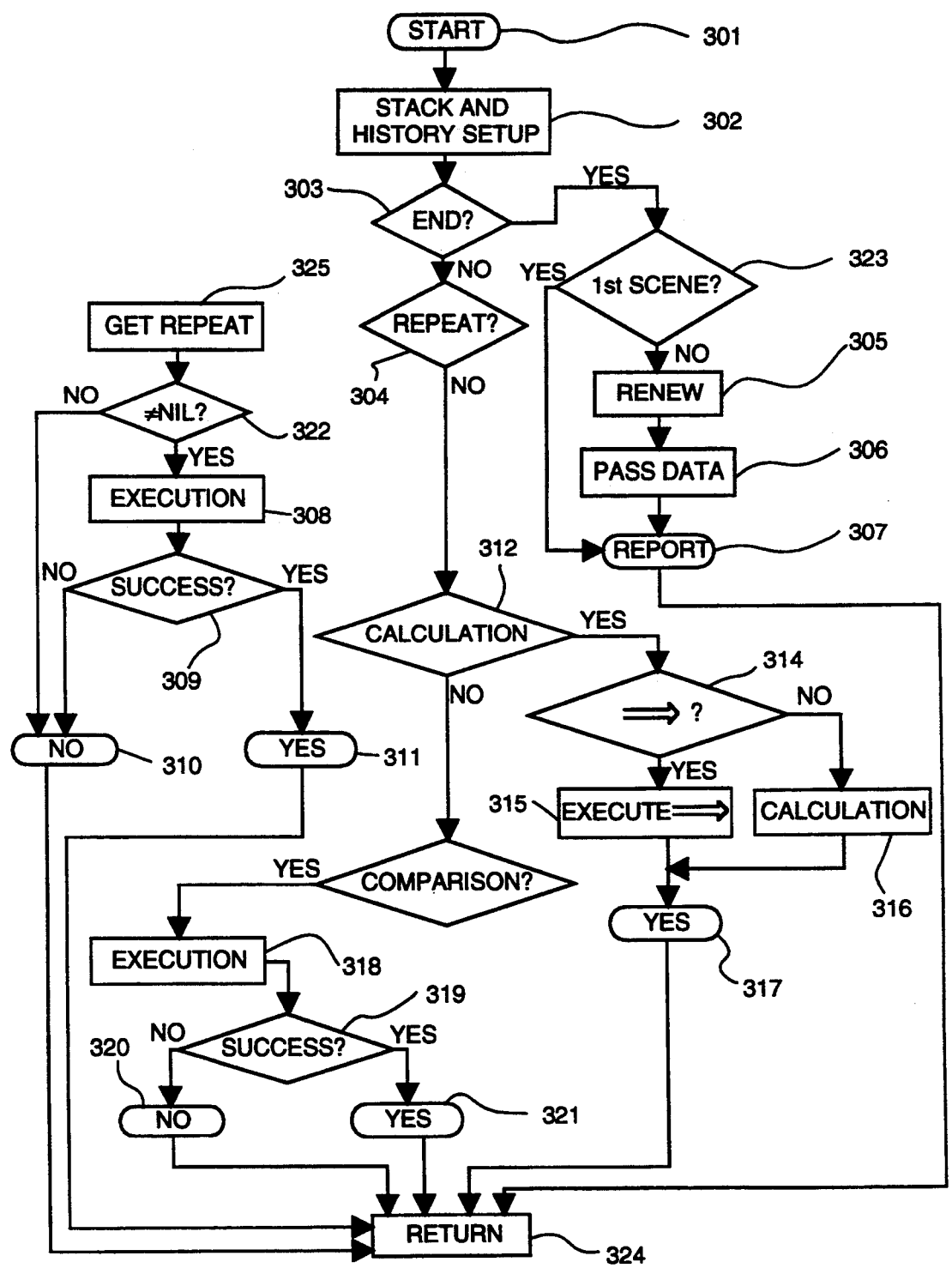
FIG. 3 is a flow chart showing a subroutine to interpret commands.

FIG. 3 shows the flow of the subroutine to interpret commands 919 of FIG. 9. As shown in FIG. 3, when the execution of the command to interpret is started (step 301), the argument of the command (for example, the values 0 and 3 of M and A[0] for the command 921 in the scene 603) and ">" which is the entered command itself are stacked in the execution stack within the system. At the same time, this command and the argument are stored in the manipulation history table 508 (FIG. 5(a)) (step 302). The value of the argument stacked in the execution stack 701 is withdrawn from the example data table of FIG. 5.

Figure 7A:
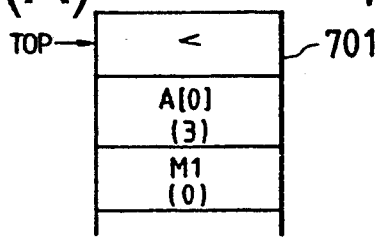
FIG. 7(A)–(K) show the changes in an execution sack.

Examples of the manipulation history table are shown as 508, 509, and 510 in FIGS. 5(a), (b), (c). Each entry of the manipulation history table corresponds to each one of the data manipulation commands respectively as shown in FIGS. 5(d)–(c). For example, the top entry of the manipulation history table 508 stores information such that the command "<" and its argument is integer M and array element, A[0]. Also, the execution stack 701, in which the first comparison command 921 and its argument are stacked, is shown in FIG. 7(A).

The command is first judged to see if it is the end command (step 303). If the result of the judgment shows that the command is not the end command, it will be judged to see, next, if it is the repeat command (step 304). If the result of the judgment shows that it is not the repeat command, then it will be judged to see if it is any one of the calculation commands such as addition, subtraction, multiplication, or division (+, −, ×, /) or assignment (→) or the like (step 312). If it is not any one of the calculation or assignment commands, then it will be judged to see if it is any one of the comparison commands (<, >, =, </=, >/=, <>) or not (step 313). The command 921 is a comparison command, and if it is used, an argument in the execution stack 701 will be withdrawn, and a comparison will be carried out, that is, execution of (step 318).

Figure 7F:
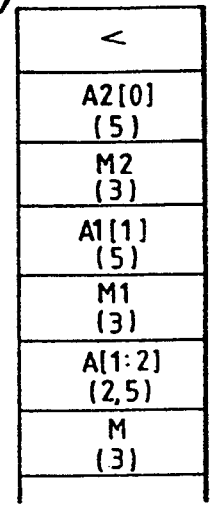
Figure 7B:
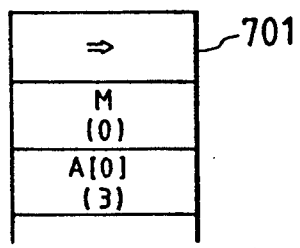

As a result of the comparison, the condition is examined to see if it is successfully met (step 319). If the condition is met, a success signal or report "YES" is made (step 321), and if not, a failure signal or report "NO" will be made (step 320). The command 921 in the first scene 603 is successful as the condition (M<A[0]) is met and, therefore, a success report will be made and step 324 will return flow to step 106 of FIG. 1. As an example of the calculation commands where flow is from step 312 to step 314 of FIG. 3, the assignment command 930 in the case of the operation 1004 in the scene 603 is examined. In this case, the status of the execution stack 701 after the judgment 304 is changed as shown in FIG. 7(B) (after data is withdrawn from the stack, such data will not remain in the stack, and therefore, the comparison command and its argument are not left in the stack). Now, in the case of the assignment command 930, the value 3 of the 1st argument A[0] in the execution stack 701 is assigned through the judgment 314 to the example field in the entry of the example data table 505 which corresponds to the 2nd argument (M) (execute step 315), and the successful manipulation is reported (step 317). If the judgement of step 314 is one of no assignment, then calculation is executed in step 316, with completion of calculation being reported in step 317 prior to return in step 324 to step 106 of FIG. 1. The calculation involves withdrawing the argument from the stack, computation and sending the result to the stack. The manipulation step 3 15 involves withdrawal of the argument from the stack and assigning the first argument as the example value of the second argument.

Figure 7C:
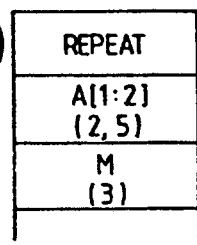
Figure 7G:
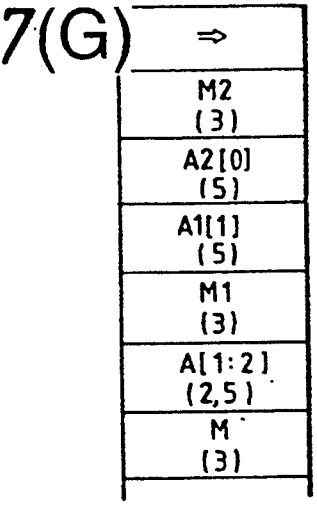
Figure 7D:
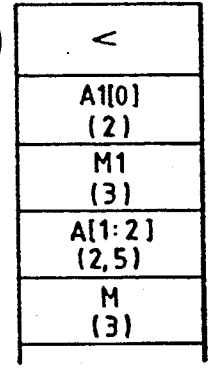

As an example of the repeat command, the command 909 in the case of the operation 1005 in the scene 603 is examined. In this case, the status of the execution stack 701 is such as shown in FIG. 7(C). In the case of the repeat command, the operation which has been carried out will be iterated from the beginning. In other words, the stored commands in the manipulation history table 508 in the 1st scene are withdrawn (step 325) from the top to interpret them sequentially. In the case of the repeat command 909 in the operation 1005 in the 1st scene 603, the comparison command 921 is stored at the top of the table 508 by the operation 1003. Therefore, this command is withdrawn to be interpreted in step 322; if the repeat is a nil, NO success will be reported in step 310 with flow passing to return step 324, otherwise flow is to step 308. In other words, by the step 302 the command and its argument are stacked in the execution stack 701 in such a status as shown in FIG. 7(D). Then, the execution of the interpretation will follow in step 308. As shown in FIG. 7(D), if any one of the previous commands is again executed by the repeat command, the argument should be renamed in such a manner as A[1:2]→A1]0:1], M→M1. This is necessary to distinguish the argument M, A[1:2] of the repeat command from the argument M, A[0:2] of the MAX program. Also, when the command group stored in the manipulation history table by the repeat command is sequentially executed again, there will be no need for registering these command groups again in the manipulation history table. Therefore, there is nothing that will be added to the table (step 302).

As shown in FIG. 3, the result of the interpretation of a certain command is reported as a success or a failure and control flows to step 324 for return from the subroutine.

If the result of the judgement in step 303 is that there is an END, then judgement step 323 determines if processing is in the first scene. If it is, flow passes to step 307, and if it is not, flow passes to step 305. In step 305, data in the stack is renewed with the data in the example from the data table and flow passes to step 306. In step 306, the renewed data is withdrawn and passed to the sample data in the n−1 scene, after which flow is to step 307. In step 307, there is a report as to the success and termination of coding in the scene, after which flow passes to step 324 for a return.

When the interpretation of a command is completed, the command concerned is examined to see if it is the end command or not as show in FIG. 1 (step 106), and if not, the success or the failure of the command execution is judged (step 107). If it is a success, the next command will be read in (step 104).

As an example of the command execution which has failed, the case where the top entry of the manipulation history table 508 is withdrawn in the course of the interpretation and execution of the repeat command 909 (FIG. 6(F)) in the operation 1005 in the scene 603, which was previously explained, is examined. In this case, the execution stack 701 is in a status, as shown in FIG. 7(D), such that the comparison M1<A1[0] has been carried out (step 318). As shown in FIG. 7(D), the example value of M1 at that time is 3 while that of A1[0] is 2. Therefore, this comparison condition is not met successfully, resulting in a failure report step 319 and step 320.

When the failure is detected as a result of the judgment 107, the variable n is incremented by +1 (step 108). In step 109, the 2nd scene 604 is displayed,.the failure message 619 of the comparison command is output, and then, the M1 and A1[0] which have been renamed for the argument of the repeat command 909 as previously explained are set up as the example data of the 2nd scene. In other words, the example data table 506 in FIG. 5(b) is produced therefor. As shown in FIG. 5(a)-(c), if a plurality of scenes are produced for one program, the example data table and the manipulation history table in each scene is defined by a pointer from the record called the scene list 502, 503, 504. In the scene list, a scene name is stored in its top field and then a pointer for the example data table and a pointer for the scene list of the next scene are sequentially stored in that order. The scene list of the 1st scene 502 is pointed to by the program index 501. In the program index 501, a program name is stored in its 1st field, and a pointer for the scene list of the 1st scene is stored in its 2nd field.

Figure 7E:
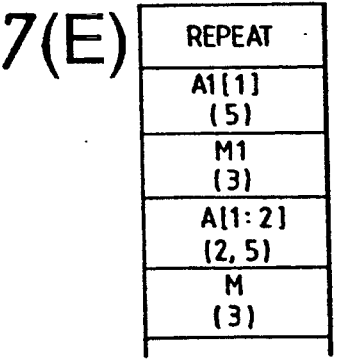
Figure 7H:
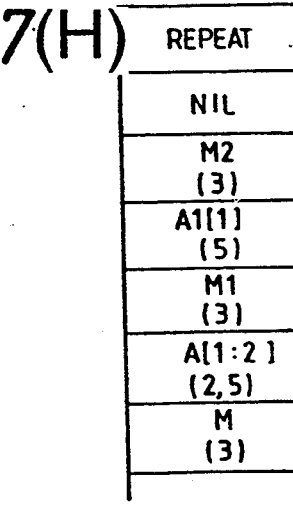

When the setting up of the example data for the 2nd scene 604 is over, the manipulation command for this 2nd scene will be read in (step 104). In the case of the repeat command 909 being specified by the operation 1005 as shown in FIG. 6(F), the execution stack 701 is in such a status as shown in FIG. 7(E). Then, the commands stored in the manipulation history table 508 are withdrawn sequentially, beginning with the command in the top entry, and the interpretation is thus executed. The top entry of the manipulation table 508 is the comparison command, and it will be stacked so that it is in such a status as shown in FIG. 7(F). Exactly the same as in the case of generating M1 and A1 as previously explained, M2 and A2 are generated by changing the names of M1 and A1 in such a manner as M1=M2 and A1[1]=A2[0]. In other words, A2 is an array having only one element. This comparison M2<A2[0]? is successful because the example values of M2 and A2[0] are 3 and 5 respectively at that time. Then, the next assignment is stacked so that the execution stack 701 is in such a status as shown in FIG. 7(G). Subsequent to the assignment command, the repeat command which has been stored in the manipulation history table 508 is again withdrawn therefrom, and the execution stack is in such a status as shown in FIG. 7(H). As shown in FIG. 7(8), the arguments of the repeat command stacked at the top of the execution stack 701 is M2 and nil. The reason why the 2nd argument is nil is that although the array A2 contains only one element A2[0], the 2nd argument of the repeat command is the remaining section of the array after its top element has been removed, having no element corresponding to it. In the case of any argument being nil, the repeat command will fail (step 322 and step 310). Therefore, as shown in FIG. 6(G), the 3rd scene 605 is generated with the example data table 507 being set up. Then, the commands for the 3rd scene will be read in (step 107, step 108, step 109, and step 104).

Figure 7I:
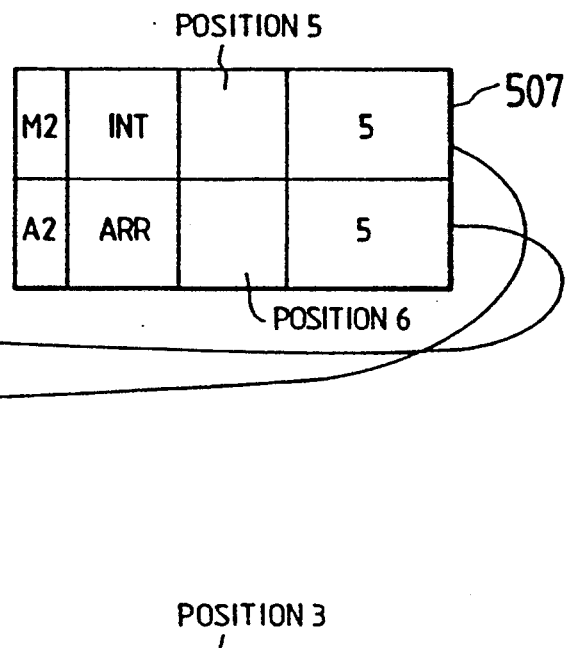

The manipulation command for the programmer to use in the 3rd scene 605 is the end command 910 in the operation 1007 (FIG. 6(H)). When a command is determined to be the end command (step 303, the example value registered in the example data table 507 for the scene 605 is assigned to the stack (step 305). In this case, as shown in FIG. 7(I), M2 is 5 and A2[0] is 5 in the example data table 507. These will be assigned to M1 (example value 3) and A1[1] (example value 5) in the execution stack 701. Consequently, the example value of M1 is changed to be 5, which will be reflected on the example data table 506 in the 2nd scene. Then, the example value 3 of M1 in the example data table 506 is changed to 5 (step 306), and the coding of the 3rd scene 605 is terminated with a success report (step 307).

When the coding of a certain scene is over (step 106), any representation on the display 901 for that scene will be cleared (step 115), and the scene is examined to see if it is the 1st scene (step 110). If it is not the 1st scene, the variable n is decremented by 1 (step 112), and the system returns to reading manipulation commands for the n scene (step 104).

Figure 7J:
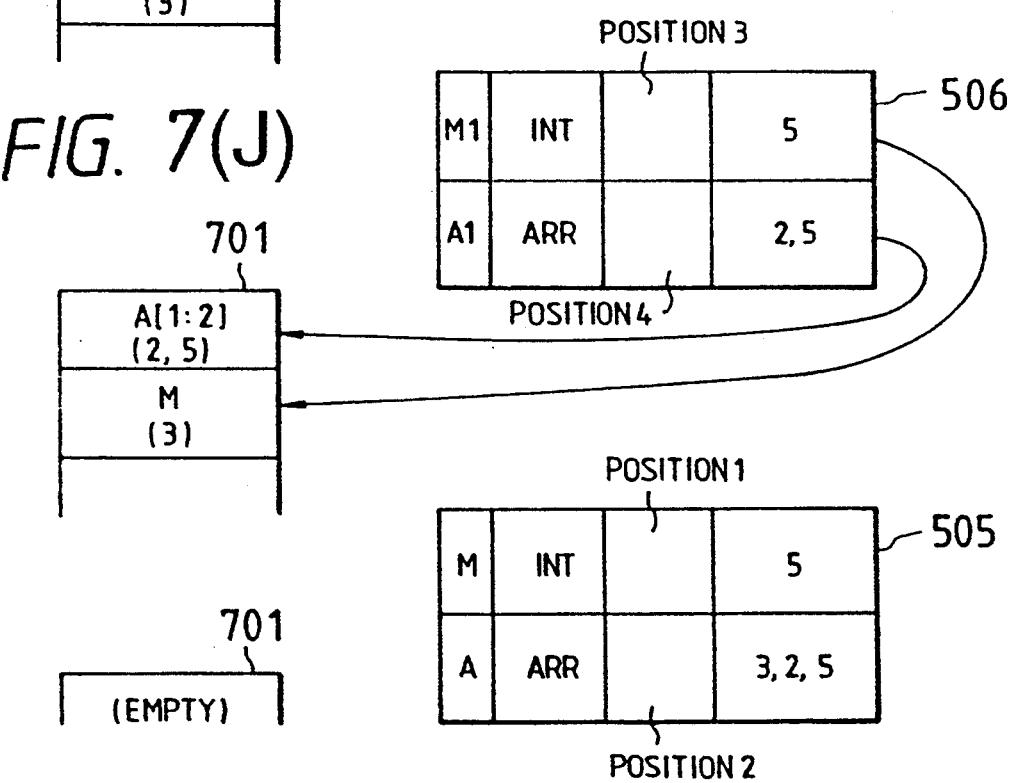
Figure 7K:
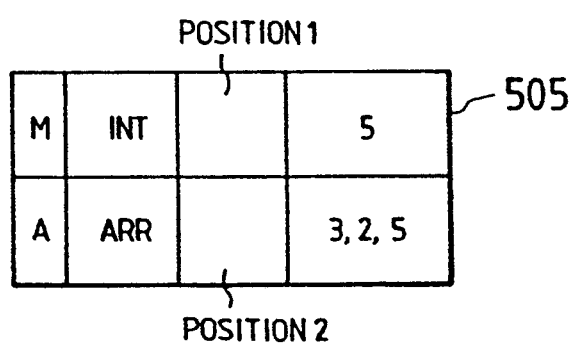

In the example of MAX program shown in FIG. 6, when the termination of the coding of the 3rd scene 605 is detected, the system returns to the coding of the 2nd scene 604 (FIG. 6(H)). Then, the programmer issues the end command 910 by the operation 1008 for the 2nd scene. As a result, as in the case of the end command by the operation 1007 for the 3rd scene 605, the example value of the example data table 506 in the 2nd scene is assigned to a data in the execution stack 701 as shown in FIG. 7(J), the result of the assignment is reflected on the example data table 505 in the 1st scene (step 305 and step 306), and the execution stack will become empty as shown in FIG. 7 (K).

As shown in FIG. 6(I), when the coding of the 2nd scene 604 is over (step 106), the system returns to the coding of the 1st scene 603 (step 110, step 112, and step 104) the same as in the case of the 3rd scene 605.

The programmer will immediately terminate the coding with the end command 910 by the operation 1009 in the 1st scene 603 (FIG, 6(J)). As shown in FIG. 3, the end command in the 1st scene does not execute any stack manipulation and will terminate the operation with a success message (step 323 and step 307). When the termination of the 1st scene is detected (step 106 and step 110), the program codes will be generated in accordance with the groups of the example data tables and the manipulation history table 9 thus produced (step 111) in the subroutine of FIG. 4 and then the program ends at step 113.

Figure 4A:
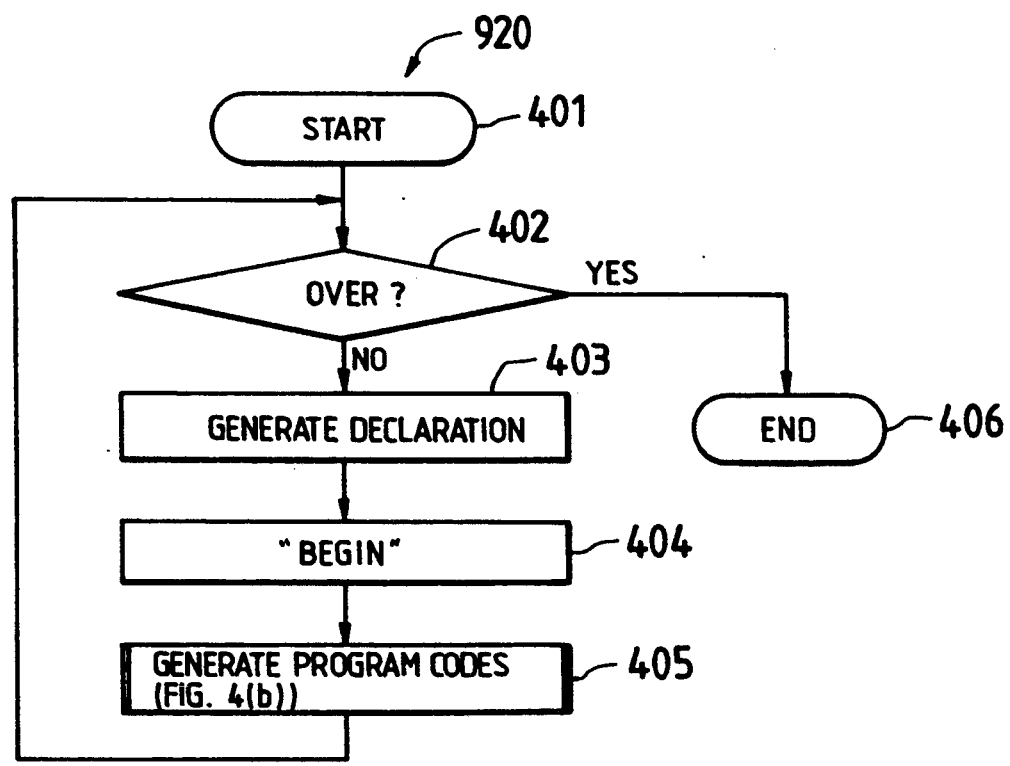
FIGS. 4(a) and (b) show a subroutine showing the details of a subroutine to generate codes.
Figure 4B:
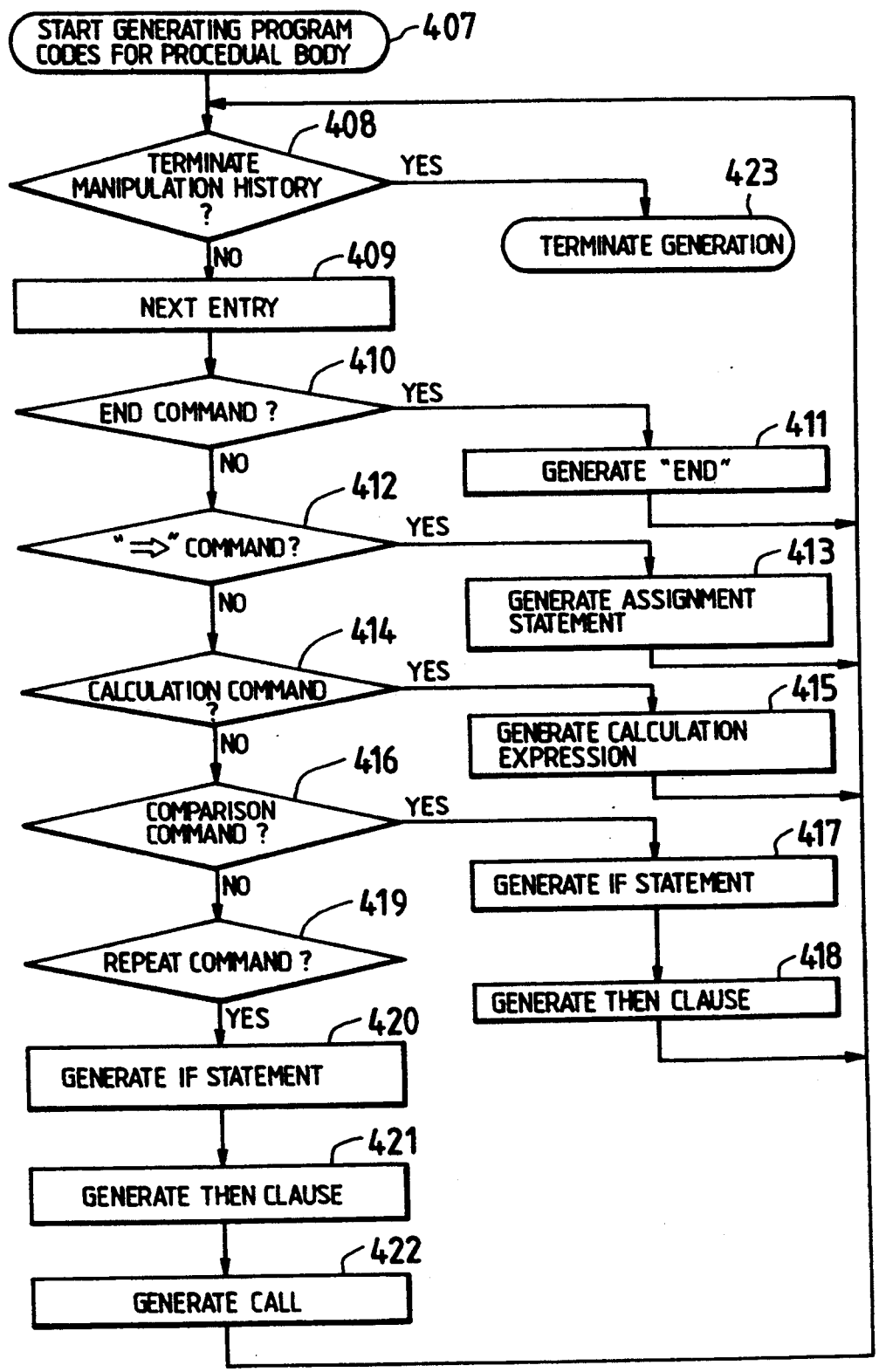

FIG. 4 is a flow chart showing the details of process of the subroutine 920 of FIG. 9 to generate codes in accordance with step 113 of FIG. 1. When the generation of programming codes begins (step 401), the system starts generating codes for the scene list (namely, the 1st scene) designated by the program index. In the case of the MAX program shown in FIG. 5, the program index 501 and the scene list 502 are referred to, first of all, so that a declaration is generated with a name of procedures consisting of the program name and the scene name which are connected together with the sign "-" (step 403). That is, step 403 will generate the procedural declaration to make the named procedure by connecting the program name and scene name, and make each data example data table a dummy argument. In this respect, the dummy argument of the procedure must be the data registered in the example data table designated by the scene list 502. As a result, the procedural declaration 801 is generated as shown in FIG. 8.

Next, the key word "begin" (802) of FIG. 8 for beginning the body of the procedures is generated (step 404 of FIG. 4(*a*)). Then, the body of procedures is generated with reference to the manipulation history table (step 405). Step 405 is shown in FIG. 4(*b*).

When the generation of the program codes for the body of procedures begins (step 407 of FIG. 4(*b*)), the entries of the manipulation history table are being read in sequentially from the top one (step 409) and assigned to the corresponding program codes respectively. If a command stored in the manipulation history table is the end command (step 410), a program code "end", which represents the termination of the body of procedures, is generated (step 411). If a command is the assignment command →(step 412), an assignment statement is generated (step 413). If a command is the calculation command such as addition, subtraction, multiplication, and division (step 414), a corresponding expression is generated (step 415). If a command is the comparison command (step 416), an if conditional clause defining the negative condition of the comparison is generated (step 417). If the condition of the comparison is satisfied, the comparison will fail. In such a case, a then clause which calls the procedures for the next scene is generated (step 418). If a command is the repeat command (step 419), a statement is generated to determine whether or not the array length is smaller than 1 (step 420), provided that there is an array argument. If it is smaller than 1, the repeat command will fail. In such a case, a then clause which calls the procedures for the next scene is generated (step 421), and a statement to call the procedures for the 1st scene is generated as a process of the event that the repeat command is successfully executed (step 422). These operations will continuously be iterated against the entire entries of the manipulation history table. When there is no more entry left (step 408), the generation of codes for the body of the procedures terminates (step 423).

In the case of the manipulation history table 508 in the 1st scene shown in FIG. 5, the code 803 shown in FIG. 8 is first generated for the comparison command "<", and then, the code 804 is generated for the assignment command. Next, the codes 805 and 806 are generated for the repeat command. Finally, the code 807 is generated for the end command. Thus, the generation of the body of the procedures for the 1st scene 603 terminates.

When the generation of the procedures for one scene is over, the system will see if there is any next scene or not (step 402). If there is one, then it will generate the procedures for such a scene (step 403, step 404, and step 405). If not, the generation of the program codes terminates.

In the case of the MAX program shown in FIG. 6, the scene lists 503 and 504 are still left, and the program codes 808, 809, 810, 811, and 812 are generated for the scene list 503 while the program codes 813, 814, and 815 are generated for the scene list 504. Then, the generation of program codes terminates.

When the generation of the program codes is over, the entire processes of making a program of the present invention comes to an end as shown in FIG. 1.

Figure 10A:
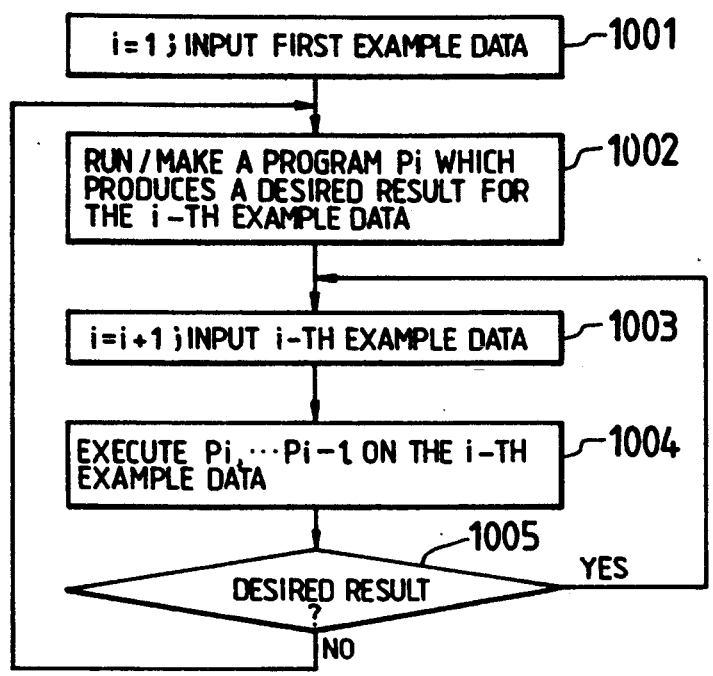
FIGS. 10A and B are flow charts of different operations of the present invention.

In FIG. 10A, there is shown a simplified flow chart of the steps of a specific example of the present invention, which has already been explained. In step 1001, first example data is input by the user, which data, as explained, may be alphanumeric, icon represented, or in some manner visually represented on the screen, keyboard, or elsewhere as a user input to the computer for operation by the computer, for example by providing the argument or operand of commands or program portions representing commands. In step 1002, the user interacts with the computer to make a program for producing a desired result with respect to the entered example data from step 1001. During the making of the program, the program is actually running with respect to the example data. Thereafter, step 1003 is performed, in the same session with the computer, or in a later session at a later time, where additional example data is provided. This additional example data may be automatically provided by the computer, for example by proceeding to a next number of a previously entered array of numbers, or it can be provided by a user entry made during the processing of step 1003. In step 1004, the program made in step 1002 is executed with respect to the data provided in step 1003, and as indicated, other program portions may be executed at the same time with respect to the additional example data, although not necessary. In step 1005, a comparison is made between the results of the execution in step 1004 and a desired result or target result of the program. If the result is satisfactory with respect to the desired result, the answer is yes and processing proceeds to step 1003. For example, a desired result may merely be "is the answer correct for a mathematical calculation", and a specific answer to the execution is compared, and of course the specific answer may be different for different data although many such different answers may all be the desired result, for example the correct calculation. The comparison may be made by a conditional branch statement of a high level program or by an interpreted portion of a program, or the like that provides a branching operation with respect to a condition. If the desired result is not obtained in step 1005, processing proceeds to step 1002 to make a new program, which new program would be the previous program, a branching operation and a new program portion. The steps would be repeated at the same session or subsequent sessions.

Figure 10B:
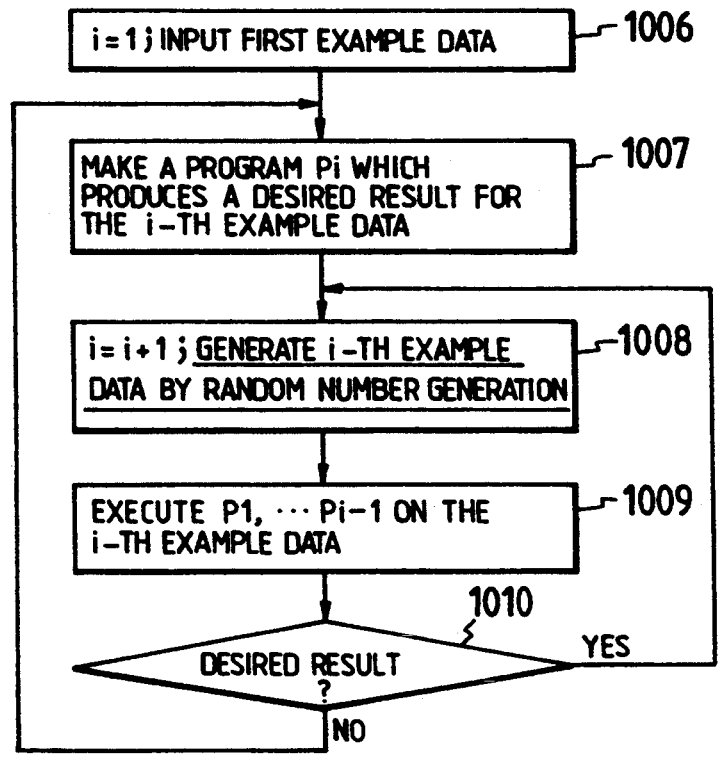

In the process shown in FIG. 10B, step 1006 corresponds to step 1001 of FIG. 10A, and similarly steps 1007, 1009 and 1010 correspond respectively to steps 1002, 1004 and 1005, so that the previous discussion applies. Step 1008 is similar to step 1003, in that the computer provides additional data. In step 1003, the additional data may be the next item in an array that was actually entered in step 1001. In step 1008, the additional example data may be provided by the computer, for example by the computer generating a random number. The generation may be according to some permanent program portion of the computer unrelated to the program being made, or may be generated by a portion of the program being run, or may be generated in response to example data entered in step 1006. For example, in step 1006, a range of random numbers may be entered, and in step 1008, random numbers within such range would be generated. Also, step 1008 corresponds to the previously described MAX program wherein the MAX program actually produced a result of prior calculations, and the result was then used as data for further processing, that is the computer generated a result based upon previously entered example data, and then that generated result was used in step 1008 as example data for further processing for other programs. By example data is meant not only hypothetical examples during a programming session where there is to be no practical result other than the making of the program itself, and also an example data that is real useful data being run on the program to produce a useful output result. In either case, the program is being executed with example data and the process of making the program continues whenever there is conditional branching operation from failure of such processing to produce a result of the type expected according to the desired result. Even the successful running of the program that produces the desired result is still a process of making because of the capability of the program to test the results against the desired result and branch to further program writing upon a failure to produce the desired result.

A second embodiment of the present invention will now be explained by virtue of FIGS. 11 to 28.

FIG. 11 is a block diagram showing the construction of a system according to the second embodiment of the present invention. As shown in FIG. 11, the system comprises a keyboard 1103 for inputting commands, a display device 1101 for visually displaying a program making process by virtue of animation, a main memory 1102 for storing a scene control program 1106 which controls the program making process, and a CPU 1105.

The scene control application program 1106 has a group of subroutines 1107 to 1112. An example set-up subroutine 1107 is a subroutine for setting up an example from which the making of a program is to be started. A data display library 1108 is a subroutine for visualizing data such as numerals and Hanoi towers to display them on the display device 101. A built-in command execution library 1109 includes an assembly of plural subroutines, each of which is provided for executing a built-in command which was previously prepared in the system. The built-in commands include the operation of addition/subtraction of numerals, the comparison of magnitude in large-small relation, a "push" operation and a "pop" operation in the Hanoi tower which will be mentioned later, and so forth. A built-in command animating library 1110 includes an assembly of plural subroutines, each of which animates the state of execution of such a built-in command as mentioned above. A user program library generation subroutine 1111 stores a history of the entry of the data manipulation commands by a user, as a user program, into a user program library 1113. A user program library execution subroutine 1112 fetches one of the user-produced programs other than the abovementioned built-in commands from the user program library 1113 when that program is called as a command.

Now, a program making method according to the second embodiment of the present invention will be explained by use of FIGS. 12 to 28, taking by way of example the making of a program for solving the problem of Hanoi tower (called a Hanoi program).

The problem of Hanoi tower is a problem which is often used as an example when a combinational problem is solved. First, three towers are prepared and a plurality of saucers having different sizes are placed on one of the three towers in the order of sizes from the larger one to the smaller one. Next, the saucers are moved or transferred to one of the remaining towers with the other of the remaining towers being used as a working tower. The problem of Hanoi tower is how to determine the order of movement or transfer of the saucers under the condition that the saucers should be placed on the tower in the order of sizes from the larger one to the smaller one.

First of all, the outline of the present embodiment will be described by use of FIG. 12, which is a flow chart showing the processing by the scene control application program 1106, which controls the whole of a process of making a program. A user inputs the name of a program which he or she desires to make (step 1201), and inputs an example corresponding thereto (step 1202). At this time, the scene control program 1106 secures in the user program library 1113 an area for registering the program and stores the example inputted by the user. Next, the user inputs a command (step 1203) so that the scene control program 1106 causes highlighting, such as the change of a display position, the change of a display color, the flickering of display or the like in accordance with the command. Such a highlighting or a change in display is called "animate" or "animation". The scene control program 1106 registers the inputted command into the user program library 1113 (step 1205). When the inputted command is a built-in command, this command is executed (step 1206) and is animated (step 1207). On the other hand, when the inputted command is not a built-in command or it is a command in the nature of a user program, step 1208 is carried out. Namely, the search of the user program library 1113 for the corresponding program is made and a train of commands in the searched-out program is executed. In the case where a failure occurs during the execution of the command train, the user program library 1113 is searched for another corresponding program and a train of commands in the searched-out program is executed. If the other corresponding program is not present, information of failure is given. In the case where the execution of the command train results in a success, information of the success is given. Next, the examination is made of whether the execution of the user program is the success or the failure (step 1250). In the case of the failure, a processing similar to that in the preceding embodiment is performed. Namely, the name of the program being executed is employed as a program name and the current data is employed as example data (step 1251). A program save area is produced in the user program library 1113, and the name of the example data itself and the type name of the example data are registered into the program save area and are displayed in a scene to describe a program having the program name (step 1252). A program is made by repeating the above processing starting at step 1203 with the current program and current example data until an end is indicated by the user. If the end is not determined in step 1209, then processing proceeds to step 1203, whereas if the end is determined, the END of the scene control program is reached.

In the present embodiment, a user program of the Hanoi tower is first made with respect to an example in which the number of saucers is 1 (one), and the made program of the Hanoi tower is thereafter executed for an example in which the number of saucers is 2 (two). As a result, a failure occurs during the execution of the made user program and a branch user program of the Hanoi tower is then made taking the case of the two saucers as an example.

Thus, the present embodiment has a feature that since the movement of the Hanoi tower is animated, the status of program execution is easily comprehensible and hence the programming can be made with great reality, and has a further feature that the programming can be made in such a manner that an incomplete portion is described at the time of need, as shown by the above-mentioned example in which a program is made with respect t0 the case of one saucer and with respect to the case of two saucers, as required.

Detailed description will now be made.

A. Generation of Program for Processing of Example Data (1) Read-in of Program Name (Step 1201)

Figure 12:
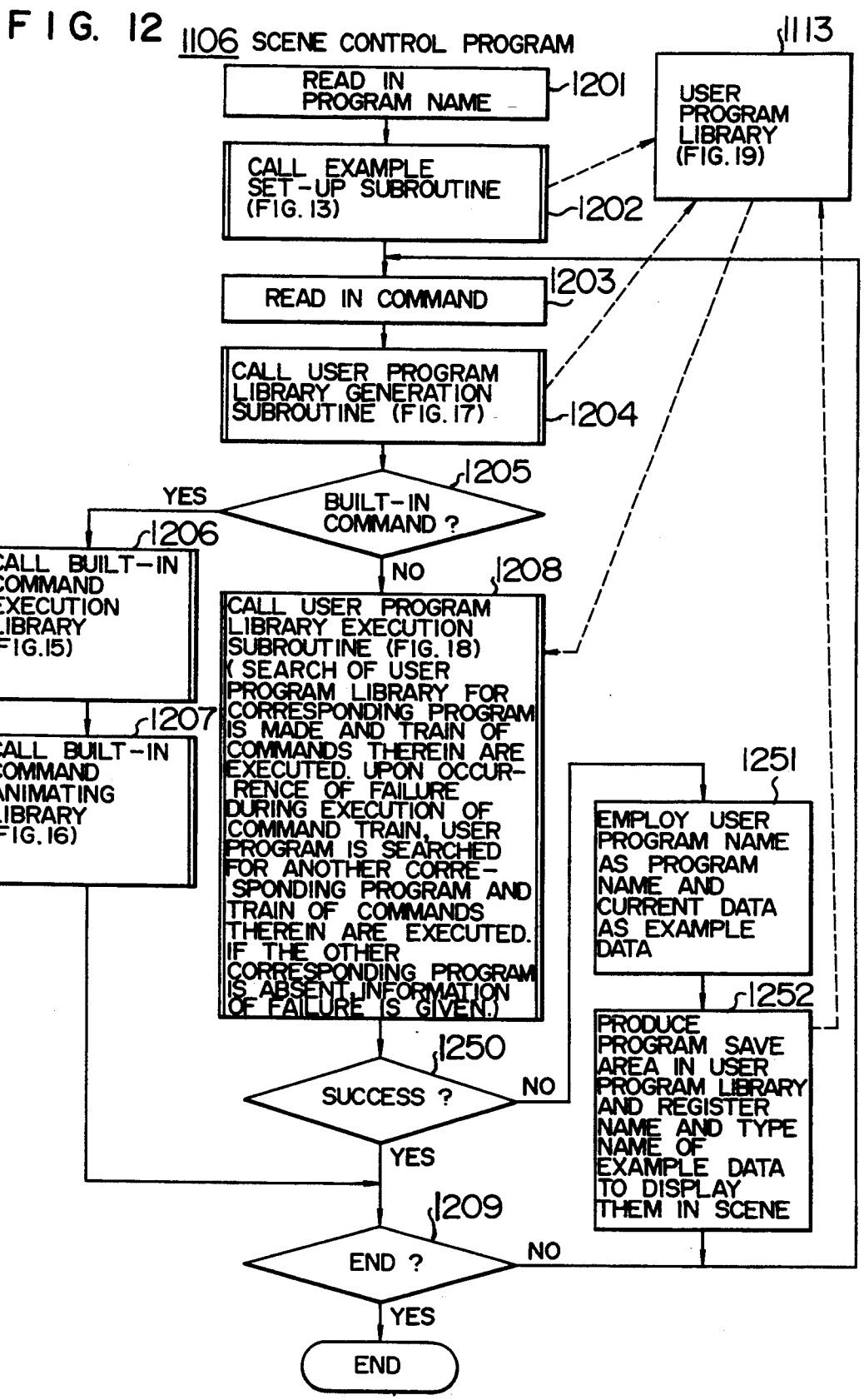
FIG. 12 is a flow chart showing the operation of a scene control program in the system shown in FIG. 11.

As shown in FIG. 12, when the scene control program 1106 is started, the name of a program which is inputted from the keyboard 1103 by the user and the making of which is desired ("hanoi" in the shown example) is first read in (step 1201). Next, the example set-up routine 1107 is called (step 1202).

(2) Example Set-up Subroutine (Step 1202)

Figure 13:
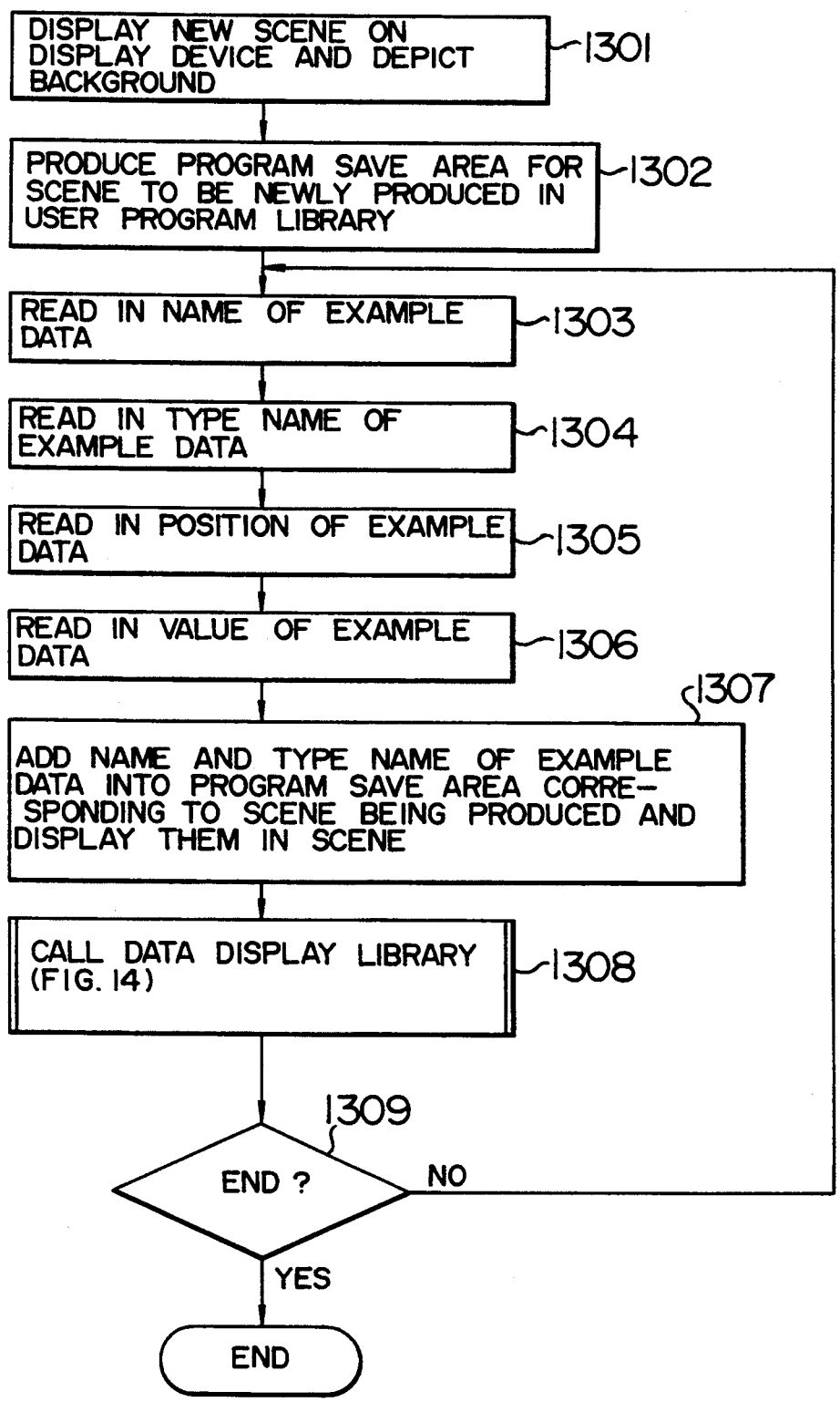
FIG. 13 is a flow chart showing the operation of an example set-up subroutine.

FIG. 13 is a flow chart showing the operation of the example set-up subroutine 1107.

(2a) Initial Processing

As shown in FIG. 13, when the example set-up subroutine is started, a new scene 11001 (see FIGS. 20 to 22) is displayed on the display device 1101, a floor having a chequered pattern is depicted as the background (step 1301), and in the user library an area is saved for the newly produced program (step 1302).

(2b) Setting-up of Example Data

Next, the flow enters an iteration loop (steps 1303 to 1309) in which example data in the scene is set up. In the iteration loop, the input of the name of the example data by the user from the keyboard 1103 is first read (step 1303). Then, a name indicative of the type of the example data such as "num" in the case of a number or "hanoi" in the case of the Hanoi tower is read from the keyboard 1103 (step 1304). Further, the position of the data in an XY coordinate system having the left and lower corner of the scene as its origin is inputted from the keyboard 1103, as information of the position of the data (step 1305). The value of the data, such as a numeric value in the case of a number or the number of saucers mounted and the width of each saucer in the X direction in the case of the Hanoi tower, is read from the keyboard 1103 (step 1306).

(2c) Storage and Display of Inputs

The read inputs are stored into the program save area 1933 (see FIG. 19) on one hand and are displayed as a text in the scene 11001 (see FIG. 20) on the other hand (step 1307). For example, if a number N as the first example data with the value of 1 is set up by the user at the left and upper portion in the scene with image 11003, the name (N) and the type name (num) of the example data are stored into entires 1903 and 1904 of the program 1933 (see FIG. 19) and "N:num" is displayed as a text 11002 in the scene 11001 (see FIG. 20).

(2d) Display of Example Data as Icon

The example step-up subroutine 1107 thereafter requests information related to the inputted example data, that is, the name, type name, position and value from the data display library 1108 (step 1308) and to request visualization of the example data on the display device 1101. Step 1309 determines whether subroutine 1107 has ended or whether there is to be another iteration of steps 1303 to 1309.

Figure 14:
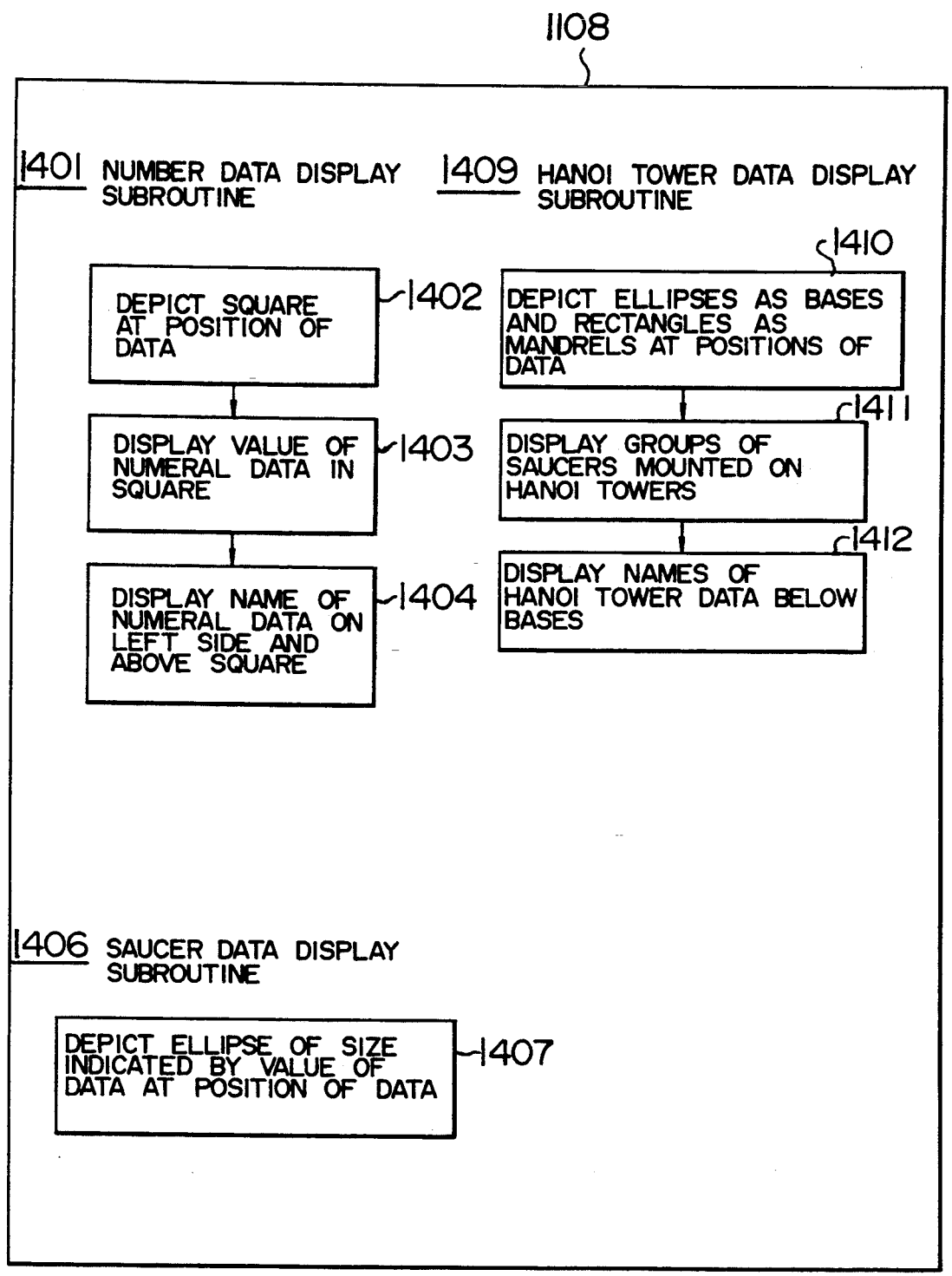
FIG. 14 shows a data display library as a group of flow charts showing the operations of a group of subroutines.

FIG. 14 shows the contents of the data display library 1108. As shown in FIG. 14, the data display library 1108 is composed of an assembly of plural subroutines. In FIG. 14, the operation of each subroutine is shown by a flow chart. In the case where the display of the number N (the example value "1") is requested from step 1308 (FIG. 13) of the example set-up subroutine 1107, as has been mentioned above, a number data display subroutine 1401 is selected from the data display library 1108 and is executed. The number data display subroutine 1401 first depicts a square icon at a designated position of the scene 11001 (step 1402), thereafter displays the example value "1" in the square (step 1403) and finally displays the data name "N" on the left side of and above the square (step 1404). As a result, the number N is visualized as a display 11003 is the scene 11001 of FIG. 20. Thereby, the number data display subroutine 1401 is terminated.

(2e) Setting-up of Other Example Data

Figure 19:
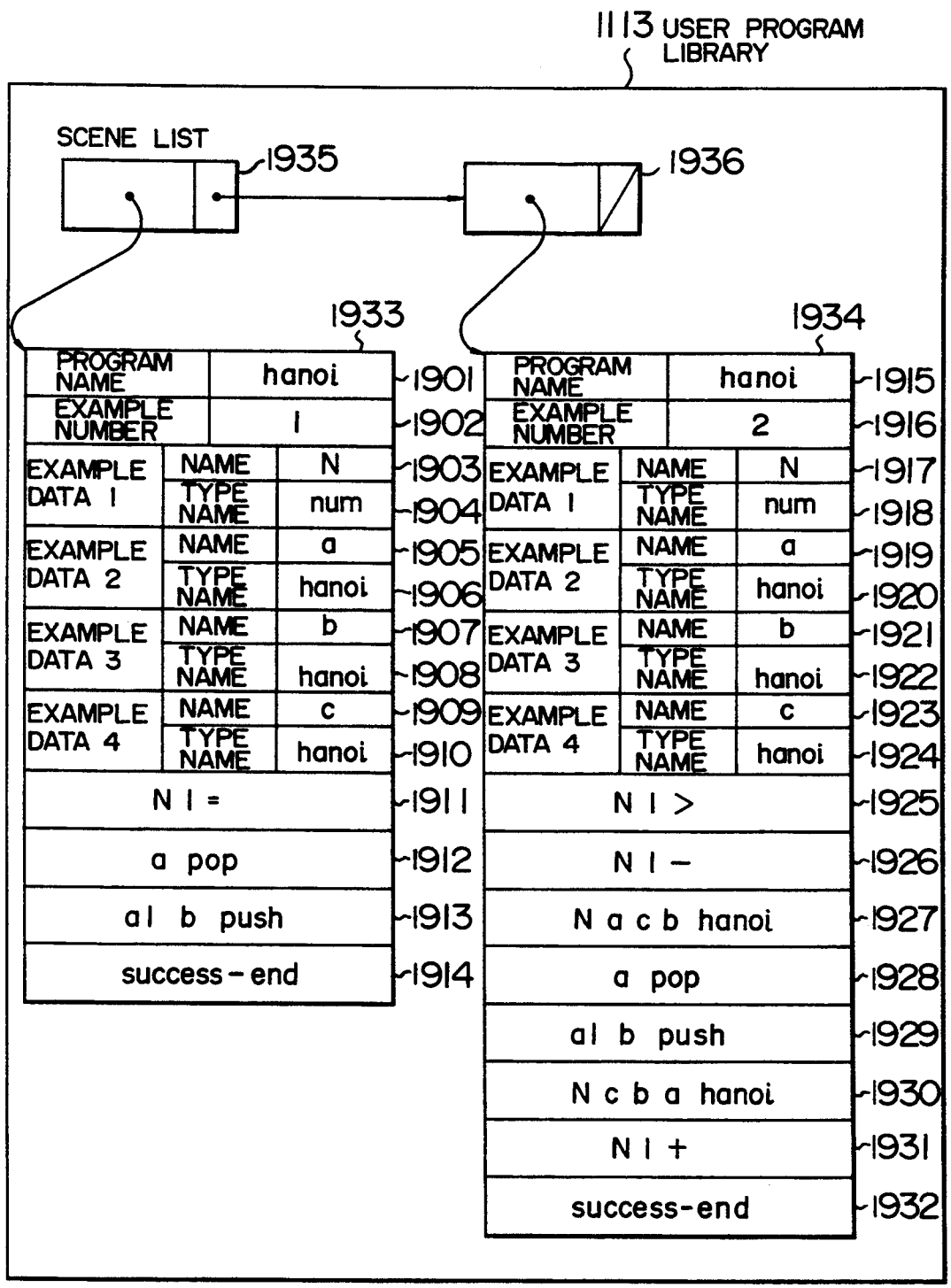
FIG. 19 is a view showing the contents of a user program library.

After the setting-up of one example data (the number N in the above example) has been completed and stored as entries 1901 to 1904 of the user program save area 1933, in FIG. 19, the example set-up subroutine 1107 inquires of the user about whether or not example data to be set up still remains or is the subroutine at an end (step 1309 in FIG. 113). In the case where the user inputs "Y" (indicative of an end) from the keyboard 1103, the example set-up subroutine 1107 is terminated (step 1310).

(2f) In the case where the user inputs "N" in step 1309 in FIG. 13 (indicative of incompletion), the setting-up of example data is repeated for the example data (steps 1303 to 1308). In the programming of the Hanoi tower, three Hanoi towers are further set up as example data. The setting-up of example data concerning each Hanoi tower is also made in a manner similar to that in the case described above for the example data entries 1901 to 1904. Namely, the example data concerning the three Hanoi towers are stored into entries 1905 to 1910 of the user program save area 1933 in FIG. 19 on one hand and are displayed as a text 11007 the scene 11001 of FIG. 20 on the other hand, and the three Hanoi towers (the names of which are assumed as being a, b and c in the order from the left of the scene 1100 1 ) are visualized as displays 11004, 11005 and 11006 in the scene 11001. Since a method of displaying the Hanoi tower (the type name of which is "hanoi") is considerably different from the method of displaying the number (the type name of which is "num"), explanation will now be made of a processing performed in the case where a request of the display of data concerning the Hanoi tower is made to the data display library 1108 shown in FIG. 14.

A Hanoi tower data display subroutine 1409 first depicts ellipses as based and rectangles as mandrels at designated positions (step 1410). Next, in accordance with information given from the user concerning the number of saucers and the sizes thereof, the saucers are displayed on the bases while being sequentially shifted from the bottom (step 1411).

The display of the saucers is carried out by a saucer data display subroutine 1406. The saucer data display subroutine 1406 depicts, at a designated position, an ellipse having a width equal to the size inputted by the user from the keyboard 1103, upon example set-up (step 1407). Thereby, the saucer data display subroutine is terminated.

After the display of all of the saucers has been completed, the Hanoi tower data display subroutine 1409 displays the names of the Hanoi towers below the bases (step 1412). Thereby, the Hanoi tower data display subroutine 1409 is terminated.

In the case of the Hanoi program, the setting-up of the example in the scene 11001 is completed by the abovementioned processing. The display contents of the scene 11001 are shown in FIG. 20.

(3) Input of Command Train

The scene 11001 shows an example of the problem of Hanoi tower in which the number of saucers is only one. In the present embodiment, a general program can be obtained by solving the problem by virtue of a specific example.

In the following, the operation of the scene control program 1106 shown in FIG. 12, after example set-up (or in and after step 1203), will be explained taking by way of example the case where one saucer as indicated in display 11003 is transferred from a to b, that is, the case where the problem is solved by performing data manipulation on the scene 11001.

After the execution of the example set-up subroutine 1107 has been completed in the manner mentioned above, the scene control program 1106 enters a loop (steps 1203 to 1252) in which the operation of registering a command inputted from the keyboard 1103 by the user into the user program library 1113 and executing the command is repeated, as shown in FIG. 12.

The command inputted from the user has a format in which arguments of the command are arranged with partition blanks interposed therebetween and a command name is lastly designated, as shown by 11101 or 11102 of the scene 11001 in FIG. 21. For example, a coincidence judgement command "N 1=" is a command to instruct the examination of whether or not a numeral N is equal to a constant 1.

(3a) Read-in, Storage and Display of Command

Figure 17:
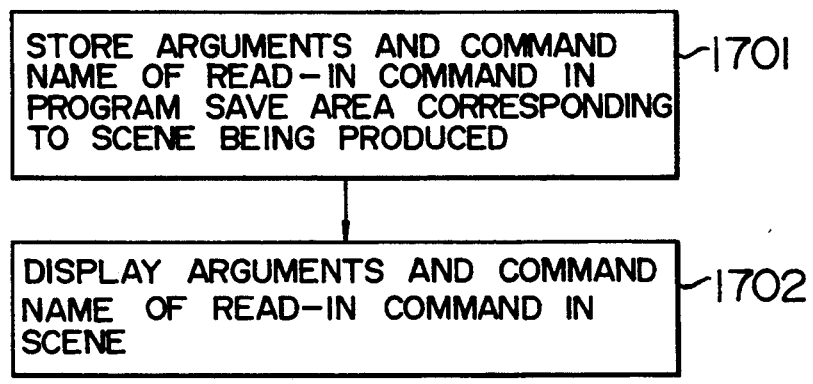
FIG. 17 is a flow chart showing the operation of a user program library generation subroutine.

Returning to FIG. 12, when a command is read in (Step 1203), the scene control program 1106 calls the user program library generation subroutine 1111. FIG. 17 shows the operation of the user program library generation subroutine 1111.

As shown in FIG. 17, the subroutine 1111 stores the read command into the program save area 1933 (step 1701) and thereafter displays the command as a text in the scene 11001 (step 1702). Thereby, the user program library generation subroutine 1111 is terminated. For example, when the user inputs a coincidence judgement command "N 1=" from the keyboard 1103, the command is stored as entry 1911 of the program save area 1933 of the user program library 1113 corresponding to the scene 11001 and is also displayed as a text 11101 in the scene 11001, as shown in FIG. 21. The reason why the command inputted by the user is thus displayed in the scene as it is, is that it is contemplated to make it possible for the user to easily confirm what program is being generated.

(3b) Execution of Command (Case of Built-in Command)

Returning to FIG. 12, the scene control program 1106 next examines whether or not the inputted command 11101 is a built-in command (step 1205) and calls the built-in command execution library 1109 if the inputted command is a built-in command (step 1206) and the user program library execution subroutine 1112 if the inputted command is not a built-in command (step 1208). In the case where the inputted command is the above-mentioned coincidence judgement command 11101, the built-in command execution library 1109 is called since that command is a built-in command (step 1206).

Figure 15:
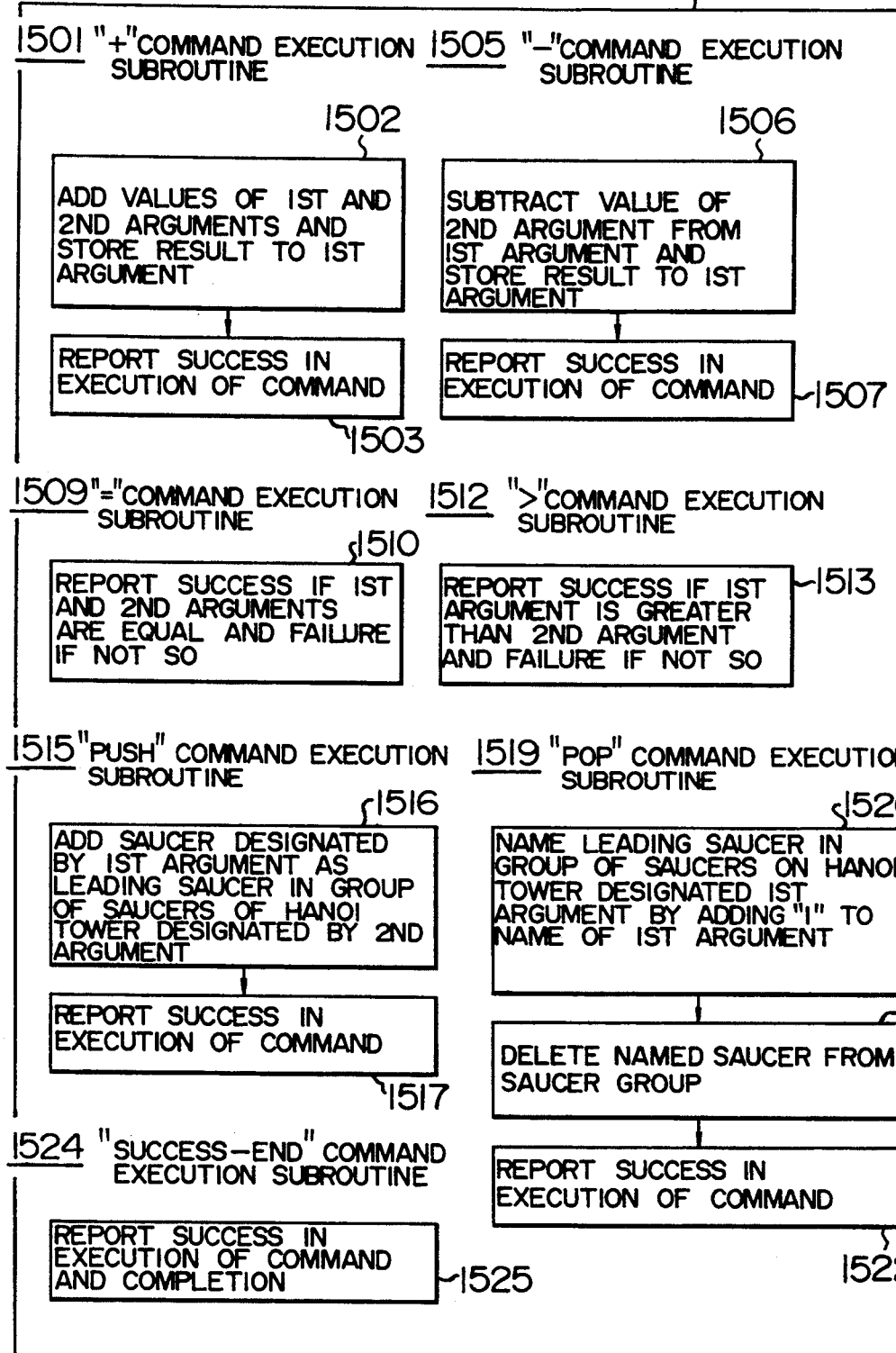

The built-in command execution library 1109 is an assembly of subroutines to execute respective commands, as shown in FIG. 15. In the case of the coincidence judgement command "N 1=", an "=" command execution subroutine 1509 is selected and called. The "=" command execution subroutine 1509 compares N which is the 1st argument with 1 which is the 2nd argument. If the 1st and 2nd arguments are equal to each other, a success is reported and if not so, a failure is reported (step 1510). In the present example, since the value of the 1st argument N is set to be "1" upon example set-up, that is, since the 1st and 2nd arguments are equal to each other, a success is reported and thereby the "=" command execution subroutine 1509 is terminated.

(3c) Animating of Built-in Command In the case of a built-in command, the scene control program 1106 next calls the built-in command animating library 1110 to animate the state of execution of the command on the scene for visualization for the user (step 1207).

Figure 16:
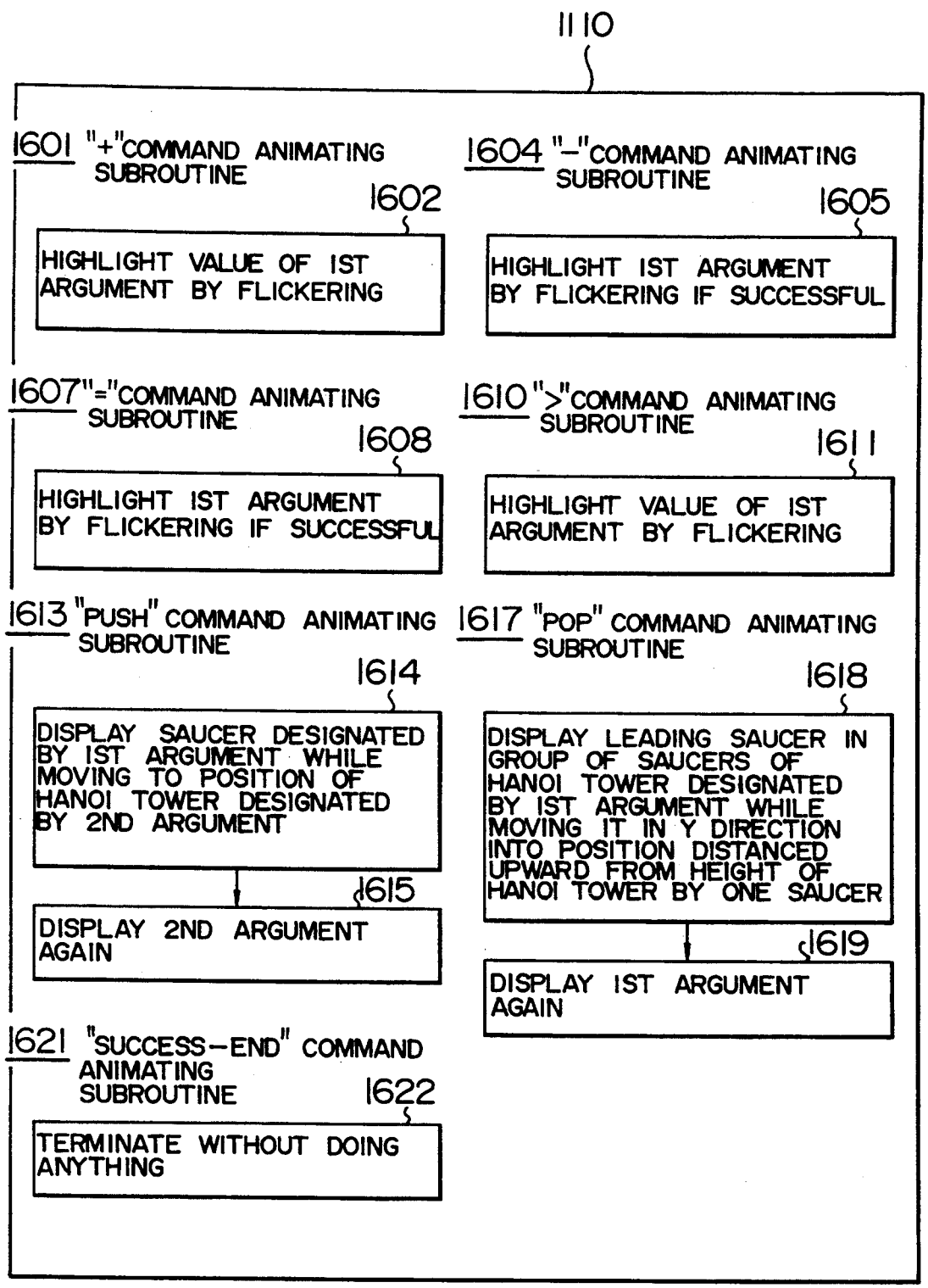
FIG. 16 shows a built-in command animating library as a group of flow charts showing the operations of a group of subroutines.

FIG. 16 shows the contents of the built-in command animating library 1110. The built-in command animating library 1110, is an assembly of subroutines corresponding to respective commands. In the case of the coincidence judgement command "N 1=", a "=" command animating subroutine 1607 is selected and executed. As shown in FIG. 16, the "=" command animating subroutine 1607 flickers a displayed numeral for highlighting or emphasis only when a success is reported as the result of execution by the built-in command execution library 1109 (step 1608). In the case of the coincidence judgement command "N 1=", since the execution results in a success, the display 11003 is flickered, thereby visually informing the user that the result of comparison gives an equality.

After the animating has been completed, the examination is made of whether or not all of the command inputs from the user have been completed (step 1209). If completed the production of a scene is terminated with process flow to "END". If not completed, a processing from step 1203 for read-in of the next command downward is repeated. The examination of whether or not all of the command inputs have been completed is made by judging whether or not the user inputs from the keyboard 1103 a "success-end⇌" command which will be mentioned later. Since the command 11101 is not the "success-end" command, the scene control program 1106 returns to step 1203 for read-in of the next command.

(3d) Execution and Animating of Succeeding Commands (3d-1) In the case of the scene 11001 in which only one saucer is moved, it is required to take out a saucer from the Hanoi tower 11004 and thereafter to place it above the Hanoi tower. For that purpose, the user inputs a pop command "a pop" as the next command. Like the coincidence judgement command examining whether or not a number N indicative of the number of saucers to be moved is equal to 1, the pop command "a pop" is stored as entry 1912 of the program save area 1933 of FIG. 19 and is also displayed as a text 11102 in the scene 11001 of FIG. 21 (step 1204). Since the "pop" command is a built-in command, a "pop" command execution subroutine 1519 (see FIG. 15) is called and executed (step 1206).

As shown in FIG. 15, when the "pop" command execution subroutine 1519 is called, the leading one of saucers mounted on the Hanoi tower a which is the 1st argument of the command of text 11102 is named as a1 to be identifiable thereafter (step 1520) and the saucer a1 is then deleted from Hanoi tower data a (step 1521). A success in the execution of the command is reported (step 1522), thereby terminating the subroutine 1519.

Next, the scene control program 1106 animates the execution of the "pop" command, like the case of the coincidence judgement command of text 11101 (step 1207). As shown in FIG. 16, when a "pop" command animating subroutine 1617 is called, the leading saucer a1 of the Hanoi tower designated by the 1st argument is animated by gradually moving it in a Y direction of the scene 11001 to a position of display 1103, which is distanced upward from the length of the mandrel of the Hanoi tower a by one saucer (a1) (step 1618). The Hanoi tower a which is the 1st argument is displayed again (step 1619), thereby terminating the subroutine 1617.

In this re-display, since the saucer is deleted from the Hanoi tower a, the scene 11001 is as shown in FIG. 21 upon completion of the animating of the "pop" command of text 11102.

Since the "pop" command of text 11102 is not an end command (step 1209), the scene control program 106 thereafter reads in the next command (step 1203).

(3d-2) Since the scene 11001 is in a state in which the saucer is taken out from the hanoi tower a, the programming in the example in which the number of saucers to be moved is 1 (one) is completed by placing the saucer a1 on the Hanoi tower b. Namely, the user inputs from the keyboard 1103 a push command "a1 b push" which instructs to place the saucer a1 on the Hanoi tower b. This command, is added as an entry 1913 into the program save area 1933 of FIG. 19 and is also displayed as a text 11201 (see FIG. 22) in the scene 11001 (step 1204). Since the command of text 11201 is a built-in command, (step 1205), it is executed by a "push" command execution subroutine 15 15 in the built-in command execution library 1109 (step 1206).

As shown in FIG. 15, the "push" command execution subroutine 1515 adds the saucer a1 designated by the 1st argument as the leading saucer of the Hanoi tower b designated by the 2nd argument (step 1516) and reports a success in execution of the command (step 1517) thereby, the command 1515 is terminated.

Next, the scene control program 1106 calls a "push" command animating subroutine 1613 in the built-in command animating library 1110 in order to animate the command of text 11201 (step 1207). As shown in FIG. 16, the "push" command animating subroutine 1613 animates the "push" operation by displaying the saucer a1 which is the 1st argument of the command of text 11201 while gradually moving the saucer a1 to a position of the Hanoi tower b which is the 2nd argument (step 1614). The subroutine 1613 displays in the scene 11001 the Hanoi tower b which is the 2nd argument (step 1615). Thereby, the subroutine 1613 is terminated. In this re-display, since the saucer is added to the Hanoi tower b, the Hanoi tower b upon completion of the animating of the command of text 11201 is as shown in a display 11105 in FIG. 22.

(3d-3) Since the movement of the saucer has been completed and in the example the number of saucers to be moved is one, the user inputs a "success-end" command indicative of an end from the keyboard 1103.

Figure 22:
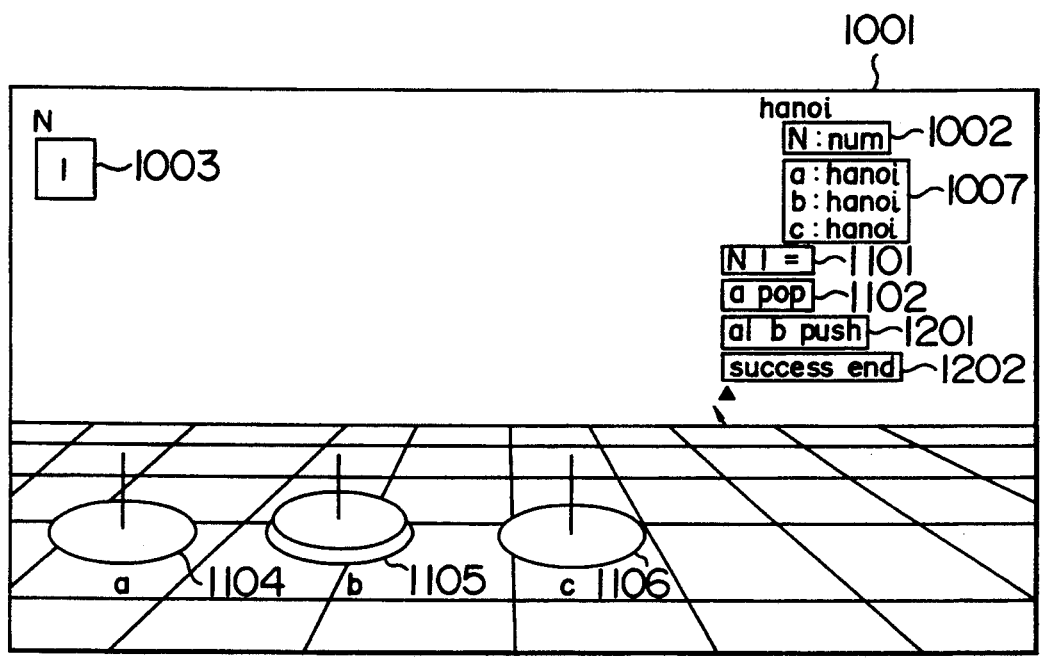

Like the other commands, the "success-end" command, is stored as an entry 1914 in the program save area 1933 for the scene 11001 and is also displayed as a text 11202 in the scene 11001, as shown in FIG. 22. As shown in FIG. 15, this command 11202 is executed by a "success-end" command execution subroutine 1524, and the execution of the command immediately results in a success so that the completion of production of a scene is reported (step 1525). Also, as shown in FIG. 16, a "success-end" command animating subroutine 1621 is immediately terminated without doing anything (step 1622).

The report of the end by the command of text 11202 is detected (step 1209), and the scene control program 1106 is terminated.

By the above, the program for solving the problem of Hanoi tower on the scene 11001 in the case where the number of saucers to be moved is one has been completed and saved in the program save area 1933 (see FIG. 19).

As has been mentioned in the foregoing, in the program making method of the present embodiment, a problem as an object to be solved is visualized by a concrete graphic image similar to the actual form and each step for solution of the problem is animated. Therefore, there is a feature that the program can be made with great reality.

B. Making of Program Processing Different Example Data

As has already been mentioned, the general solution of the problem of Hanoi tower, that is, the making of a program for transfer of a group of saucers arbitrary in number from a certain tower to another tower according to the method of the present embodiment can be made by setting up an example of a plurality of saucers, executing the previously made Hanoi tower program for that example, and adding a program in accordance with the execution. Therefore, in the present embodiment, a program is made by use of an example of two saucers. Now, explanation will be made of the process of producing a scene 11301 of FIG. 23, in the example in which the number of saucers to be moved is 2 (two) and the operation of the scene control program 106.

(1) Setting-up of Example Data

Figure 18:
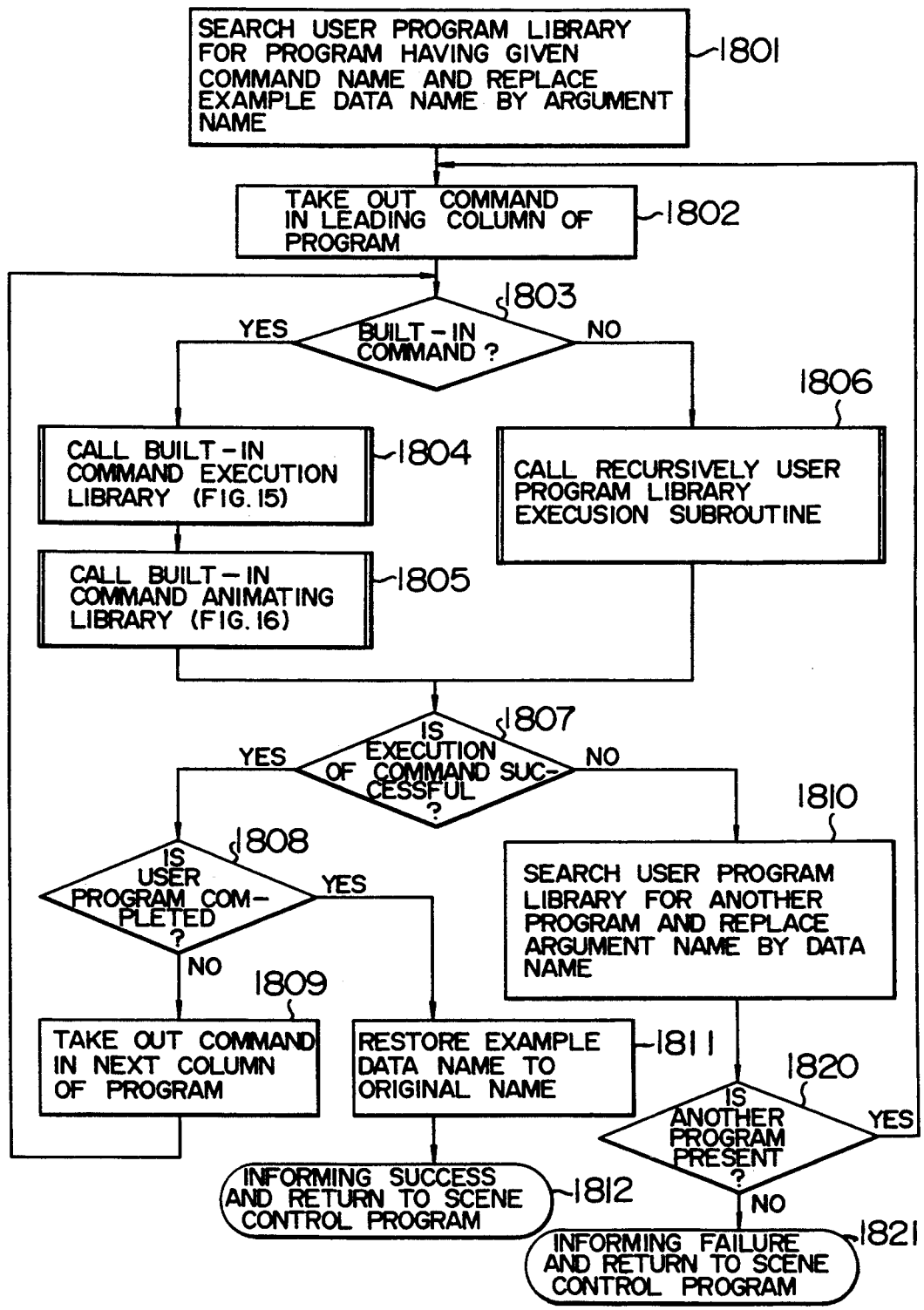
FIG. 18 is a flow chart showing the operation of a user program library execution subroutine.
Figure 23:
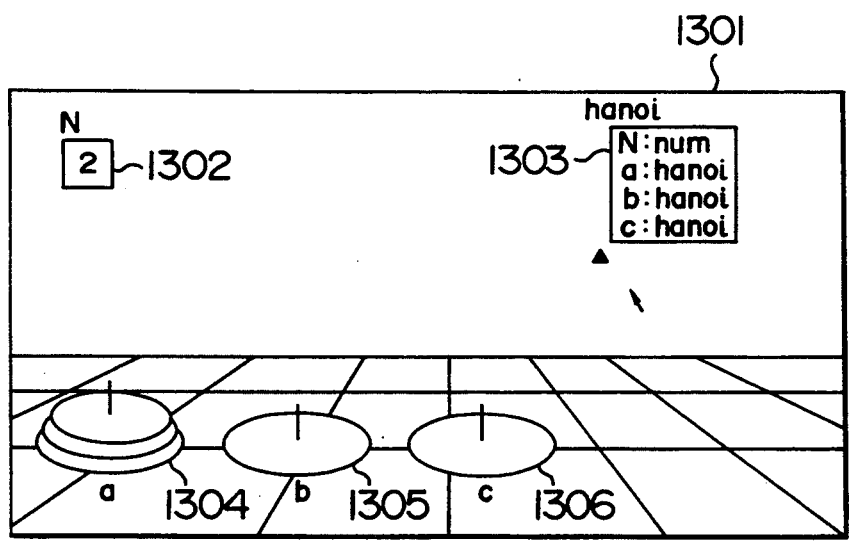
FIGS. 23 to 27 are views showing different display screens in a process of the making of a program for solving the problem of Hanoi tower when two saucers are to be moved.

When the user starts the execution of the scene control program 1106, the name of a program is set up (step 1201), like the case of the scene 11001 in which one saucer was to be moved. In the present case, the program is named as "example". Next, the example set-up subroutine 1107 is called (step 1202). In the present example the user sets up from the keyboard an example which the example value of a number N indicative of the number of saucers to be moved is 2 (two), one of the Hanoi tower data has two saucers and the two other tower data are not present. After the example set-up has been completed, the scene control program 1106 enters a loop (steps 1203 to 1252) in which commands from the user are successively read in and executed. First, the user inputs a command "N a b c hanoi" to execute the Hanoi tower from the keyboard 1103. As a result, the scene control program 1106 passes through steps 1204 and 1205 and calls the user command library execution subroutine 1112 in step 1208. As shown in FIG. 18, in the user command library execution subroutine 1112, a search for a program corresponding to the command "hanoi" is made (step 1801), a user program 1933 is fetched from the scene list 1935 of the user program library 1113 of FIG. 19 (step 1802) and the first command "N 1=" (step 1911) is found to be a built-in command (step 1803) so that it is executed (step 1804) and animated (step 1805). In this example, however, since N is 2, the execution of this command results in a failure (step 1807), a search for the corresponding program is made (step 1810). But, since the corresponding program is not made at this point of time (step 1820), information of a failure is given and the flow returns to the scene control program 1106 (step 1821). Since the execution of the user program library results in a failure (step 1250), the scene control program 1106 employs the current program name "hanoi" as a program name and the current data as example data (step 1251), adds to a scene list 1936 a "hanoi" program save area 1934 in the program library 1113 of FIG. 19 to secure the program save area 1934, registers the names and type names at entires 1917 to 1924 and displays them in the scene (step 1252). A state of the scene 11301 upon completion of the above steps is shown in FIG. 23. As shown in FIG. 23, data 11302, Hanoi tower data 11304, 11305 and 11306, named as a, b and c, and a text 11303 showing the names of arguments and types are displayed in the scene 11301.

(2) Read-in and Execution of Commands

Next, the scene control program 1106 returns to the loop (steps 1203 to 1252) in which the commands from the user are successively read in and executed.

(2a) Comparison Command First, the user inputs from the keyboard 1103 a comparison command "N 1>" which confirms that the number of saucers to be moved is greater than 1. As a result, the scene control program 1106 stores an entry 1925 into the program save area 1934 and also displays a text 11401 in the scene 11301 of FIG. 24 (step 1204). Since the command of text 11401 is a built-in command (step 1205), the command is executed by the built-in command execution library 1109 of FIG. 15 and a success is reported (steps 1512 to 1513). Highlighting is made by the built-in command animating library 1110 of FIG. 16 (steps 1610 to 1611). Thereby, the execution is terminated.

(2b) Decrement Command

Next, explanation will be made of a method in which a program to process the example in which the number of saucers to be moved are two is made by use of the program previously made for the example in which the number of saucers to be moved is one. First, the user inputs from the keyboard 103 a decrement command "N 1-11, which reduces data N indicative of the number of saucers to be moved by 1 (one). This is made for utilizing the example of N−1 or the scene 11001. When the scene program command 1106 reads in the command "N 1-" (step 1203), an entry 1926 is added to the program save area 11934 and a text 11402 is displayed in the scene 11301 (step 1204). Since the "-" command is a built-in command, the built-in command execution library 1109 is called and executed (step 1206). As shown in FIG. 15, the command is executed by a "-" command execution subroutine 1505 in the built-in command execution library 1109 (step 1506). As a result, the value of the data N becomes 1 and a success is reported (step 1507). Next, the built-in command animating library 1110 is called (step 1207) and the command is executed by a "-" command animating subroutine 1604 in the built-in command animating library 1110 so that the value of the data N changed from 2 to 1 is highlighted by flickering (step 1605). Thereby, the processing for the decrement command of text 11402 is completed.

(2c) Commands for Hanoi Program

From FIG. 23, it will be understood that the transfer of two saucers on the Hanoi tower a to the Hanoi tower b can be made by transferring the upper one of the two saucers on the Hanoi tower a to the Hanoi tower c, thereafter transferring the lower or remaining one of the two saucers on the Hanoi tower a to the Hanoi tower b, and finally transferring the saucer transferred on the Hanoi tower c onto the Hanoi tower b.

(2c-1) Hanoi Program Execution Command (N a b c hanoi)

First, the user inputs a Hanoi program execution command "N a c b hanoi" through the keyboard 1103. This command means that saucers the number of which corresponds to a number indicated by the current value (1) of the data N should be transferred from the Hanoi tower a to the Hanoi tower c. As has already been mentioned, in the example in which the value of N is 1, the command "N a c b hanoi" is executable since the user program 1933 corresponding to the scene 11001 has already been produced on the user program library 1113. More particularly, when reading in the command "N a c b hanoi" (step 1203), the scene control program 1106 adds an entry 1927 to the user program save area 1934 and also displays a text 11403 indicative of the command in the scene 11301 of FIG. 24 (step 1204). Since the "hanoi" command is not a built-in command but a user command (step 1205), the scene control program 1106 calls the user program library execution subroutine 1112.

FIG. 18 is a flow chart showing the operation of the user program library execution subroutine 1112. As shown in FIG. 18, when the user program library execution subroutine 1112 is called, the first program save area 1933 having a program name equal to the command name "hanoi" is searched out from the user program library 1113 by use of a scene list so that the example data names N, a, b and c in the area 1933 are respectively replaced by argument names N, a, c and b of the command of text 11403 (step 1801). Namely, the names b and c used in the entries 1907 and 1909 of the area 1933 are replaced by c and b, respectively. As a result, the command in the entry 1913 is replaced by a command "al b push".

(2c-2) Coincidence Judgement Command

The user program library execution subroutine 1112 next takes out the coincidence judgement command "N 1=" in the entry 1911, which is the first command stored in the area 1933 (step 1802). Since "the coincidence judgement command "N 1=" is a built-in command (step 1803), the built-in command execution library 1109 is called and a "=" command execution subroutine 1509 (see FIG. 15) in the built-in command execution library 1109 is executed (step 1804). Since the current value of N is 1, the execution of the command results in a success (step 1510). Further, a built-in command animating library 1110 is called (step 1805) and a "=" command animating subroutine 1607 (see FIG. 16) in the library 1110 is executed so that the icon 11302 (see FIG. 23) of the 1st argument N is highlighted (step 1608).

(2c-3) Pop Command

Since the execution of the coincidence judgement command results in a success (step 1807), the examination is made of whether or not a storage entry of the next command is present in the user program save area 1933 (step 1808). Since the entries 1912 to 1914 still remain, a pop command "a pop" stored in the next entry 1912 is taken out (step 1809) and executed. Since the "pop" command is a built-in command (step 1803), the built-in command execution library 1109 is called and a "pop" command execution subroutine 1519 (see FIG. 15) in the library 1109 is executed (step 1804) so that the upper one of the two saucers of the Hanoi tower a is named as al (step 1520) and is deleted from the data a (step 1521). Next, the built-in command animating library 1110 is called and a "pop" command animating subroutine 1617 (see FIG. 16) in the library 1110 is executed so that the motion of the saucer rising in the Y direction is animated in the scene 11301 (step 1618).

(2c-4) Push Command

What is next executed by the user program library execution subroutine 1112 is a push command stored in the entry 1913. Since the data name b in the entry 1913 has been replaced by c, as has been mentioned above, a "al c push" command is executed by the built-in command execution library 1109 (step 1804). The process of the execution is animated by the built-in command animating library 1110 (step 1805). Namely, a "push" command animating subroutine 1613 (see FIG. 16) in the library 1110 is executed so that how the saucer al is placed onto the Hanoi tower c is animated or displayed on the display device 1101 (steps 1614 and 1615).

(2c-5) End Command

A command in the next entry 194 is a "success-end" command. The execution of this command immediately results in a success (step 1525) and the subroutine program is terminated.

Figure 24:
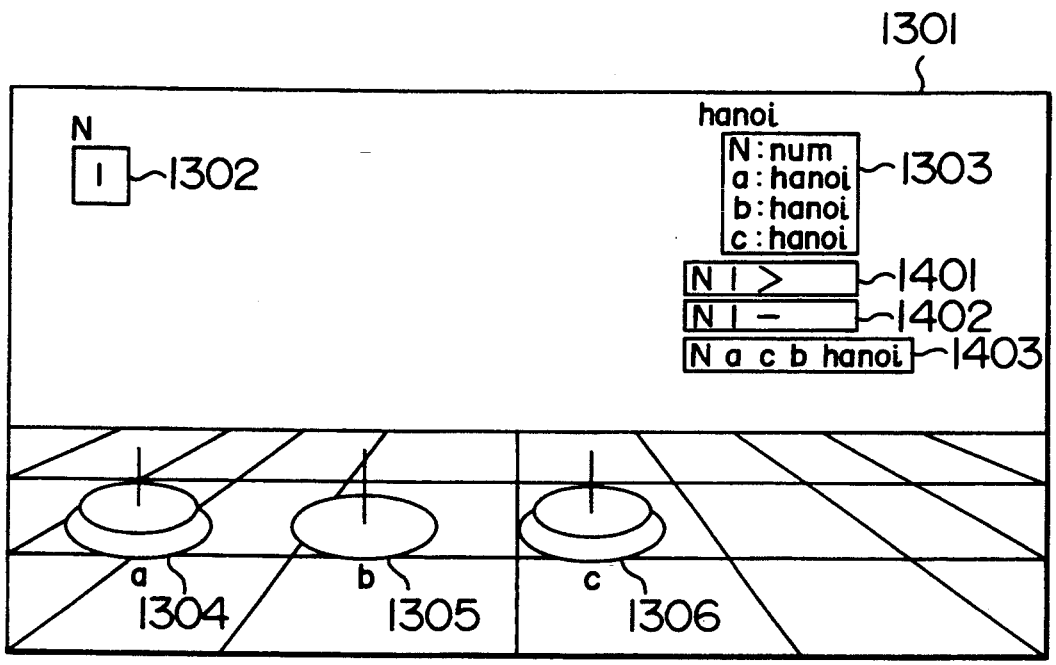

Since all of the user programs in the program save area 1933 have been completed (step 1808), the example data name is restored to its original name (step 1811) and information of a success is made, thereby terminating the call of the user program library execution subroutine 1112. FIG. 24 shows a display state of the scene 11301 at this stage of time.

(3) "pop" Command (a pop) and "push" Command (al b push)

Figure 25:
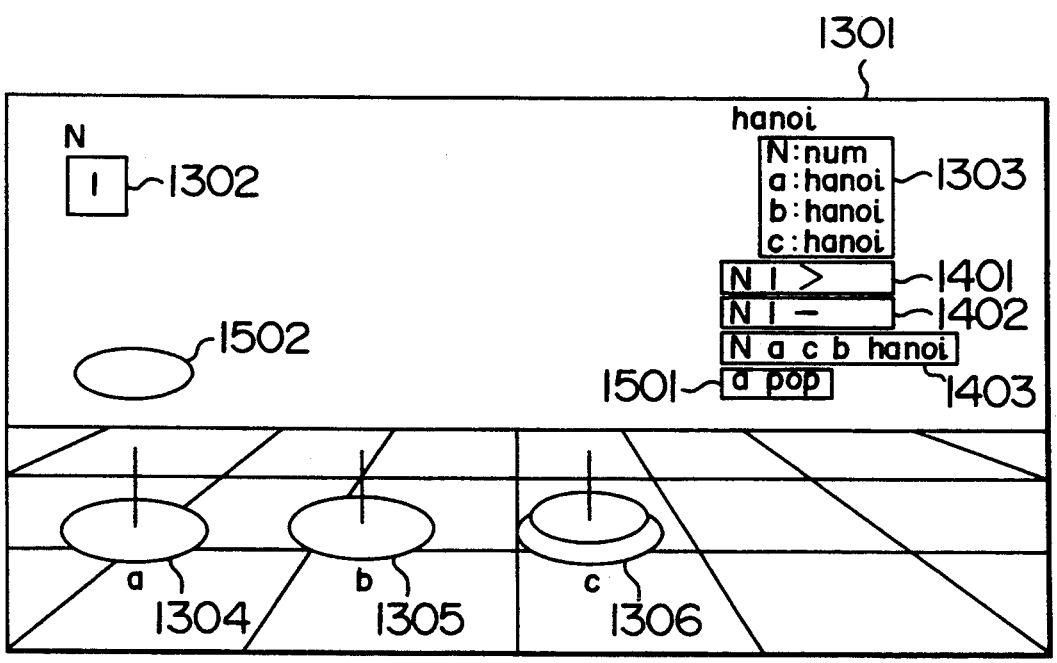
Figure 26:
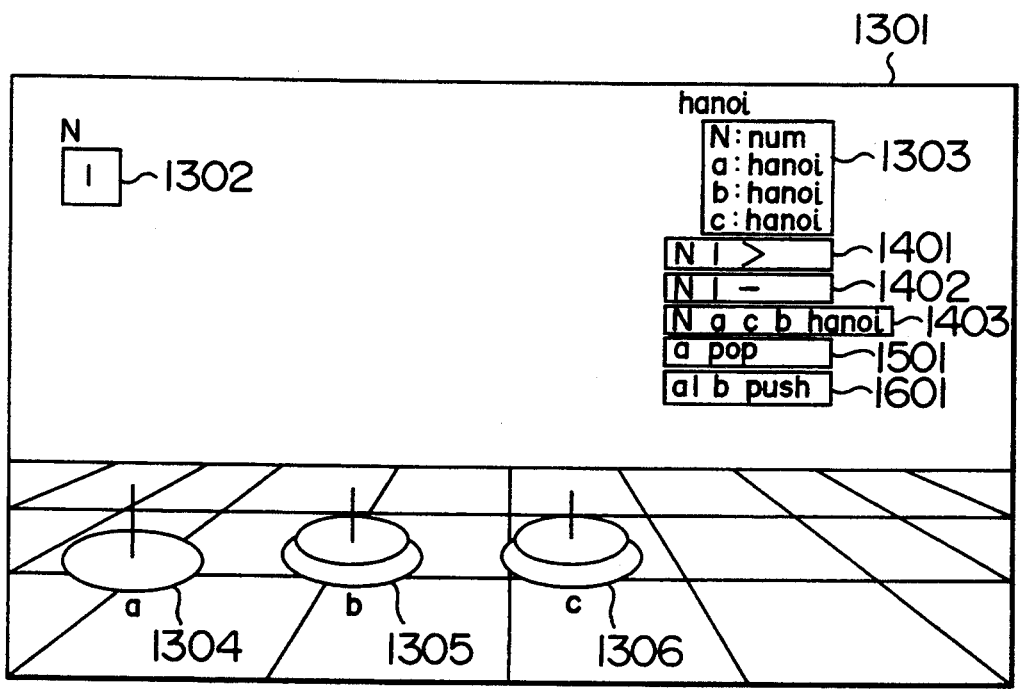

Since the upper one of the two saucers on the Hanoi tower 11304 has been transferred to the Hanoi tower 11306, the user next moves the remaining saucer on the Hanoi tower 11304 to the Hanoi tower 11305. For that purpose, a command "a pop" is inputted from the keyboard 1103 as text 11501, as shown in FIG. 25, and the new position of the saucer is shown as display 11502. A command "al b push" is subsequently inputted as text 11601, as shown in FIG. 26. Processings for these commands are the same as those for the command 11102 in FIG. 21 and the command 11201 in FIG. 22. Entires 1928 and 1929 are added to the program save area 1934, as shown in FIG. 19, and texts 11501 and 11601 indicative of the commands are displayed in the scene 11301 (step 1204).

The movement of the saucer from the Hanoi tower 11304 to the Hanoi tower 11305 is animated on the scene 11301 (steps 1206 and 1207).

Figure 27:
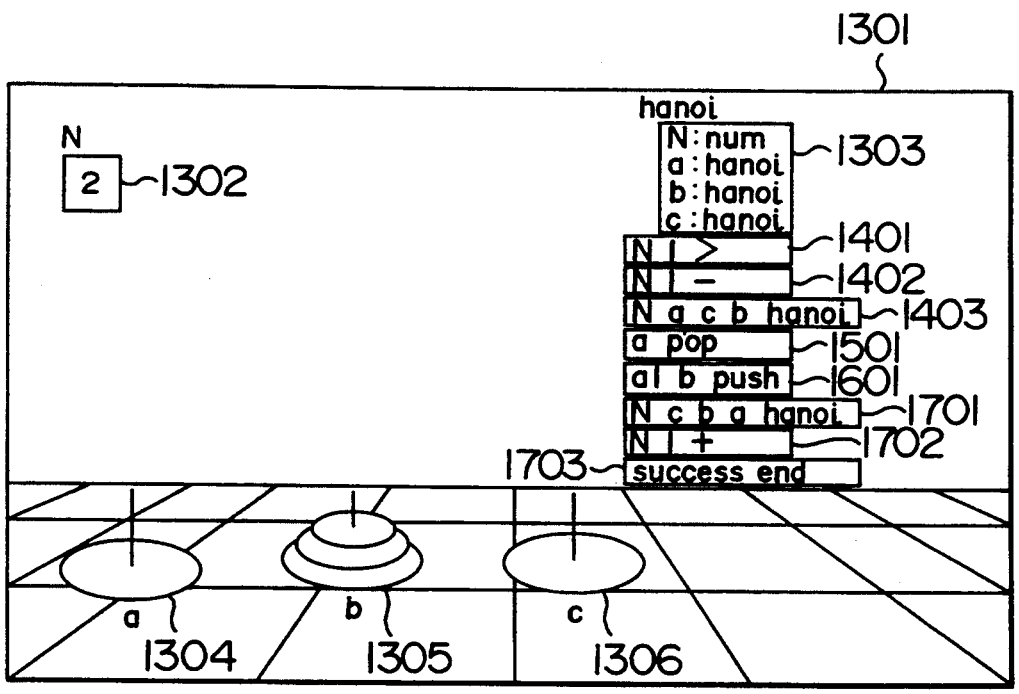

(4) Hanoi Program Execution Command (N c b a hanoi) The solution of the problem of Hanoi tower in the example in which the number of saucers to be moved is two, can be obtained from the state shown in FIG. 26 by moving the saucer on the Hanoi tower 11306 to the Hanoi tower 11305. For that purpose, the concept of induction is used in a manner similar to that mentioned before. Namely, there is utilized the fact that the program 1933 for the example in which the number of saucers to be moved is 1 (that is, N=1) has already been obtained through the production of the scene 11001 for solving that example. Therefore, the user inputs a Hanoi program execution command "N c b a hanoi" from the keyboard 1103 (step 1203). The scene control program 1106 processes this command in a similar manner to the case of the command of text 11403 in FIG. 24. Namely, an entry 1930 is added to the program save area 1934 and a command text 11701 is displayed in the scene 11301 of FIG. 27 (step 1204). Since the command 11701 is not a built-in command but a command defined by the user (step 1205), the user program library execution subroutine 1112 is called (step 1208). As shown in FIG. 18, the user program library execution subroutine 11112 searches for the program 1933 having the command name "hanoi" and replaces the example data names N, a, b and c therein by N, c, b and a, which are the names of arguments of the command of text 11701 (step 180 1 ). As a result, the contents of the entry 1912 of the program 1933 are replaced by "c pop" and the contents of the entry 1913 thereof are replaced by "cl b push". All commands stored in the entries 1911 to 1914 are built-in commands and are executed by the built-in command execution library 1109 (step 1804). The process of execution is animated on the scene 11301 by the built-in command animating library 1110 (step 1805). Since the current value of N is 1, the execution of the "N 1=" command of entry 1911 results in a success (step 1510) and the display 11302 is highlighted by flickering (step 1608). As the result of execution of the "c pop" command of entry 1912, the saucer cl is deleted from the Hanoi tower c (steps 1520 to 1522) and the rising motion of the saucer cl is animated (steps 1618 and 1619). As the result of execution of the next command of entry 1913 ("cl b push"), the saucer cl is added onto the Hanoi tower b (steps 1516 and 1517) and the motion of the saucer cl toward the Hanoi tower b is animated (steps 1614 and 1615). Since the execution of the next command of entry 1914 ("success-end") immediately results in a success and an end is reported (step 1525), the user program is completed (step 1808) so that the example data names are restored to the original names or the contents of the entries 1912 and 1913 are restored to "a pop" and "al b pop", respectively (step 1811). Further, information of a success is given thereby completing the call of the user program library execution subroutine 1112 (step 1812). As the result of the above procedure, the two saucers which were on the Hanoi tower 11304 in the state shown in FIG. 23 have been moved to the Hanoi tower 11305, as shown in FIG. 27.

The user further inputs commands "N 1+" and "success-end" from the keyboard 1103 displayed as text 11702, 11703, respectively, to restore the value of N which was decremented by 1 by the command of text 11402; these commands are stored as entries 1931 and 1932 thereby terminating the production of the scene 11301. The command "N 1+" is executed by the "+" command execution subroutine 1501 having steps 1502 and 1503 of FIG. 15, and animated by subroutine 1601 having step 1602 of FIG. 16. FIG. 27 shows a state of the scene 11301 at this point of time, that is, a state in which the problem of Hanoi tower in the example in which the value of the numeral data 11302 indicative of the number of saucers to be moved is 2 has been solved.

As apparent from the foregoing, according to the program making method of the present invention, a program can be made with a feeling as if the user manipulates the real thing.

The program of save areas 1933 and 1934 in the user program library 1113 obtained through the production of the scenes 11001 and 11301 are ones made in conjunction with the example in which the number of saucers to be moved is 1 and the example in which it is 2. So long as the problem of Hanoi tower is concerned, those programs are operable in the case where the number of saucers to be moved is arbitrary. It is not necessary to add a further program for solving the problem of Hanoi tower in an example in which the number of saucers to be moved is other than 1 and 2. In the following, this will be explained for confirmation.

Figures 28A, 28B, 28C:
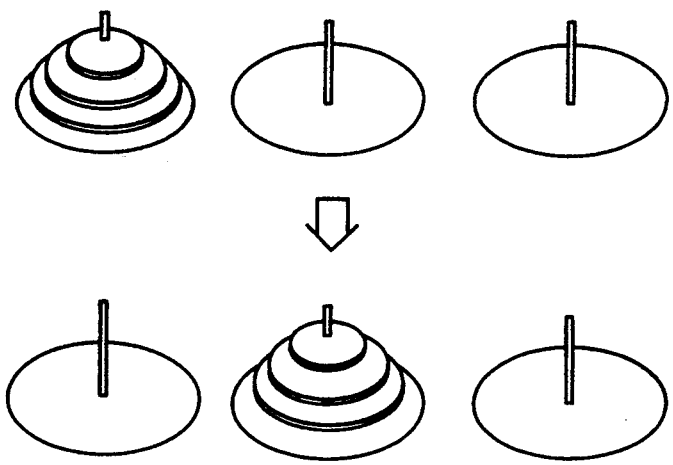
FIGS. 28A to 28C are a schematic illustration and programming to show the solving of the problem of the Hanoi tower when the number of towers is 3 (three).

Now assume by way of example the case where the value of data N indicative of the number of saucers is 3 with three saucers mounted on the Hanoi tower a and with no saucer mounted on the Hanoi towers b and c as shown in FIG. 28A. In this case, if the user inputs a command "N a b c hanoi" from the keyboard 1103 (step 1203), the user program library execution subroutine 1112 is called (step 1208) since the "hanoi" command is not a built-in command (step 1205). As shown in FIG. 18, the program area 1933 is searched out and commands in the program area 1933 are successively executed, since example data names and argument names coincide with each other. However, since the value of N is 3, the execution of the command of entry 1911 ("N 1=") results in a failure (step 1510) and hence the user program library execution subroutine 1112 receives the report of failure in the execution of command (step 1807) and takes out from the user program library 1113 the program of area 1934, which is another program having the same command name "hanoi" (step 1810). Commands in the program 34 are successively executed. Since the example value of N is 3, the execution of the command 1925 ("N 1>") results in a success and the value of N is changed to 2 by the next command 1926 (N 1-"). The next command entry 1927 ("N a c b hanoi"), which is a command to instruct the movement of N (two) saucers from the Hanoi tower a to the Hanoi tower c, can be processed by the production of the scene 1301 for the example in which N is 2. Particularly, since the "hanoi" command is not a built-in command (step 1803), the user program library execution subroutine 1112 is recursively called (step 1806). As well known, the recursive call is a procedure call in a form in which in a certain subroutine the same subroutine is called again. The recursive call is possible in many programming languages, for example, PASCAL, C and LISP. If the scene control program 1106 and the group of subroutines 1107 to 12 are made by use of those languages, the recursive call in step 1806 can be easily realized. When the user program library execution subroutine. 11112 is recursively called by the command 1927 ("N a c b hanoi"), the program 1933 is taken out and each command is executed after replacement of example data name. At this time, too, the execution of the command entry 1911 ("N 1=") results in a failure. The program 1934 is taken out again and is executed after replacement of the example data name "N a b c" by argument name "N a c b". After N has been decremented by 1 by the command 1926 so that the value of N is 1, the command 1927 (turned to "N a c b hanoi" through replacement), which is not a built-in command, appears in the program area 1934 and a recursive call occurs (step 1806). Therefore, the program 1933 is taken out again and is executed. At this time, the execution of the command of entry 1911 ("N 1=") results in a success. The execution of each of the remaining commands of entries 1912 to 1914 being built-in commands results in a success. Thereby, the second recursive call of the user program library execution subroutine 1112 is completed.

By the execution of the command of entry 1931 ("N 1+") in the case of N=1, N becomes 2. Thereby, the first recursive call is also completed. The execution of the command 1927 ("N a b c hanoi") also results in a success and is completed. As the execution of this command 1927, the two saucers are transferred from the Hanoi tower a to the Hanoi tower c. By the next commands of entries 1928 ("a pop") and 1929 C al b push"), the saucer having remained on the Hanoi tower a is moved to the Hanoi tower b. The next command 1930 ("N c b a hanoi") to instruct the movement of the two saucers from the Hanoi tower c to the Hanoi tower b is executable since the example of N =2 has already been settled as the scene 11301. (Like the case of the command of entry 1927, a recursive call of the user program library execution subroutine 1112 occurs.) By the command 1927, the two saucers having been transferred to the Hanoi tower c are moved to the Hanoi tower b so that the saucers which are three in total are placed on the Hanoi tower b as shown in FIG. 28A. By the next commands of entries 1931 ("N 1+") and 1932 ("success-end"), the execution in the case where the number of saucers to be moved is 3 is terminated. From the above explanation concerning the case where N is equal to 3, it is apparent that the execution is possible even in the case where N is greater than 3.

Details that are disclosed with respect to the embodiment of FIGS. 1-10 are also applicable to the embodiment of FIGS. 11-28. For example, in the embodiment of FIGS. 11-28, the target object or desired result is that of making the Hanoi tower, and the visual objects for displayed data on the scene is that of the numerical display 1103 and the text display, for example, 11002, 11007, 11101 and 11102. The resulting combined program includes the combination of the user programs of areas 1933 and 1934 in the user program library 1113 as well as the various application subroutines and libraries 1107-1112 as stored in the main memory 1102. Branching is provided, for example, in steps 1807 and 1250 of the application program to apply previously made user program sequences and to make new user program sequences, and as in the embodiment two, can be conditional upon arguments entered, for example in the set-up subroutine of FIG. 13.

While a keyboard entry 1103 has been shown in FIG. 11 by way of example, as in the first embodiment, the entry system can include a mouse and movable icons on the visual display device 1101, so that visual movable objects may be moved by the mouse on the display. The success icons, showing success of execution, can include the disclosed animation and the movement of icons.

The program history can be stored in any form, for example it can be stored in object code generated as a retrievable program. The branch program of area 1934 in FIG. 19 is shown as having the same name as the first sequence of user made program of area 1933 and it is branched to upon failure of the first sequence to produce a success, although the branch program may employ a different name. The resulting combination program of the user generated programs of areas 1933 and 1934 together with the built-in commands and application programming as represented by the flow charts preferably includes the arguments, but the arguments of course may be set forth in a separate file to be combined upon usage. Within the combined program, subroutines and built-in commands may be called according to branch instructions within the application program or within the user generated program, all representing the program history whether actually combined or a virtual combination by the nature of their built-in calls to subroutines and commands referring to user commands or built-in commands.

In the preferred embodiment of FIGS. 11-28, the user entered the data according to the example set-up subroutine of FIG. 13 or during the entry of commands, but as in the first embodiment there may be a subroutine substantially identical to the subroutine of the FIG. 13 wherein the data is automatically entered by a random or sequential data generating program to automatically test the program and automatically generate additional user programming upon failure of execution with any of the data, so that the automatically generated data is immediately executed and branching occurs if there is failure, for the ambodiment of FIG. 11-28.

Execution throughout the second embodiment may include interpreting input commands. Further, the partial programs, that is the command history, may be compiled into machine instructions.

Whenever the program is changed according to new conditional branching operations, resulting in the addition of further programming operations involving entered commands, a new program is produced, which is a combination of the previous program and the newly entered program branch. This program is, if desired, stored in some form, in a high or low level language, interpreted form, code or the like so that it can be retrieved and used at a later date, that is it is not merely temporally stored, and for the purposes of being retrieved or reused, it is provided with some type of name to be stored under. Such name may have been provided in a previous programming session by the user at the beginning, middle or end of the programming session, or automatically by the computer, or automatically in accordance with the previous program portion.

At some point, for example when the program sequence of operations that had been entered produces the desired results on example data, all of the program sequences of operations have been successful are preferably retrievably stored as a program. In a computer, almost all operations are stored. However, these operations are stored as a complete operative program, also contemplated as the only storage of the new program according to the broader aspects of the present invention, or alternatively further stored in a manner that they may be retrieved at a later time for subsequent use. A usual way of retrievably storing would involve naming the program, after its completion, before starting the making of the program, automatically by the computer, or in some other manner, and thereafter storing the program in a permanent storage location, such as a hard disc, under the program name. Thereafter, a user may retrieve the program by employing the name or the representation of the name for subsequent use with additional data.

According to the present invention, a program is being made on the basis of the example value of a specific data. It is readily understood from the program codes shown in FIG. 8, however, that the program thus generated is independent of any specific example and is capable of manipulating any icons or other visual objects, integers and arrays in general.

Operations and manipulations refer to the execution of a program or an entered command, after interpretation, with respect to the input data, which may be alphanumeric or merely icon represented as an example of a visual object. An input operation relates to a user controlled entry of data or commands into the system. The operation requested by a command refers to the execution performed by the command that may be entered or a portion of a program that is in a high or low level language or code, for example. Icons and variables may alternately be used for input. An argument or operand is the data used by a specific command. The final program that may be stored and used as needed may be stored as code or merely a listing of commands taken from the history table during programing. In a sense, programing never stops, because if new data during some future use results in a command failure, the program will branch, showing a new scene and prompt for entry of new commands for a subroutine or branch to handle the new data, which branch or subroutine is then added to the program, automatically. Also, a program may never branch.

According to the present invention, a program can be made on the basis of a specific example with the resulting effect that the programming becomes earlier.

Also, while, simultaneously with coding a program, a specific input data is being coded, an operation is executed against the value of the data at the same time. Therefore, actions against at least one data example are guaranteed when the coding of the program is terminated. In other words, there is an effect that the processes required for debugging after coding are curtailed.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A method for making a program for processing example data and to produce a desired result, comprising the following steps to be executed by a computer system under control of an application program:
   (a) calling a set-up subroutine of the application program and user entering example data under control of the set-up subroutine;
   (b) storing at least some of the example data as arguments for commands of the application program;
   (c) displaying commands and their arguments of the application program;
   (d) executing built-in commands of the application program, and calling a user program corresponding to user commands that are not built-in commands and executing such user commands;
   (e) upon failure of execution of a user command that is not a built-in command, storing a first program sequence of operations which produces the desired result with first data, including the steps of,
      (e1) inputting an operator-selected command requesting execution of an operation on the example data,
      (e2) executing the operation in response to inputting,
      (e3) outputting information related to an execution result of the operation as an aid for an operator to select an appropriate additional command, and (e4) repeating the steps (e1) to (e3), until a sequence of commands required to obtain the desired result is inputted and storing a program representing the sequence of commands as the first program sequence;

(f) executing the first program sequence of operations on at least second data;

(g) repeating the step (e) for the second data when execution by the step (f) is unsuccessful in producing the desired result, to obtain a second program sequence of operations which produce the desired result with the second example data; and (h) storing the program representing a combination of the first program sequence operations and the second program sequence of operations, wherein execution of the second program sequence is conditional on the results of the first program sequence of operations.

2. A method according to claim 1, further including the steps of:

(i) executing the first program sequence of operations on third data;

(j) automatically executing the second program sequence of operations on the third data when execution by the step (e) is unsuccessful in producing the desired result;

(k) repeating the step (e) for the third data, when execution by the step (j) is unsuccessful in producing the desired result, to obtain a third program sequence of operations which produces the desired result with the third data; and (l) storing the program representing a combination of the first program sequence, second program sequence and a third program sequence of operations, wherein execution of the third program sequences of operations is conditionally executed on the results of a prior program sequence producing the desired result.

3. A method according to claim 2, wherein the step (e) includes the step of inputting a command, as part of the sequence of commands, which requests a judgement operation to judge whether data resulting from execution satisfies a predetermined condition and at least one subsequent operation to be executed in one of satisfaction and unsatisfaction of the condition by the data, and wherein the step (f) includes the step of determining that the execution of the first sequence of operations is unsuccessful, when the other of the satisfaction and unsatisfaction of the condition turns out during the execution of the first sequence of operations.

4. A method according to claim 1, wherein the step (e) includes the step of inputting a command, as part of the sequence of commands, which requests a judgement operation to judge whether data resulting from execution satisfies a predetermined condition and at least one subsequent operation to be executed in one of satisfaction and unsatisfaction of the condition by the data, and wherein the step (f) includes the step of determining that the execution of the first sequence of operations is unsuccessful, when the other of the satisfaction and unsatisfaction of the condition turns out during the execution of the first sequence of operations.

5. A method according to claim 1, wherein said steps of executing each produce one signal of a success signal and failure signal, and said step of repeating is conditional upon said one signal in accordance with a branch testing of said one signal within the application program.

6. A method according to claim 5, further including searching a program memory to locate a user program as a branch program for execution in response to the one signal being a failure signal and automatically inserting at least some of the current data that produced failure as arguments for commands within the branch program.

7. A method according to claim 6, further including:
   upon failure of said searching to locate a user program, branching to a subroutine of the application program for repeating the step (e) with the current data that produced failure of execution and thereafter repeating the step (f) all as a part of step (g).

8. A method for making a program for processing a target object to be processed by the program by using example visual objects of the target object, comprising the steps, executed by a computer system having a display device and a processor to produce a desired result under control of an application program:

(a) calling a set-up subroutine of the application program and user entering example visual objects under control of the set-up subroutine;

(b) storing at least some of the example visual objects as arguments for commands of the application program;

(c) displaying commands and their arguments of the application program;

(d) executing built-in commands of the application program, and calling a user program corresponding to user commands that are not built-in commands and executing such user commands;

(e) storing a first sequence of operations which produce the desired result with the first example visual object of the target object, including the steps of
   (e1) inputting a command requesting execution of an operation on a visual object,
   (e2) automatically executing the operation in response to the inputted command,
   (e3) displaying visual information related to the executing result of the operation as an aid for an operator to select an appropriate additional command,
   (e4) repeating the steps (e1) to (e3), until the desired result is obtained by execution of a sequence of operations requested by inputted commands and storing the sequence of the operations as the first sequence of operations;

(f) executing the first sequence of operations on at least a second example object of the target object;

(g) repeating the step (e) for the second visual object, when execution by the step (f) turns out to be unsuccessful in producing the desired result, to obtain a second sequence of operations which produce the desired result with the second example visual object; and (h) storing the program as a combination of a first partial program which executes the first sequence of operations on the target object and a second partial program which executes the second sequence of operations, when execution of the first sequence of operations on the target object turns out to be unsuccessful.

9. A method according to claim 8, further including the steps of:

31

(i) executing the first sequence of operations on third visual object of the target object;

(j) executing the second sequence of operations on the third visual object when execution by the step (i) turns out to be unsuccessful in producing the desired result;

(k) repeating the step (e) for the third visual object, when execution by the step (j) turns out to be unsuccessful in producing the desired result, so that a third sequence of operations executed on the third visual object is determined which produces the desired result; and (l) storing the program as a combination of the first partial program, the second partial program and third partial program which executes the third sequence of operations, when execution of the first and second sequence of operations on the target visual object turns out to be unsuccessful in producing the desired result.

10. A method according to claim 8, wherein the step (e) includes the step of determining, as part of the first sequence of operations, a judgement operation to judge whether data resulting from execution satisfies a predetermined condition and at least one subsequent operation to be executed in one of satisfaction and unsatisfaction of the condition by the data; and wherein the step (f) includes the step of determining that the execution of the first sequence of operations is unsuccessful, when the other of the satisfaction and unsatisfaction of the condition turns out during the execution of the first sequence of operations.

11. A method according to claim 10, wherein the combining step (h) includes a step of providing, within the first partial program, a branch instruction for jumping to the second partial program depending upon whether or not a branch condition related to the predetermined condition is satisfied.

12. A method according to claim 8, wherein said steps of executing each produce one signal of a success signal and failure signal, and said step of repeating is conditional upon said one signal in accordance with a branch testing of said one signal within the application program.

13. A method according to claim 12, further including searching a program memory to locate a user program as a branch program for execution in response to the one signal being a failure signal and automatically inserting at least some of the current data that produced failure as arguments for commands within the branch program.

14. A method according to claim 13, further including:

upon failure of said searching to locate a user program, branching to a subroutine of the application program for repeating the step (e) with the current data that produced failure of execution and thereafter repeating the step (f) all as a part of step (g).

15. A device for writing a program to produce an expected result, comprising:
a visual display;
an information entry system;
a central processing unit;
a memory having an application program for controlling said visual display, said information entry system, and said memory by programming the central processing unit for the writing of the program;

32 said memory having an instruction set of a plurality of built-in commands, some of which are to be used for the program, which said built-in commands require arguments for execution by said central processing unit;

said application program controlling said central processing unit, memory, information entry system and visual display for displaying a scene prompting entry of arguments and at least one of a user command and built-in command;

said application program controlling said central processing unit, memory, information entry system and visual display for storing in a program history said commands and their arguments in order as they are entered by said information entry system;

said application program controlling said central processing unit, memory, information entry system and visual display for interpreting said commands and executing said interpreted commands with the associated arguments to produce a result;

said application program controlling said central processing unit, memory, information entry system and visual display for interpreting the success of the execution of at least one command with respect to an expected result to provide a corresponding one of a failure signal and a success signal;

said application program controlling said central processing unit, memory, information entry system and visual display for displaying, in response to said failure signal, a new scene with said visual display prompting entry of at least one additional command that operates upon at least one of the arguments of the failed command for alternate execution to produce the expected result;

said application program controlling said central processing unit, memory, information entry system and visual display for interpreting said additional command upon its entry and executing said additional command immediately thereafter with respect to said at least one argument of the failed command without requiring reentry of said at least one argument to produce an additional result of execution of said additional command;

said application program controlling said central processing unit, memory, information entry system and visual display, in response to production of said additional result, judging the success or failure of said additional result with respect to said expected result and producing a corresponding one of an additional success signal and an additional failure signal;

in response to said additional success signal, said application program controlling said central processing unit, memory, information entry system and visual display for displaying the additional result;

in response to receipt of said additional failure signal, said application program controlling said central processing unit, memory, information entry system and visual display for displaying an additional scene prompting entry of at least an additional different command executable with respect to said at least one argument to produce the expected result; and said application program controlling said central processing unit, memory, information entry system and visual display for saving a program representation of the command history, including the sequence of entered commands and arguments.

16. The device of claim 15, wherein said entry system includes a mouse, and icons on said visual display controlled by said mouse.

17. The device of claim 16, wherein said entry system includes a manual entry device and alphanumeric lines for information displayed on said visual display corresponding to entry on said keyboard.

18. The device of claim 15, wherein said entry system involves manual manipulation of visible moveable objects.

19. A method of writing a program to produce an expected result with a user interfacing with a computer system having a user entry system, a central processing unit, a memory having an application program with a command set, and a display, comprising the steps, performed under control of the application program, of:
- user entering a first argument as user data of a general one argument type and saving said argument;
- displaying a scene on said display prompting user entry of at least one command of said command set that is executable with respect to arguments of said one argument type;
- user entering one command, with said one command being of a type that is executable with respect to at least some arguments of said one argument type and storing said one command in a program history;
- thereafter automatically executing said one command with respect to said user data to produce a specific execution result dependent upon the specific user data;
- thereafter automatically judging the specific execution result with respect to the expected result for producing one of a failure signal and a success signal in accordance with said judging;
- in response to said success signal, automatically outputting the result and repeating the preceding steps in order until the first user program is complete;
- in response to said failure signal, displaying a new scene automatically on said display prompting user entry of an additional command that is executable with respect to arguments of said one argument type and user entering the additional command;
- thereafter, in response to said entering of said additional command, automatically executing the additional command with the specific user data without reentry of the specific user data to produce an additional result dependent upon the specific user data;
- thereafter automatically judging the additional result with respect to the expected result for producing one of a second failure signal and a second success signal in accordance with said judging;
- in response to said second success signal, automatically outputting the results and repeating all of the preceding steps in order to produce a branch program;
- in response to said second failure signal, displaying a new scene automatically on said display prompting user entry of a second additional command;
- repeating said steps to produce a program that is complete with respect to the specific user data executed with success; and
- saving a program representation of the first and branch programs with the specific user data executed only with success, in order, without reentry, in a form reusable with the application program to produce the expected result with data of the one argument type.

20. The method of claim 19, wherein said outputting includes displaying at least successful execution results as animated success icons.

21. The method of claim 19, including displaying the first argument as an icon.

22. The method of claim 19, including generating code from the first and branch program commands and arguments, and storing the code thus generated as a retrievable program operable with the application program.

23. A method of operating a computer system under control of an application program for automatically writing a branch program for an existing program, which includes a user program and an application program, in response to failure of the existing program with respect to new data, comprising the steps of:
- providing the user program portion of the existing program in memory in a form representative of a sequence of operations executable with respect to specific data of a general data type;
- thereafter, entering specific new data of the general data type;
- thereafter, automatically executing said operations with respect to said specific data, in the order of said existing program to produce corresponding execution results;
- thereafter, at selected positions within said sequence of operations, the application program judging whether the execution result corresponds to an expected result of the existing program and accordingly producing one of a success signal and a failure signal;
- in response to the success signal, automatically executing subsequent commands in said sequence of operations of the existing program; and
- in response to said failure signal, automatically inserting a conditional branch operation in said existing program with the condition being said failure and prompting user revision of said existing program to provide a new sequence of operations executable with respect to said data type in a branch program reached the application programming calling the conditional branch operation upon failure of the user program by said conditional branch operation.

24. The method of claim 23, including entering new commands, in response to said prompting;
- automatically executing said new commands with respect to said data, without requiring reexecution of all already executed commands and without requiring reentry of the data to produce new execution results;
- the application program judging the success or failure of said new execution results with respect to said expected result; and
- automatically saving a representation of said new commands as the branch program of said existing program.

25. The method of claim 24, including thereafter repeating all of said preceding steps; and wherein upon repeating said step of providing provides said existing program to include said branch program and conditional branch.

26. The method of claim 25, wherein said steps of saving and providing all use the same name of said program.

27. The method of claim 24, wherein said steps of saving and providing all use the same name of said program.

28. A method for making a program that includes user programs and an application program by using examples of data to be processed thereby, comprising the steps to be executed by a computer system under control of the application program:
   (a) storing a main user program that has first sequence of commands which produces a result desired by the program with first data, including the steps of,
      (a1) inputting an operator-selected command to be executed,
      (a2) executing the inputted command,
      (a3) outputting information related to an executing result of the command as an aid for an operator to select an appropriate command to be inputted additionally, and
      (a4) repeating the steps (a1) to (a3), until a sequence of commands required to obtain the desired result with the first data is inputted and storing the sequence of commands as the first sequence;
   (b) repeating the step (a) at least for second data to store a branch user program that has a second sequence of commands which produces the result desired when the second data fails to produce the desired result with execution of the first sequence of commands; and
   (c) forming the program as a combination of the application program, the main user program which executes operations requested by the first sequence of commands on the data and at least one branch user program which executes the second sequence of commands when execution of the first sequence of commands turns out to be unsuccessful in producing the desired result.

29. A method according to claim 28, further including the steps of:
   (d) executing the main user program sequence of commands on third data;
   (e) automatically executing the branch user program sequence of commands on the third data when execution by the step (d) turns out to be unsuccessful in producing a result desired by the program;
   (f) repeating the step (a) for the third data, when execution by the step (e) turns out to be unsuccessful in producing the program desired result for the third data, so that another branch user program sequence of commands produces the desired result; and
   (g) forming the program as a combination of the application program, the main user program, the branch user program and another branch user program which executes the third sequence of commands, when execution of the first and second sequence of commands on the data turns out to be unsuccessful in producing the desired result.

30. A method according to claim 28, wherein the step (a) includes the step of inputting, as part of the first sequence of commands, a judgement command to judge whether data which is either the first data or data resulting from execution satisfies a predetermined condition and at least one subsequent command to be executed in one of satisfaction and unsatisfaction of the condition by the data.

31. A method according to claim 30, wherein the application program includes a branch instruction for calling the branch user program depending upon whether or not a branch condition related to the predetermined condition is satisfied.

32. A method according to claim 28, further comprising the steps of:
   (d) executing the first sequence of commands on data other than the first data, after execution of step (a), to determine whether or not the other data is to be used as the second example data.

33. A method according to claim 32, further comprising the steps of:
   automatically generating a plurality of data; and
   executing the step (d) for each of the plurality of data to find one of the plurality of data to be used as the second example data.

34. A method according to claim 28, wherein executing step (a2) includes the step of interpreting the inputted command to execute it.

35. A method according to claim 28, wherein the forming step (c) includes the step of forming the branch and another branch user programs by respectively compiling the first and second sequence of commands into machine instructions.

36. A method according to claim 28, further comprising the steps of:
   executing the formed program from said step of forming with respect to new data as data and repeating the step (a), when the executing of the formed program turns out to be unsuccessful in producing a result desired to obtain another sequence of commands which produces the desired result for the new data; and
   repeating said step of forming with respect to the formed program and the another sequence of commands as another branch user program.

37. A method according to claim 28, wherein said steps of executing each produce one signal of a success signal and failure signal, and said step of repeating is conditional upon said one signal in accordance with a branch testing of said one signal within the application program.

38. A method according to claim 37, further including searching a program memory to locate a user program as a branch program for execution in response to the one signal being a failure signal and automatically inserting at least some of the current data that produced failure as arguments for commands within the branch program.

39. A method according to claim 38, further including:
   upon failure of said searching to locate a user program, branching to a subroutine of the application program for repeating the step (e) with the current data that produced failure of execution and thereafter repeating the step (f) all as a part of step (g).

40. A method for making a program for processing a target object to be processed by the program to produce a desired result, by using example visual objects of the target object, comprising the steps executed by a computer system having a processor under control of an application program:
   (a) determining a main user program of a first sequence of operations required to be executed on a first example visual object of the target object, to produce the desired result, including the steps of;
      (a1) inputting a command requesting execution of an operation on a visual object,
      (a2) automatically executing the operation in response to the inputting command, (a3) automatically outputting information related to the executing result of the operation as an aid for an operator to select an appropriate additional command, and (a4) repeating the steps of (a1) to (a3), until the desired result is obtained by execution of operations requested by operator-selected appropriate commands and storing the sequence of the commands of the steps (a1) to (a3) that produce the desired result as the main user program of the first sequence of operations;

(b) executing the first sequence of operations on at least a second example visual object of the target object;

(c) automatically repeating the step (a) for the second example visual object, when execution by the step (b) turns out to be unsuccessful in producing the desired result, to obtain a branch user program of a second sequence of operations executed on the second example visual object which produce the desired result; and (d) storing a program as a combination of the application program, the main user program which executes the first sequence of operations on the target object and the branch user program which executes the second sequence of operations, when execution of the first sequence of operations on the target object turns out to be unsuccessful.

41. A method according to claim 40, wherein the target object is target data;
wherein the visual object includes a first visual object attached with a data of the target data; and
wherein the visual information includes a second visual object attached with a value of the execution result of the command.

42. A method according to claim 41, wherein each of the first and second visual objects includes a graphical symbol predetermined for each of the visual object and the visual information.

43. A method according to claim 40, further comprising the steps of executing the first sequence of operations on visual object data other than the first visual object, after execution of the step (a), to determine whether or not the other data is to be used as the second example data.

44. A method according to claim 43, further comprising the steps of, automatically generating a plurality of data; and executing the step (b) for each of the plurality of data to find one of the plurality of data to be used as the second data.

45. A method according to claim 40, wherein said executing step (a2) includes the steps of interpreting the inputted command to be executed.

46. A method according to claim 40, wherein the storing step stores by respectively compiling the first and second sequence of operations into machine instructions.

47. A method according to claim 40, further comprising the steps of retrieving the program stored by said step of storing and executing the retrieved program with respect to new data as data and repeating the step (a), when the execution turns out to be unsuccessful in producing the desired result to obtain another sequence of operations which produces the desired result for the new data; and repeating said steps of retrieving and executing with respect to the retrieved program and the another sequence of operations.

48. A method according to claim 40, wherein said steps of executing each produce one signal of a success signal and failure signal, and said step of repeating is conditional upon said one signal in accordance with a branch testing of said one signal within the application program.

49. A method according to claim 48, further including searching a program memory to locate a user program as a branch program for execution in response to the one signal being a failure signal and automatically inserting at least some of the current data that produced failure as arguments for commands within the branch program.

50. A method according to claim 49, further including:
upon failure of said searching to locate a user program, branching to a subroutine of the application program for repeating the step (e) with the current data that produced failure of execution and thereafter repeating the step (f) all as a part of step (g).

51. A method of writing a program using a computer system, under the control of an application program, having a set of built-in commands and storage for user commands, comprising the steps of:
user entering a sequence of commands to produce a desired program result;
by means of the application program, judging whether each of the entered commands is one of the application program built-in commands or a user command, after user entry of the command;
for each command that is judged to be a built-in command, executing the built-in command prior to entry of the following command in the sequence of commands;
for each command that is judged to be a user command, executing the user command prior to the entry for the following command in the sequence of commands when the user command is a user command stored in the computer system; and
when the-user command is judged not a user command stored in the computer system, calling a branch subroutine of the application program that prompts the user to enter a branch sequence of commands to accomplish the purpose of the last mentioned user command and storing the branch sequence of commands as a subroutine thereafter called by the user command.

52. The method of claim 51, wherein each user command is a program written as a sequence of built-in commands.

53. The method of claim 51, wherein the user-command is a program of a sequence of built-in commands and other user-commands, each of which calls a corresponding sequence of commands as a branch program.

54. The method of claim 51, further including user entering data to be manipulated as arguments of said commands; and
performing all of said steps with said data under the control of said application program without reentering said data.

55. The method of claim 54, further including recursively calling one of a subroutine of said application program and a user command, based upon a condition data of the data satisfying a condition of the call and automatically changing the value of the condition data during each recursive call until the value of the condition data no longer satisfies the condition.

56. The method of claim 54, including said step of storing further storing the user entered data as arguments of commands.

57. The method of claim 56, wherein the user-command is a program of a sequence of built-in commands and other user-commands, each of which calls a corresponding sequence of commands as a branch program.

58. A method for making a program having a program name used for fetching and executing the program, with aid of a computer system, comprising steps executed by the computer system, the steps including:
- (a) inputting a command selected by an operator of the computer system so as to process one example data of one data type to be processed by the program:
- (b) executing the command from the preceding said step of inputting to process the one example data and produce a result;
- (c) informing the operator of the result from said executing;
- (d) repeating said steps (a) through (c) for sequentially inputting and executing commands continuously until an inputted command is an input ending command selected by the operator so that one series of commands required to process the one example data are inputted;
- (e) storing under the program name the one series of commands in a form to be fetched in the order of their sequential inputting as a one program routine for processing the one data type that is part of the program so that the one program routine will be executed for data of the one data type when the program is subsequently fetched; and
- thereafter repeating said steps (a) through (e) for at least another example data of a different data type to be processed by the program for thereby storing another series of commands as another program routine for processing the different data type to be subsequently executed for the different type of data to be processed by the program when execution of the program is requested at a later time; and
- said storing combining both the one and another program routines as parts of the program under the program name.

59. A method for making the program according to claim 58, wherein each of the one and another program routines includes a judgement command that judges whether data for running of the each program routine satisfies a corresponding data condition of data type of the each judgment command in order to assure that commands of the program routine are executable subsequently for only their data type; and
- executing the judgement command to determine if the data to be executed by subsequent commands of the each program routine containing the judgement command match the data type condition of the judgement command to produce a corresponding judgement result of success or failure.

60. A method for making the program according to claim 59, wherein each of said program routines includes an instruction to execute commands subsequent to its judgement command in response to a judgement result of success of executing the judgement command and bypassing the remaining commands of the each program routine of the judgement command in response to a judgement result of failure, to thereby proceed with executing the commands of the another program routine of the program with the same data with which the judgement command of the preceding program routine was executed.

61. A method for making the program according to claim 58, wherein said steps produce the program for executing different processing, respectively depending upon whether or not a plurality of conditions are satisfied by data being processed by the program.

62. A method for making the program according to claim 58, further comprising storing all of the program routines of the program in a predetermined operator independent order.

63. A method for making the program according to claim 62, including storing the program routines in the order of the inputting of their commands, to make up the program.

64. A method according to claim 58, further comprising:
- selecting one of the program routines based upon only the program name;
- executing the selected program routine for data to be processed by the program; and
- repeating the immediately preceding steps of selecting and executing for another of the program routines in response to said step executing the selected program failing in processing the data so that the another of the program routines is thereby selected and executed with the same data, with said repeating continuing until processing by a program routine is successful in processing the data.

65. A method for executing the program according to claim 64, wherein said step of selecting selects a program routine according to a predetermined order.

66. A method for executing the program according to claim 65, wherein the predetermined order is the order of inputting the commands according to said steps of inputting.

67. A method for making a program with aid of a computer system, comprising steps executed by the computer system, the steps including:
- (a) inputting a command selected by an operator of the computer system so as to process one example data of one data type to be processed by the program:
- (b) executing the command from the preceding said step of inputting to process the one example data and produce a result;
- (c) informing the operator of the result from said executing;
- (d) repeating said steps (a) through (c) for sequentially inputting and executing commands continuously until an inputted command is an input ending command selected by the operator so that one series of commands required to process the one example data are inputted;
- (e) storing the one series of commands in a form to be fetched as a one program routine for processing the one data type that is part of the program so that the one program routine will be executed for data of the one data type when the program is subsequently fetched;
- thereafter repeating said steps (a) through (e) for at least another example data of a different data type to be processed by the program for thereby storing another series of commands as another program routine for processing the different data type to be subsequently executed for the different type of data to be processed by the program when execution of the program is requested at a later time; and controlling said repeating of said storing step so that the one program routine is stored for execution with new data on subsequent running of the program and the another program routine is stored for automatic execution with the same data upon failure in executing a command of the one program routine.

68. A method for making the program according to claim 67, wherein each of the one and another program routines includes a judgement command that judges whether data for running of the each program routine satisfies a corresponding data condition of data type of the judgement command in order to assure that commands of the each program routine are executable subsequently for only their data type; and executing the judgement command to determine if the data to be executed by subsequent commands of the each program routine containing the judgement command match the data type condition of the judgement command to produce a corresponding judgement result of success or failure.

69. A method for making the program according to claim 67, wherein the one program routine includes an instruction to execute commands subsequent to its judgement command in response to a judgement result of success of executing the judgement command and bypassing the remaining commands of the one program routine of the judgement command in response to a judgement result of failure to thereby proceed with executing the commands of the another program routine of the program with the same data with which the judgement command of the one program routine was executed.

70. A method for making the program according to claim 69, wherein at least one of the one and another program routines includes a judgement command that judges whether data for running of the program routine satisfies a corresponding data condition of data type of the judgement command in order to assure that commands of the at least program routine are executable subsequently for their data type; and executing the judgement command to determine if the data to be executed by subsequent commands of the program routine containing the judgement command match the data type condition of the judgement command to produce a corresponding judgement result of success or failure.

71. A method for making the program according to claim 67, further comprising storing all of the program routines of the program in a predetermined operator independent order.

72. A method for making the program according to claim 71, including storing the program routines in the order of the inputting of their commands, to make up the program.

73. A method of claim 67, further comprising:
selecting one of the program routines based upon only the program name;
executing the selected program routine for data to be processed by the program; and
repeating the immediately preceding steps of selecting and executing for another of the program routines in response to said step executing the selected program failing in processing the data so that the another of the program routines is thereby selected and executed with the same data, with said repeating continuing until processing by a program routine is successful in processing the data.

74. A method for making the program according to claim 73, further comprising storing all of the program routines of the program in a predetermined operator independent order.

75. A method for making the program according to claim 74, including storing the program routines in the order of the inputting of their commands, to make up the program.

76. A method for making a program, with aid of a computer system and an operator, comprising steps executed by the computer system, the steps including:
(a) inputting a command selected by the operator of the computer system so as to process one example data of one data type to be processed by the program;
(b) executing the command from said step of inputting to process the one example data and produce a result;
(c) informing the operator of the result from said executing;
(d) repeating said steps (a) through (c) a plurality of times so that one series of commands are inputted;
(e) storing the one series of commands to form one program routine to be used as the program for execution with subsequent data to be processed by the program upon subsequent running of the program;
(f) reexecuting the one program routine for subsequent data upon subsequent running of the program for processing the subsequent data by the program in response to a request by the operator;
(g) informing the operator of failure in the event of failure of one command of the one program routine in processing the subsequent data by said reexecuting of the one program routine with the subsequent data;
(h) in response to the failure, repeating said steps of (a) to (e) so that another series of commands selected by the operator to process the subsequent data without failure are inputted and stored so that together with the one program routine constitutes the program; and
(i) in response to the failure, controlling the storing of the another series of commands so that the another program routine is executed in the event that the one program routine fails during its execution when the complete program is subsequently run.

77. A method for making a program according to claim 76, wherein said storing stores the another series of commands as a branch routine of the program, in response to the failure.

78. A method for making a program according to claim 76, wherein said step of storing stores both the one program routine and the another series of commands under only a single program name.

79. A method for making a program according to claim 76, including said storing of the another series of commands is so that results of executing all the one series of commands are not needed in the executing of the another series of commands.

80. A method according to claim 76, including thereafter running the program for processing a plurality of data sequentially, with the plurality of data including at least data corresponding to the one example data and another example data.

81. A method according to claim 80, wherein said running includes repeatedly executing the one series of commands respectively for a plurality of data independently of the another series of commands until failure of processing occurs with respect to a specific one of the plurality of data and then, in response to the failure, executing the another series of commands with the specific one data.

82. The method of claim 76, wherein the one example data and the subsequent data are of a same data type and are to be processed independently of each other.

83. The method of claim 82, wherein said steps are conducted so that the one series of commands is executed until failure of execution, and in response to the failure of execution, the another series of commands is executed for the same data.

84. The method of claim 76, wherein said step of executing produces one of a success signal and a failure signal according to success or failure of processing based upon data satisfying or not satisfying a condition of the execution; and wherein said informing informs the operator of failure in response to the failure signal during said step of repeating with respect to subsequent data that does not meet the condition.

85. The method of claim 84, including judging, as one of the commands, whether data being processed satisfies the condition to produce the failure signal or success signal.

86. The method of claim 85, wherein the condition is a condition to be satisfied to assure a specific desired program result.

87. A method of claim 76, wherein said storing stores the one series of commands and the another series of commands as a part of the one program routine.

88. The method of claim 76, wherein said storing stores the one series of commands and the another series of commands each as object program routines.

89. A method of claim 76, further comprising:
selecting only a series of commands among the one and another series of commands based only upon the name of the program;
executing the selected series of commands for new data to be processed; and
selecting and executing a further series of commands other than the first selected series among the one and another series of commands in response to a failure of processing of the selected one series of commands with respect to the new data.

90. The method of claim 76, further comprising:
displaying, on a screen of a display apparatus provided with the computer system, the one series of commands and the another series of commands separately from each other in different reserved screen areas sequentially in response to the inputting of each command.

91. The method of claim 76, further comprising:
displaying, on a screen of a display apparatus provided with the computer system, the one series of commands in a first reserved region of the screen in response to the inputting of each command of the one series of commands; and
displaying in a second different reserved region of the screen, in response to failure of execution of the one program routine, each of the another series of commands in response to the inputting of each command of the another series of commands.

92. A method for making a program, with aid of a computer system and an operator, comprising steps executed by the computer system, the steps including:

(a) inputting a command selected by an operator of the computer system so as to process data:
(b) executing the command from said step of inputting to process the data and produce a result;
(c) informing the operator of the result from said executing;
(d) repeating said steps (a) through (c) a plurality of times for inputting one series of commands until there is a failure in said executing;
(e) storing the one series of commands to form one program routine;
(f) informing the operator of the failure;
(g) repeating said steps (a) through (f) in response to said informing the operator of failure for inputting and storing another series of commands in addition to said one series of commands; and
(h) in response to the failure, controlling the storing of the another series of commands so that the another series of commands forms another program routine to be automatically executed upon failure of the one program routine.

93. The method of claim 92, wherein said controlling stores the another series of commands as a branch program routine of the one program routine.

94. The method of claim 92, wherein said controlling stores the another series of commands so that they are executable independently of commands of the one series of commands that follow the command that produced the failure.

95. The method of claim 92, further including displaying, in a first reserved portion of a screen of a display apparatus within the computer system, the one series of commands sequentially in response to the inputting of each command of the one series of commands; and further including displaying, in a second separate reserved portion of the screen, the another series of commands sequentially in response to the inputting of each command of the another series of commands.

96. The method of claim 92, wherein said step of informing informs the operator of failure when the preceding step of executing produces a failure of processing data in comparison to a predetermined condition.

97. The method of claim 96, including judging, as one of the commands, whether data being processed satisfies the condition to produce the failure signal or success signal.

98. The method of claim 96, wherein the condition is a condition to be satisfied to assure a specific desired program result.

99. A method for assisting the making of a program with a computer system, comprising steps executed by the computer system under control of an operator, the steps including:

(a) inputting a command selected by the operator to process data to be processed by the program;
(b) displaying the command inputted by said preceding step of inputting within a first reserved region of a screen of a display apparatus within the computer system;
(c) executing the command of said preceding step of inputting for processing the data to produce a result;
(d) informing the operator of the result of execution of the command according the preceding said executing;

(e) repeating said steps (a) through (d) a plurality of times for inputting one series of commands until a failure of said executing occurs;

(f) repeating said steps (a) through (e) in response to the failure with said step of displaying during repeating displaying the command within a second reserved region of the screen separate from the first region of the screen for inputting another series of commands that will successfully process the example data being used when the failure occurred.

100. The method of claim 99, further comprising;

storing the one series of commands as one program routine; and storing the another series of commands as another program routine.

101. The method of claim 99, wherein said executing produces the failure in response to the data being processed not satisfying a predetermined condition.

102. The method of claim 99, including judging, as one of the commands, whether data being processed satisfies the condition to produce the failure signal or success signal.

103. The method of claim 102, wherein the condition is a condition to be satisfied to assure a specific desired program result.

* * * * *